United States Patent
Yerramalli et al.

(10) Patent No.: US 11,071,106 B2
(45) Date of Patent: Jul. 20, 2021

(54) TECHNIQUES FOR COMMUNICATING ON AN UPLINK IN A SHARED RADIO FREQUENCY SPECTRUM BAND

(71) Applicant: QUALCOMM Incorporated, San Diego, CA (US)

(72) Inventors: Srinivas Yerramalli, San Diego, CA (US); Peter Gaal, San Diego, CA (US); Juan Montojo, San Diego, CA (US); Tao Luo, San Diego, CA (US); Wanshi Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/223,100

(22) Filed: Dec. 17, 2018

(65) Prior Publication Data

US 2019/0124656 A1    Apr. 25, 2019

Related U.S. Application Data

(62) Division of application No. 15/608,858, filed on May 30, 2017, now Pat. No. 10,904,876.
(Continued)

(51) Int. Cl.
*H04W 72/12*   (2009.01)
*H04W 72/14*   (2009.01)
(Continued)

(52) U.S. Cl.
CPC ....... *H04W 72/0446* (2013.01); *H04L 1/0003* (2013.01); *H04L 1/004* (2013.01);
(Continued)

(58) Field of Classification Search
None
See application file for complete search history.

(56) References Cited

U.S. PATENT DOCUMENTS

2004/0100986 A1    5/2004 Lee et al.
2012/0320810 A1   12/2012 Nourbakhsh et al.
(Continued)

FOREIGN PATENT DOCUMENTS

RU    2408169 C2    12/2010
RU    2434365 C2    11/2011
(Continued)

OTHER PUBLICATIONS

"3rd Generation Partnership Project; Technical Specification Group Radio Access Network; Study on Licensed-Assisted Access to Unlicensed Spectrum; (Release 13); 3GPP TR 36.889", ETSI Draft; 3GPP TR 36.889, European Telecommunications Standards Institute (ETSI), 650, Route Des Lucioles; F-06921 Sophia-Antipolis; France, vol. BRAN, No. V1.0.1, Jun. 23, 2015, pp. 1-87, XP014249141, [retrieved on Jun. 23, 2015].
(Continued)

*Primary Examiner* — Ayaz R Sheikh
*Assistant Examiner* — Sori A Aga
(74) *Attorney, Agent, or Firm* — Holland & Hart LLP

(57) ABSTRACT

Techniques are described for wireless communication. One method includes detecting a first reference signal received from a user equipment (UE) in a reference scheduled transmission burst including a plurality of contiguous transmission time intervals (TTIs) received over a shared radio frequency spectrum band; identifying a reference TTI in which the first reference signal is received; determining a contention window size usable by the UE to contend for access to the shared radio frequency spectrum band; and transmitting an indication of the determined contention window size to the UE.

16 Claims, 31 Drawing Sheets

Related U.S. Application Data

(60) Provisional application No. 62/365,291, filed on Jul. 21, 2016.

(51) Int. Cl.

| | | |
|---|---|---|
| *H04W 72/04* | (2009.01) | |
| *H04L 1/00* | (2006.01) | |
| *H04L 1/18* | (2006.01) | |
| *H04W 68/00* | (2009.01) | |
| *H04W 74/00* | (2009.01) | |
| *H04L 5/00* | (2006.01) | |
| *H04W 28/02* | (2009.01) | |
| *H04W 16/14* | (2009.01) | |
| *H04W 52/02* | (2009.01) | |
| *H04W 52/14* | (2009.01) | |
| *H04W 52/36* | (2009.01) | |
| *H04W 56/00* | (2009.01) | |
| *H04W 74/08* | (2009.01) | |

(52) U.S. Cl.
CPC .......... *H04L 1/0009* (2013.01); *H04L 1/0013* (2013.01); *H04L 1/18* (2013.01); *H04L 1/1825* (2013.01); *H04L 1/1861* (2013.01); *H04L 5/005* (2013.01); *H04L 5/0048* (2013.01); *H04L 5/0051* (2013.01); *H04L 5/0053* (2013.01); *H04L 5/0055* (2013.01); *H04W 16/14* (2013.01); *H04W 28/0278* (2013.01); *H04W 52/0216* (2013.01); *H04W 52/146* (2013.01); *H04W 52/367* (2013.01); *H04W 56/0005* (2013.01); *H04W 68/005* (2013.01); *H04W 72/042* (2013.01); *H04W 72/0413* (2013.01); *H04W 72/1226* (2013.01); *H04W 72/1268* (2013.01); *H04W 72/1284* (2013.01); *H04W 72/1289* (2013.01); *H04W 72/14* (2013.01); *H04W 74/006* (2013.01); *H04W 74/085* (2013.01); *H04Q 2213/13215* (2013.01); *Y02D 30/70* (2020.08)

(56) References Cited

U.S. PATENT DOCUMENTS

| | | | |
|---|---|---|---|
| 2015/0009950 | A1 | 1/2015 | Sundberg et al. |
| 2015/0215882 | A1 | 7/2015 | Khoryaev et al. |
| 2016/0127098 | A1 | 5/2016 | Ng et al. |
| 2016/0192396 | A1* | 6/2016 | Ng .................... H04W 74/0808 370/329 |
| 2016/0309498 | A1 | 10/2016 | Luo et al. |
| 2016/0309512 | A1 | 10/2016 | Li et al. |
| 2016/0345326 | A1 | 11/2016 | Yerramalli et al. |
| 2016/0345344 | A1* | 11/2016 | Larsson ............ H04W 72/1263 |
| 2016/0360553 | A1 | 12/2016 | Cheng et al. |
| 2016/0366689 | A1 | 12/2016 | Zhang et al. |
| 2017/0013565 | A1 | 1/2017 | Pelletier et al. |
| 2017/0019909 | A1 | 1/2017 | Si et al. |
| 2017/0079013 | A1 | 3/2017 | Noh et al. |
| 2017/0171897 | A1 | 6/2017 | Ryu et al. |
| 2017/0215206 | A1 | 7/2017 | Cheng et al. |
| 2017/0238342 | A1 | 8/2017 | Yang et al. |
| 2017/0280475 | A1 | 9/2017 | Yerramalli et al. |
| 2017/0280476 | A1 | 9/2017 | Yerramalli et al. |
| 2017/0318595 | A1 | 11/2017 | Dinan et al. |
| 2017/0339711 | A1 | 11/2017 | Belghoul et al. |
| 2017/0353972 | A1 | 12/2017 | Babaei et al. |
| 2018/0027554 | A1 | 1/2018 | Yerramalli et al. |
| 2018/0027582 | A1 | 1/2018 | Yerramalli et al. |
| 2018/0124749 | A1* | 5/2018 | Park .................... H04W 74/08 |
| 2018/0152954 | A1 | 5/2018 | Golitschek Edler Von Elbwart et al. |
| 2018/0205534 | A1* | 7/2018 | Yi .................... H04L 5/1469 |
| 2018/0213563 | A1 | 7/2018 | Yang et al. |
| 2018/0235007 | A1 | 8/2018 | Gou et al. |
| 2018/0255576 | A1 | 9/2018 | Bhorkar et al. |
| 2018/0255578 | A1 | 9/2018 | Kim et al. |
| 2018/0279386 | A1 | 9/2018 | Liu et al. |
| 2018/0288805 | A1 | 10/2018 | Bhorkar et al. |
| 2019/0014596 | A1 | 1/2019 | Yang et al. |
| 2019/0036831 | A1 | 1/2019 | Li et al. |
| 2019/0053274 | A1 | 2/2019 | Kim et al. |
| 2019/0150194 | A1 | 5/2019 | Kim et al. |
| 2019/0150196 | A1 | 5/2019 | Koorapaty et al. |
| 2019/0239222 | A1 | 8/2019 | Yerramalli et al. |
| 2019/0239223 | A1 | 8/2019 | Yerramalli et al. |
| 2019/0239224 | A1 | 8/2019 | Yerramalli et al. |
| 2019/0246412 | A1 | 8/2019 | Noh et al. |
| 2019/0297644 | A1 | 9/2019 | Babaei et al. |
| 2019/0313450 | A1 | 10/2019 | Mukherjee et al. |
| 2020/0015264 | A1 | 1/2020 | Noh et al. |
| 2020/0196307 | A1 | 6/2020 | Yerramalli |

FOREIGN PATENT DOCUMENTS

| | | |
|---|---|---|
| WO | WO-2015020604 A1 | 2/2015 |
| WO | WO-2015116866 A1 | 8/2015 |
| WO | WO-2016048593 A1 | 3/2016 |
| WO | WO-2016069144 A1 | 5/2016 |

OTHER PUBLICATIONS

Dahlman E., et al., "Uplink Physical-Layer Processing (Chapter 11)", In: "4G LTE/LTE-Advanced for Mobile Broadband", Mar. 21, 2011 (Mar. 21, 2011), Elsevier, XP055174616, pp. 203-246.

Ericsson, et al., "WF on MCOT limit Signaling and Modifying LBT Type," 3GPP Draft, R1-165716, 3rd Generation Partnership Project (3GPP) Mobile Competence Centre, 650, Route Des Lucioles, F-06921 Sophia-Antipolis Cedex, France, vol. RAN WG1, No. Nanjing, China, May 23, 2016-May 27, 2016, May 30, 2016, XP051111902, 5 pages, Retrieved from the Internet: URL:http://www.3gpp.org/ftp/tsgran/WG1_RL1/TSGR1_85/Docs/ [retrieved on May 30, 2016].

Huawei et al., "Contention Window Size Adjustment for UL Category 4 LBT for eLAA", 3GPP Draft; R1-162129, 3rd Generation Partnership Project (3GPP), Mobile Competence Centre; 650, Route Des Lucioles; F-06921 Sophia-Anti Polls Cedex; France, vol. RAN WG1, No. Busan, Korea; Apr. 2, 2016, XP051079976, Retrieved from the Internet: URL:http://www.3gpp.org/ftp/tsg_ran/WG1_RL1/TSGR1_84b/Docs/ [retrieved on Apr. 2, 2016], 4 pages.

Huawei et al., "Contention Window Size Adjustment for UL Category 4 LBT for eLAA", 3rd Generation Partnership Project (3GPP), Mobile Competence Centre; 650, Route Des Lucioles; F-06921 Sophia-Anti Polls Cedex; France, vol. RAN WG1, No. Nanjing, China; R1-164073, May 14, 2016, XP051096611, Retrieved from the Internet: URL:http://www.3gpp.org/ftp/tsg_ran/WG1_RL1/TSGR1_85/Docs/ [retrieved on May 14, 2016], 4 pages.

Huawei et al., "Other Issues Related to LBT for eLAA", 3GPP Draft; R1-160741, 3rd Generation Partnership Project (3GPP), Mobile Competence Centre; 650, Route Des Lucioles; F-06921 Sophia-Anti Polls Cedex; France, vol. RAN WG1, No. St Julian's, Malta; Feb. 14, 2016, XP051054068, Retrieved from the Internet: URL:http://www.3gpp.org/ftp/Meetings_3GPP_SYNC/RAN1/Docs/ [retrieved on Feb. 14, 2016], 5 pages.

Huawei et al., "QoS Control in LAA UL Operation," 3GPP Draft; R2-151176, 3rd Generation Partnership Project (3GPP), Mobile Competence Centre ; 650, Route Des Lucioles ; F-06921 Sophia-Antipolis Cedex ; France vol. RAN WG2, No. Bratislava, Slovakia; Apr. 20, 2015-Apr. 24, 2015 Apr. 19, 2015 (Apr. 19, 2015), XP050936150, Retrieved from the Internet: URL:http://www.3gpp.org/ftp/Meetings_3GPP_SYNC/RAN2/Docs/ [retrieved on Apr. 19, 2015].

International Search Report and Written Opinion—PCT/US2017/041324—ISA/EPO—dated Feb. 20, 2018 (164111U2WO).

LG Electronics: "Further Details on Channel Access in LAA UL", 3GPP Draft; R1-164503 LBT, 3rd Generation Partnership Project (3GPP), Mobile Competence Centre; 650, Route Des Lucioles; F-06921 Sophia-Anti Polls Cedex; France, vol. RAN WG1, No.

(56) References Cited

OTHER PUBLICATIONS

Nanjing, China; May 14, 2016, XP051096418, Retrieved from the Internet: URL:http://www.3gpp.org/ftp/tsg_ran/WG1_RL1/TSGR1_85/Docs/ [retrieved on May 14, 2016], 8 pages.

LG Electronics: "LBT Schemes in LAA UL", 3GPP Draft; R1-162473, 3rd Generation Partnership Project (3GPP), Mobile Competence Centre; 650, Route Des Lucioles; F-06921 Sophia-Anti Polls Cedex; France, vol. RAN WG1, No. Busan, Korea; Apr. 2, 2016, XP051080211, Retrieved from the Internet: URL:http://www.3gpp.org/ftp/tsg_ran/WG1_RL1/TSGR1_84b/Docs/ [retrieved on Apr. 2, 2016], 11 pages.

LG Electronics: "LBT schemes in LAA UL", R1-160630, 3rd Generation Partnership Project (3GPP), Mobile Competence Centre; 650, Route Des Lucioles; F-06921 Sophia-Anti Polls Cedex; France, vol. RAN WG1, No. St Julian's, Malta; Feb. 14, 2016, XP051053959, Retrieved from the Internet: URL:http://www.3gpp.org/ftp/Meetings_3GPP_SYNC/RAN1/Docs/, 10 pages.

Nokia et al., "Channel Access for LAA UL", 3GPP Draft; R1-164990, 3rd Generation Partnership Project (3GPP), Mobile Competence Centre; 650, Route Des Lucioles; F-06921 Sophia-Anti Polls Cedex; France, vol. RAN WG1, No. Nanjing, China; May 13, 2016, XP051090196, Retrieved from the Internet: URL:http://www.3gpp.org/ftp/tsg_ran/WG1_RL1/TSGR1_85/Docs/ [retrieved on May 13, 2016], 7 pages.

Nokia et al., "WF on the CWS Adjustment at the UE for Cat-4 LBT", 3GPP Draft; R1-165948, 3rd Generation Partnership Project (3GPP), Mobile Competence Centre; 650, Route Des Lucioles; F-06921 Sophia-Anti Polls Cedex; France, vol. RAN WG1, No. Nanjing, China; R1-165948, May 30, 2016, XP051112100, Retrieved from the Internet: URL:http://www.3gpp.org/ftp/tsg_ran/WG1_RL1/TSGR1_85/Docs/, 3 pages.

NTT Docomo: "Multiplexing Scheme for Sounding RS in E-UTRA Uplink", 3GPP Draft; R1-074282, 3rd Generation Partnership Project (3GPP), Mobile Competence Centre; 650, Route Des Lucioles; F-06921 Sophia-Anti Polis Cedex; France, vol. RAN WG1, No. Shanghai, China; Oct. 2, 2007, XP050107801, [retrieved on Oct. 2, 2007], 3 pages.

Partial International Search Report—PCT/US2017/041324—ISA/EPO—dated Oct. 20, 2017 (164111U2WO).

Qualcomm Incorporated: "Coexistence Mechanisms", 3GPP Draft; R1-150476, 3rd Generation Partnership Project (3GPP), Mobile Competence Centre; 650, Route Des Lucioles; F-06921 Sophia-Anti Polls Cedex; France, vol. RAN WG1, No. Athens, Greece, Feb. 9-13, 2015, 4 pages, XP050933684A, Retrieved from the Internet: URL:http://www.3gpp.org/ftp/Meetings_3GPP_SYNC/RAN1/Docs/ [retrieved on Feb. 8, 2015].

Qualcomm Incorporated: "Remaining Details of UL LBT," 3GPP Draft, R1-166255, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016, 8 pages, XP051125296, URL:http://www.3gpp.org/ftp/Meetings_3GPP_SYNC/RAN1/Docs/ [retrieved on Aug. 21, 2016].

Qualcomm Incorporated: "Remaining Details of Window Adaptation Trigger Mechanism", 3GPP Draft; R1-157038, 3rd Generation Partnership Project (3GPP), Mobile Competence Centre; 650, Route Des Lucioles; F-06921 Sophia-Anti Polls Cedex; France, vol. RAN WG1, No. Anaheim, USA; Nov. 15, 2015, XP051003341, Retrieved from the Internet: URL:http://www.3gpp.org/ftp/Meetings_3GPP_SYNC/RAN1/Docs/ [retrieved on Nov. 15, 2015], 2 pages.

Qualcomm Incorporated: "SRS Transmission on TDD CCs without PUSCH", 3GPP Draft; R1-164444, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016, XP051089977, Retrieved from the Internet: URL:http://www.3gpp.org/ftp/tsg_ran/WG1_RL1/TSGR1_85/Docs/ [retrieved on May 14, 2016], 5 pages.

Qualcomm Incorporated: "UL Channel Access for eLAA", 3GPP Draft; R1-164415, 3rd Generation Partnership Project (3GPP), Mobile Competence Centre; 650, Route Des Lucioles; F-06921 Sophia-Anti Polis Cedex; France, vol. RAN WG1, No. Nanjing, China; May 14, 2016, XP051096464, Retrieved from the Internet: URL:http://www.3gpp.org/ftp/tsg_ran/WG1_RL1/TSGR1_85/Docs/, 3 pages.

Samsung., "Discussion on Shared MCOT and LBT Procedure," 3GPP Draft, R1-164752, 3rd Generation Partnership Project (3GPP), Mobile Competence Centre, 650, Route Lucioles, F-06921 Sophia-Antipolis, France, vol. RAN WG1, No. Nanjing, China, May 23, 2016-May 27, 2016, May 14, 2016, 4 pages, XP051096332, Retrieved from the Internet: URL:http:jjwww.3gpp.org/ftp/tsg_ran/WG1_RL1/TSGR1_85/Docs/ [retrieved on May 14, 2016].

ZTE., "UL Framework for LAA", 3GPP Draft, R1-155245 UL Framework for LAA, 3rd Generation Partnership Project (3GPP), Mobile Competence Centre, 650, Route Des Lucioles, F-06921, Sophia-Antipolis Cedex, France, vol. RAN WG1, No. Malmo, Sweden, 20151905-Oct. 9, 2015, Oct. 4, 2015, XP051002210, pp. 1-6. Retrieved from the Internet: URL:http://www.3gpp.org/ftp/Meetings_3GPP_SYNC/RAN1/Docs/.

European Search Report—EP20173935—Search Authority—Munich—dated Aug. 17, 2020 (164111U1EPD1).

\* cited by examiner

TECHNIQUES FOR COMMUNICATING ON AN UPLINK IN A SHARED RADIO FREQUENCY SPECTRUM BAND

CROSS REFERENCES

The present Application for Patent is a Divisional of U.S. patent application Ser. No. 15/608,858 by Yerramalli et al., entitled "Techniques For Communicating on an Uplink in a Shared Radio Frequency Spectrum Band" filed May 30, 2017, which claims priority to U.S. Provisional Patent Application No. 62/365,291 by Yerramalli et al., entitled "Techniques For Communicating on an Uplink in a Shared Radio Frequency Spectrum Band," filed Jul. 21, 2016, each of which are assigned to the assignee hereof and expressly incorporated by reference herein in their entirety.

BACKGROUND

Field of the Disclosure

The present disclosure relates to, for example, wireless communication systems, and more particularly to techniques for communicating on an uplink in a shared radio frequency spectrum band.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UEs). A base station may communicate with UEs on downlink channels (e.g., for transmissions from a base station to a UE) and uplink channels (e.g., for transmissions from a UE to a base station).

Some modes of communication may enable communication between a base station and a UE over a shared radio frequency spectrum band, or over different radio frequency spectrum bands (e.g., a dedicated radio frequency spectrum band and a shared radio frequency spectrum band). With increasing data traffic in cellular networks that use a dedicated radio frequency spectrum band, offloading of at least some data traffic to a shared radio frequency spectrum band may provide a mobile network operator (MNO) (or cellular operator) with opportunities for enhanced data transmission capacity. Use of a shared radio frequency spectrum band may also provide service in areas where access to a dedicated radio frequency spectrum band is unavailable.

SUMMARY

Before transmitting an uplink transmission in a shared radio frequency spectrum band, a UE may contend for access to the shared radio frequency spectrum band by performing a listen before talk (LBT) procedure. The LBT procedure may be performed during a contention window having a contention window size. The contention window size may be adjusted (e.g., increased or decreased) based at least in part on a success or failure of transmissions made to a network access device over the shared radio frequency spectrum band. Techniques are described in the present disclosure for adjusting a contention window size, used by a UE, based at least in part on determinations made by the UE or by a network access device. Techniques are also described for configuring other aspects of uplink transmissions, and other aspects of communications over a shared radio frequency spectrum band.

In one example, a method for wireless communication at a network access device is described. The method may include detecting a first reference signal received from a UE in a reference scheduled transmission burst including a plurality of contiguous transmission time intervals (TTIs) received over a shared radio frequency spectrum band, identifying a reference TTI in which the first reference signal is received, and determining a contention window size usable by the UE to contend for access to the shared radio frequency spectrum band. The determined contention window size may be based at least in part on: a triggering of aperiodic channel state information (CSI) without a physical uplink shared channel (PUSCH) on the reference TTI, a decoding of a physical uplink control channel (PUCCH) with cyclic redundancy check (CRC) scheduled in the reference TTI, a decoding of a random access preamble scheduled on a physical random access channel (PRACH) in the reference TTI, a decoding of a first scheduled uplink transmission associated with a random access procedure and received in the reference TTI, or a combination thereof. The method may also include transmitting an indication of the determined contention window size to the UE.

In one example, an apparatus for wireless communication at a network access device is described. The apparatus may include means for detecting a first reference signal received from a UE in a reference scheduled transmission burst including a plurality of contiguous TTIs received over a shared radio frequency spectrum band, means for identifying a reference TTI in which the first reference signal is received, and means for determining a contention window size usable by the UE to contend for access to the shared radio frequency spectrum band. The determined contention window size may be based at least in part on: a triggering of aperiodic CSI without a PUSCH on the reference TTI, a decoding of a PUCCH with CRC scheduled in the reference TTI, a decoding of a random access preamble scheduled on a PRACH in the reference TTI, a decoding of a first scheduled uplink transmission associated with a random access procedure and received in the reference TTI, or a combination thereof. The apparatus may also include means for transmitting an indication of the determined contention window size to the UE.

In one example, another apparatus for wireless communication at a network access device is described. The apparatus may include a processor, and memory in electronic communication with the processor. The processor and the memory may be configured to detect a first reference signal received from a UE in a reference scheduled transmission burst including a plurality of contiguous TTIs received over a shared radio frequency spectrum band, to identify a reference TTI in which the first reference signal is received, and to determine a contention window size usable by the UE to contend for access to the shared radio frequency spectrum band. The determined contention window size may be based at least in part on: a triggering of aperiodic CSI without a PUSCH on the reference TTI, a decoding of a PUCCH with CRC scheduled in the reference TTI, a decoding of a random access preamble scheduled on a PRACH in the reference TTI, a decoding of a first scheduled uplink transmission associated with a random access procedure and received in the reference TTI, or a combination thereof. The processor and the memory may also be configured to transmit an indication of the determined contention window size to the UE.

In one example, a non-transitory computer-readable medium storing computer-executable code for wireless communication at a network access device is described. The code may be executable by a processor to detect a first reference signal received from a UE in a reference scheduled transmission burst including a plurality of contiguous TTIs received over a shared radio frequency spectrum band, to identify a reference TTI in which the first reference signal is received, and to determine a contention window size usable by the UE to contend for access to the shared radio frequency spectrum band. The determined contention window size may be based at least in part on: a triggering of aperiodic CSI without a PUSCH on the reference TTI, a decoding of a PUCCH with CRC scheduled in the reference TTI, a decoding of a random access preamble scheduled on a PRACH in the reference TTI, a decoding of a first scheduled uplink transmission associated with a random access procedure and received in the reference TTI, or a combination thereof. The code may also be executable by the processor to transmit an indication of the determined contention window size to the UE.

In one example, a method for wireless communication at a UE is described. The method may include receiving at least one uplink grant for a reference scheduled transmission burst including a plurality of contiguous TTIs transmitted over a shared radio frequency spectrum band. At least a first uplink grant in the plurality of uplink grants may include: a first indication that the first uplink grant is associated with a first scheduled TTI of the reference scheduled transmission burst, a second indication of a position of the first scheduled TTI within the reference scheduled transmission burst, or a combination thereof. The method may also include transmitting during at least one TTI of the reference scheduled transmission burst, in accordance with the at least one uplink grant. The transmitting may begin during a first transmission TTI. The method may also include receiving an indication of a reference TTI, the reference TTI being used for transmission during the reference scheduled transmission burst, and determining a contention window size usable by the UE to contend for access to the shared radio frequency spectrum band. The contention window size may be determined based at least in part on a relationship between the first scheduled TTI, the reference TTI, and the first transmission TTI. In some cases, the relationship may include the first transmission TTI being earlier than the reference TTI, the first transmission TTI being later than the reference TTI, or the first transmission TTI being the same as the reference TTI.

In some examples of the method, each uplink grant for the reference scheduled transmission burst may include an indication of the position of the first scheduled TTI of the reference scheduled transmission burst. In some examples, the indication of the reference TTI may be relative to the first scheduled TTI.

In one example, an apparatus for wireless communication at a UE is described. The apparatus may include means for receiving at least one uplink grant for a reference scheduled transmission burst including a plurality of contiguous TTIs transmitted over a shared radio frequency spectrum band. At least a first uplink grant in the plurality of uplink grants may include: a first indication that the first uplink grant is associated with a first scheduled TTI of the reference scheduled transmission burst, a second indication of a position of the first scheduled TTI within the reference scheduled transmission burst, or a combination thereof. The apparatus may also include means for transmitting during at least one TTI of the reference scheduled transmission burst, in accordance with the at least one uplink grant. The transmitting may begin during a first transmission TTI. The apparatus may also include means for receiving an indication of a reference TTI, the reference TTI being used for transmission during the reference scheduled transmission burst, and means for determining a contention window size usable by the UE to contend for access to the shared radio frequency spectrum band. The contention window size may be determined based at least in part on a relationship between the first scheduled TTI, the reference TTI, and the first transmission TTI. In some cases, the relationship may include the first transmission TTI being earlier than the reference TTI, the first transmission TTI being later than the reference TTI, or the first transmission TTI being the same as the reference TTI.

In one example, another apparatus for wireless communication at a UE is described. The apparatus may include a processor, and memory in electronic communication with the processor. The processor and the memory may be configured to receive at least one uplink grant for a reference scheduled transmission burst including a plurality of contiguous TTIs transmitted over a shared radio frequency spectrum band. At least a first uplink grant in the plurality of uplink grants may include: a first indication that the first uplink grant is associated with a first scheduled TTI of the reference scheduled transmission burst, a second indication of a position of the first scheduled TTI within the reference scheduled transmission burst, or a combination thereof. The processor and the memory may also be configured to transmit during at least one TTI of the reference scheduled transmission burst, in accordance with the at least one uplink grant. The transmitting may begin during a first transmission TTI. The processor and the memory may also be configured to receive an indication of a reference TTI, the reference TTI being used for transmission during the reference scheduled transmission burst, and to determine a contention window size usable by the UE to contend for access to the shared radio frequency spectrum band. The contention window size may be determined based at least in part on a relationship between the first scheduled TTI, the reference TTI, and the first transmission TTI. In some cases, the relationship may include the first transmission TTI being earlier than the reference TTI, the first transmission TTI being later than the reference TTI, or the first transmission TTI being the same as the reference TTI.

In one example, a non-transitory computer-readable medium storing computer-executable code for wireless communication at a UE is described. The code may be executable by a processor to receive at least one uplink grant for a reference scheduled transmission burst including a plurality of contiguous TTIs transmitted over a shared radio frequency spectrum band. At least a first uplink grant in the plurality of uplink grants may include: a first indication that the first uplink grant is associated with a first scheduled TTI of the reference scheduled transmission burst, a second indication of a position of the first scheduled TTI within the reference scheduled transmission burst, or a combination thereof. The code may also be executable by the processor to transmit during at least one TTI of the reference scheduled transmission burst, in accordance with the at least one uplink grant. The transmitting may begin during a first transmission TTI. The code may also be executable by the processor to receive an indication of a reference TTI, the reference TTI being used for transmission during the reference scheduled transmission burst, and to determine a contention window size usable by the UE to contend for access to the shared radio frequency spectrum band. The contention window size may be determined based at least in part on a relationship between the first scheduled TTI, the reference TTI, and the first transmission TTI. In some cases, the relationship may include the first transmission TTI being earlier than the reference TTI, the first transmission TTI being later than the reference TTI, or the first transmission TTI being the same as the reference TTI.

In one example, another method for wireless communication at a UE is described. The method may include transmitting a reference scheduled transmission burst including a plurality of contiguous TTIs over a shared radio frequency spectrum band, and identifying a hybrid automatic repeat request (HARQ) process corresponding to a reference TTI. The reference TTI may be a first TTI of the plurality of contiguous TTIs for which a HARQ acknowledgement is received. The method may also include identifying an instance of the HARQ process associated with a TTI subsequent to the reference TTI. The instance of the HARQ process may be identified based at least in part on: whether the TTI is within the reference scheduled transmission burst or a subsequent transmission burst, whether the TTI includes aperiodic CSI without a PUSCH, or a combination thereof. The method may also include determining a contention window size used to contend for access to the shared radio frequency spectrum band, in which the determining based at least in part on a state of a new data indicator (NDI) associated with the identified instance of the HARQ process.

In one example, another apparatus for wireless communication at a UE is described. The apparatus may include means for transmitting a reference scheduled transmission burst including a plurality of contiguous TTIs over a shared radio frequency spectrum band, and means for identifying a HARQ process corresponding to a reference TTI. The reference TTI may be a first TTI of the plurality of contiguous TTIs for which a HARQ acknowledgement is received. The apparatus may also include means for identifying an instance of the HARQ process associated with a TTI subsequent to the reference TTI. The instance of the HARQ process may be identified based at least in part on: whether the TTI is within the reference scheduled transmission burst or a subsequent transmission burst, whether the TTI includes aperiodic CSI without a PUSCH, or a combination thereof. The apparatus may also include means for determining a contention window size used to contend for access to the shared radio frequency spectrum band, in which the determining is based at least in part on a state of a NDI associated with the identified instance of the HARQ process.

In one example, another apparatus for wireless communication at a UE is described. The apparatus may include a processor, and memory in electronic communication with the processor. The processor and the memory may be configured to transmit a reference scheduled transmission burst including a plurality of contiguous TTIs over a shared radio frequency spectrum band, and to identify a HARQ process corresponding to a reference TTI. The reference TTI may be a first TTI of the plurality of contiguous TTIs for which a HARQ acknowledgement is received. The processor and the memory may also be configured to identify an instance of the HARQ process associated with a TTI subsequent to the reference TTI. The instance of the HARQ process may be identified based at least in part on: whether the TTI is within the reference scheduled transmission burst or a subsequent transmission burst, whether the TTI includes aperiodic CSI without a PUSCH, or a combination thereof. The processor and the memory may also be configured to determine a contention window size used to contend for access to the shared radio frequency spectrum band, in which the determining is based at least in part on a state of a NDI associated with the identified instance of the HARQ process.

In one example, another non-transitory computer-readable medium storing computer-executable code for wireless communication at a UE is described. The code may be executable by a processor to transmit a reference scheduled transmission burst including a plurality of contiguous TTIs over a shared radio frequency spectrum band, and to identify a HARQ process corresponding to a reference TTI. The reference TTI may be a first TTI of the plurality of contiguous TTIs for which a HARQ acknowledgement is received. The code may also be executable by the processor to identify an instance of the HARQ process associated with a TTI subsequent to the reference TTI. The instance of the HARQ process may be identified based at least in part on: whether the TTI is within the reference scheduled transmission burst or a subsequent transmission burst, whether the TTI includes aperiodic CSI without a PUSCH, or a combination thereof. The code may also be executable by the processor to determine a contention window size used to contend for access to the shared radio frequency spectrum band, the determining based at least in part on a state of a NDI associated with the identified instance of the HARQ process.

In one example, another method for wireless communication at a UE is described. The method may include receiving, in a common physical downlink control channel (CPDCCH), a first indication of a remaining channel occupancy time (RCOT) for which a network access device has access to a shared radio frequency spectrum band, and a second indication of a pause time during which the network access device will not transmit over the shared radio frequency spectrum band. The method may also include determining, based at least in part on the RCOT, whether a size of an uplink transmission of the UE allows the UE to transmit the uplink transmission within a maximum channel occupancy time (MCOT) for which the network access device has access to the shared radio frequency spectrum band, and entering a power saving mode during at least a part of the pause time.

In some examples of the method, the RCOT may include the pause time. In some examples, the RCOT may not include the pause time.

In one example, another apparatus for wireless communication at a UE is described. The apparatus may include means for receiving, in a CPDCCH, a first indication of a RCOT for which a network access device has access to a shared radio frequency spectrum band, and a second indication of a pause time during which the network access device will not transmit over the shared radio frequency spectrum band. The apparatus may also include means for determining, based at least in part on the RCOT, whether a size of an uplink transmission of the UE allows the UE to transmit the uplink transmission within a MCOT for which the network access device has access to the shared radio frequency spectrum band, and means for entering a power saving mode during at least a part of the pause time.

In one example, another apparatus for wireless communication at a UE is described. The apparatus may include a processor, and memory in electronic communication with the processor. The processor and the memory may be configured to receive, in a CPDCCH, a first indication of a RCOT for which a network access device has access to a shared radio frequency spectrum band, and a second indication of a pause time during which the network access device will not transmit over the shared radio frequency spectrum band. The processor and the memory may also be configured to determine, based at least in part on the RCOT, whether a size of an uplink transmission of the UE allows the UE to transmit the uplink transmission within a MCOT for which the network access device has access to the shared radio frequency spectrum band, and to enter a power saving mode during at least a part of the pause time.

In one example, another non-transitory computer-readable medium storing computer-executable code for wireless communication at a UE is described. The code may be executable by a processor to receive, in a CPDCCH, a first indication of a RCOT for which a network access device has access to a shared radio frequency spectrum band, and a second indication of a pause time during which the network access device will not transmit over the shared radio frequency spectrum band. The code may also be executable by the processor to determine, based at least in part on the RCOT, whether a size of an uplink transmission of the UE allows the UE to transmit the uplink transmission within a MCOT for which the network access device has access to the shared radio frequency spectrum band, and to enter a power saving mode during at least a part of the pause time.

In one example, another method for wireless communication at a UE is described. The method may include receiving, in a downlink TTI of a scheduled transmission burst received over a shared radio frequency spectrum band, an indication of a downlink-uplink TTI configuration beginning with the downlink TTI; and determining, based at least in part on the downlink-uplink TTI configuration beginning with the downlink TTI, a timing of a next downlink TTI in the scheduled transmission burst. In some cases, the downlink-uplink configuration may include a number of upcoming downlink TTIs, a number of uplink TTIs, or a combination thereof.

In some examples, the method may include receiving, in each of at least one additional downlink TTI of the scheduled transmission burst, an additional indication of an additional downlink-uplink TTI configuration following the additional downlink TTI. In some examples, the method may include receiving, in the downlink TTI, at least one of: a second indication of a downlink TTI duration, a third indication of an uplink TTI duration, or a combination thereof. In some examples, the downlink TTI may include a downlink subframe and the downlink-uplink TTI configuration may include a downlink-uplink subframe configuration.

In one example, another apparatus for wireless communication at a UE is described. The apparatus may include means for receiving, in a downlink TTI of a scheduled transmission burst received over a shared radio frequency spectrum band, an indication of a downlink-uplink TTI configuration beginning with the downlink TTI; and means for determining, based at least in part on the downlink-uplink TTI configuration beginning with the downlink TTI, a timing of a next downlink TTI in the scheduled transmission burst. In some cases, the downlink-uplink configuration may include a number of upcoming downlink TTIs, a number of uplink TTIs, or a combination thereof.

In one example, another apparatus for wireless communication at a UE is described. The apparatus may include a processor, and memory in electronic communication with the processor. The processor and the memory may be configured to receive, in a downlink TTI of a scheduled transmission burst received over a shared radio frequency spectrum band, an indication of a downlink-uplink TTI configuration beginning with the downlink TTI; and to determine, based at least in part on the downlink-uplink TTI configuration beginning with the downlink TTI, a timing of a next downlink TTI in the scheduled transmission burst. In some cases, the downlink-uplink configuration may include a number of upcoming downlink TTIs, a number of uplink TTIs, or a combination thereof.

In one example, another non-transitory computer-readable medium storing computer-executable code for wireless communication at a UE is described. The code may be executable by a processor to wireless communication at a UE, the code executable by a processor to receive, in a downlink TTI of a scheduled transmission burst received over a shared radio frequency spectrum band, an indication of a downlink-uplink TTI configuration beginning with the downlink TTI; and to determine, based at least in part on the downlink-uplink TTI configuration beginning with the downlink TTI, a timing of a next downlink TTI in the scheduled transmission burst. In some cases, the downlink-uplink configuration may include a number of upcoming downlink TTIs, a number of uplink TTIs, or a combination thereof.

In one example, another method for wireless communication at a UE is described. The method may include transmitting a buffer status report (BSR); receiving from a network access device, in response to transmitting the BSR, an indicator of a LBT priority class boundary; selecting a LBT priority class based at least in part on a type of data to be transmitted over a shared radio frequency spectrum band and the LBT priority class boundary; and contending for access to the shared radio frequency spectrum band based at least in part on the selected LBT priority class.

In some examples of the method, the LBT priority class boundary may include at least one of: a highest LBT priority class usable by the UE, a lowest LBT priority class usable by the UE, or a combination thereof.

In one example, another apparatus for wireless communication at a UE is described. The apparatus may include means for transmitting a BSR; means for receiving from a network access device, in response to transmitting the BSR, an indicator of a LBT priority class boundary; means for selecting a LBT priority class based at least in part on a type of data to be transmitted over a shared radio frequency spectrum band and the lowest LBT priority class boundary; and means for contending for access to the shared radio frequency spectrum band based at least in part on the selected LBT priority class.

In one example, another apparatus for wireless communication at a UE is described. The apparatus may include a processor, and memory in electronic communication with the processor. The processor and the memory may be configured to transmit a BSR; receive from a network access device, in response to transmitting the BSR, an indicator of a LBT priority class boundary; to select a LBT priority class based at least in part on a type of data to be transmitted over a shared radio frequency spectrum band and the lowest LBT priority class boundary; and to contend for access to the shared radio frequency spectrum band based at least in part on the selected LBT priority class.

In one example, another non-transitory computer-readable medium storing computer-executable code for wireless communication at a UE is described. The code may be executable by a processor to transmit a BSR; to receive from a network access device, in response to transmitting the BSR, an indicator of a LBT priority class boundary; to select a LBT priority class based at least in part on a type of data to be transmitted over a shared radio frequency spectrum band and the lowest LBT priority class boundary; and to contend for access to the shared radio frequency spectrum band based at least in part on the selected LBT priority class.

In one example, another method for wireless communication at a UE is described. The method may include transmitting a first type of BSR including an indication of an amount of data to be transmitted for each of a plurality of LBT priority classes; and receiving from a network access device, in response to transmitting the first BSR, an indication of a LBT priority class to be used by the UE when contending for access to a shared radio frequency spectrum band.

In some examples, the method may include selecting the first type of BSR from a plurality of BSR types including at least the first type of BSR and a second type of BSR. In some examples, the second type of BSR may include a Long Term Evolution (LTE)/LTE-Advanced (LTE-A) type of BSR. In some examples, the first type of BSR may be selected based at least in part on a BSR selection criterion. In some examples, the BSR selection criterion may include receiving data to transmit, in which the data is associated with a LBT priority class satisfying a threshold LBT priority class.

In one example, another apparatus for wireless communication at a UE is described. The apparatus may include means for transmitting a first type of BSR including an indication of an amount of data to be transmitted for each of a plurality of LBT priority classes; and means for receiving from a network access device, in response to transmitting the first type of BSR, an indication of a LBT priority class to be used by the UE when contending for access to a shared radio frequency spectrum band.

In one example, another apparatus for wireless communication at a UE is described. The apparatus may include a processor, and memory in electronic communication with the processor. The processor and the memory may be configured to transmit a first type of BSR including an indication of an amount of data to be transmitted for each of a plurality of LBT priority classes; and to receive from a network access device, in response to transmitting the first type of BSR, an indication of a LBT priority class to be used by the UE when contending for access to a shared radio frequency spectrum band.

In one example, another non-transitory computer-readable medium storing computer-executable code for wireless communication at a UE is described. The code may be executable by a processor to transmit a first type of BSR including an indication of an amount of data to be transmitted for each of a plurality of LBT priority classes; and to receive from a network access device, in response to transmitting the first type of BSR, an indication of a LBT priority class to be used by the UE when contending for access to a shared radio frequency spectrum band.

In one example, another method for wireless communication at a UE is described. The method may include receiving a first uplink grant for transmitting over a shared radio frequency spectrum band, in which the first uplink grant associated with a first LBT priority class; performing a first LBT procedure based at least in part on the first LBT priority class to contend for access to the shared radio frequency spectrum band, in which the first LBT procedure concludes at a LBT state; determining, based at least in part on the LBT state, to not transmit over the shared radio frequency spectrum band in accordance with the first uplink grant; receiving a second uplink grant for transmitting over the shared radio frequency spectrum band, in which the second uplink grant associated with a second LBT priority class; and performing a second LBT procedure based at least in part on the second LBT priority class, the first LBT priority class, and the LBT state to contend for access to the shared radio frequency spectrum band.

In some examples, the method may include determining the first LBT priority class and the second LBT priority class are a same LBT priority class, and initializing the second LBT procedure based at least in part on the LBT state. In some examples, the method may include determining the first LBT priority class and the second LBT priority class are different LBT priority classes, adjusting the LBT state based at least in part on a difference between the first LBT priority class and the second LBT priority class, and initializing the second LBT procedure based at least in part on the adjusted LBT state.

In one example, another apparatus for wireless communication at a UE is described. The apparatus may include means for receiving a first uplink grant for transmitting over a shared radio frequency spectrum band, in which the first uplink grant associated with a first LBT priority class; means for performing a first LBT procedure based at least in part on the first LBT priority class to contend for access to the shared radio frequency spectrum band, in which the first LBT procedure concludes at a LBT state; means for determining, based at least in part on the LBT state, to not transmit over the shared radio frequency spectrum band in accordance with the first uplink grant; means for receiving a second uplink grant for transmitting over the shared radio frequency spectrum band, in which the second uplink grant associated with a second LBT priority class; and means for performing a second LBT procedure based at least in part on the second LBT priority class, the first LBT priority class, and the LBT state to contend for access to the shared radio frequency spectrum band.

In one example, another apparatus for wireless communication at a UE is described. The apparatus may include a processor, and memory in electronic communication with the processor. The processor and the memory may be configured to receive a first uplink grant for transmitting over a shared radio frequency spectrum band, in which the first uplink grant associated with a first LBT priority class; to perform a first LBT procedure based at least in part on the first LBT priority class to contend for access to the shared radio frequency spectrum band, in which the first LBT procedure concluding at a LBT state; to determine, based at least in part on the LBT state, to not transmit over the shared radio frequency spectrum band in accordance with the first uplink grant; to receive a second uplink grant for transmitting over the shared radio frequency spectrum band, in which the second uplink grant associated with a second LBT priority class; and to perform a second LBT procedure based at least in part on the second LBT priority class, the first LBT priority class, and the LBT state to contend for access to the shared radio frequency spectrum band.

In one example, another non-transitory computer-readable medium storing computer-executable code for wireless communication at a UE is described. The code may be executable by a processor to receive a first uplink grant for transmitting over a shared radio frequency spectrum band, in which the first uplink grant associated with a first LBT priority class; to perform a first LBT procedure based at least in part on the first LBT priority class to contend for access to the shared radio frequency spectrum band, in which the first LBT procedure concluding at a LBT state; to determine, based at least in part on the LBT state, to not transmit over the shared radio frequency spectrum band in accordance with the first uplink grant; to receive a second uplink grant for transmitting over the shared radio frequency spectrum band, in which the second uplink grant associated with a second LBT priority class; and to perform a second LBT procedure based at least in part on the second LBT priority class, in which the first LBT priority class, and the LBT state to contend for access to the shared radio frequency spectrum band.

In one example, another method for wireless communication at a network access device is described. The method may include identifying feedback received from a UE for a downlink reference TTI of a transmission opportunity (TxOP) over a shared radio frequency spectrum band, in which the TxOP may include at least one downlink TTI and at least one uplink TTI; identifying an uplink TTI, of the TxOP, for which scheduling information is transmitted in the downlink reference TTI; and determining a contention window size usable by the network access device to contend for access to the shared radio frequency spectrum band, for a next TxOP, based at least in part on the identified feedback and a scheduled uplink transmission in the identified uplink TTI.

In some examples, determining the contention window size based at least in part on the scheduled uplink transmission in the identified uplink TTI may include determining the contention window size based at least in part on a decoding of at least one channel including: a scheduled PUSCH, or a scheduled PUCCH, or a scheduled PRACH, or a combination thereof. In some examples, determining the contention window size based at least in part on the decoding of the at least one channel may include determining the contention window size based least in part on acknowledgement/non-acknowledgement (ACK/NACK) feedback for the at least one channel. In some examples, the at least one downlink TTI may include at least one downlink subframe, and the at least one uplink TTI may include at least one uplink subframe.

In one example, another apparatus for wireless communication at a network access device is described. The apparatus may include means for identifying feedback received from a UE for a downlink reference TTI of a TxOP over a shared radio frequency spectrum band, in which the TxOP may include at least one downlink TTI and at least one uplink TTI; means for identifying an uplink TTI, of the TxOP, for which scheduling information is transmitted in the downlink reference TTI; and means for determining a contention window size usable by the network access device to contend for access to the shared radio frequency spectrum band, for a next TxOP, based at least in part on the identified feedback and a scheduled uplink transmission in the identified uplink TTI.

In one example, another apparatus for wireless communication at a network access device is described. The apparatus may include a processor, and memory in electronic communication with the processor. The processor and the memory may be configured to identify feedback received from a UE for a downlink reference TTI of a TxOP over a shared radio frequency spectrum band, in which the TxOP may include at least one downlink TTI and at least one uplink TTI; to identify an uplink TTI, of the TxOP, for which scheduling information is transmitted in the downlink reference TTI; and to determine a contention window size usable by the network access device to contend for access to the shared radio frequency spectrum band, for a next TxOP, based at least in part on the identified feedback and a scheduled uplink transmission in the identified uplink TTI.

In one example, another non-transitory computer-readable medium storing computer-executable code for wireless communication at a network access device is described. The code may be executable by a processor to identify feedback received from a UE for a downlink reference TTI of a TxOP over a shared radio frequency spectrum band, in which the TxOP may include at least one downlink TTI and at least one uplink TTI; to identify an uplink TTI, of the TxOP, for which scheduling information is transmitted in the downlink reference TTI; and to determine a contention window size usable by the network access device to contend for access to the shared radio frequency spectrum band, for a next TxOP, based at least in part on the identified feedback and a scheduled uplink transmission in the identified uplink TTI.

In one example, another method for wireless communication at a UE is described. The method may include receiving scheduling information for an uplink transmission to be made over a plurality of carriers of a shared radio frequency spectrum band, identifying a carrier of the plurality of carriers for which to perform a first type of LBT procedure, performing the first type of LBT procedure for the identified carrier, performing a second type of LBT procedure for each carrier of the plurality of carriers other than the identified carrier, and transmitting the uplink transmission over the plurality of carriers based at least in part on the performance of the first type of LBT procedure for the identified carrier and the performance of the second type of LBT procedure for each carrier other than the identified carrier. The second type of LBT procedure may have a shorter contention window than the first type of LBT procedure.

In some examples of the method, identifying the carrier may include one of: identifying the carrier from an indication received from a network access device, or independently identifying the carrier.

In one example, another apparatus for wireless communication at a UE is described. The apparatus may include means for receiving scheduling information for an uplink transmission to be made over a plurality of carriers of a shared radio frequency spectrum band, means for identifying a carrier of the plurality of carriers for which to perform a first type of LBT procedure, means for performing the first type of LBT procedure for the identified carrier, means for performing a second type of LBT procedure for each carrier of the plurality of carriers other than the identified carrier, and means for transmitting the uplink transmission over the plurality of carriers based at least in part on the performance of the first type of LBT procedure for the identified carrier and the performance of the second type of LBT procedure for each carrier other than the identified carrier. The second type of LBT procedure may have a shorter contention window than the first type of LBT procedure.

In one example, another apparatus for wireless communication at a UE is described. The apparatus may include a processor, and memory in electronic communication with the processor. The processor and the memory may be configured to receive scheduling information for an uplink transmission to be made over a plurality of carriers of a shared radio frequency spectrum band, to identify a carrier of the plurality of carriers for which to perform a first type of LBT procedure, to perform the first type of LBT procedure for the identified carrier, to perform a second type of LBT procedure for each carrier of the plurality of carriers other than the identified carrier, and to transmit the uplink transmission over the plurality of carriers based at least in part on the performance of the first type of LBT procedure for the identified carrier and the performance of the second type of LBT procedure for each carrier other than the identified carrier. The second type of LBT procedure may have a shorter contention window than the first type of LBT procedure.

In one example, another non-transitory computer-readable medium storing computer-executable code for wireless communication at a UE is described. The code may be executable by a processor to receive scheduling information for an uplink transmission to be made over a plurality of carriers of a shared radio frequency spectrum band, to identify a carrier of the plurality of carriers for which to perform a first type of LBT procedure, to perform the first type of LBT procedure for the identified carrier, to perform a second type of LBT procedure for each carrier of the plurality of carriers other than the identified carrier, and to transmit the uplink transmission over the plurality of carriers based at least in part on the performance of the first type of LBT procedure for the identified carrier and the performance of the second type of LBT procedure for each carrier other than the identified carrier. The second type of LBT procedure may have a shorter contention window than the first type of LBT procedure.

In one example, another method for wireless communication at a network access device is described. The method may include scheduling an uplink transmission to be made by a UE over a plurality of carriers of a shared radio frequency spectrum band; and transmitting, to the UE, an indication of a single carrier of the plurality of carriers for which to perform a first type of LBT procedure.

In some examples, transmitting the indication of the single carrier may include: transmitting the indication of the single carrier in uplink downlink control information (DCI) for the single carrier, or transmitting the indication of the single carrier in uplink DCI for each carrier of the plurality of carriers.

In one example, another apparatus for wireless communication at a network access device is described. The apparatus may include means for scheduling an uplink transmission to be made by a UE over a plurality of carriers of a shared radio frequency spectrum band; and means for transmitting, to the UE, an indication of a single carrier of the plurality of carriers for which to perform a first type of LBT procedure.

In one example, another apparatus for wireless communication at a network access device is described. The apparatus may include a processor, and memory in electronic communication with the processor. The processor and the memory may be configured to schedule an uplink transmission to be made by a UE over a plurality of carriers of a shared radio frequency spectrum band; and to transmit, to the UE, an indication of a single carrier of the plurality of carriers for which to perform a first type of LBT procedure.

In one example, another non-transitory computer-readable medium storing computer-executable code for wireless communication at a network access device is described. The code may be executable by a processor to schedule an uplink transmission to be made by a UE over a plurality of carriers of a shared radio frequency spectrum band; and to transmit, to the UE, an indication of a single carrier of the plurality of carriers for which to perform a first type of LBT procedure.

In one example, another method for wireless communication at a UE is described. The method may include identifying a type of LBT procedure to be performed for contending for access to a shared radio frequency spectrum band. The identified type of LBT procedure may include a first type of LBT procedure or a second type of LBT procedure. The method may also include identifying an energy detection threshold associated with the identified type of LBT procedure. The identified energy detection threshold may include a first energy detection threshold for the first type of LBT procedure or a second energy detection threshold for the second type of LBT procedure. The first energy detection threshold may be lower than the second energy detection threshold. The method may also include performing the identified type of LBT procedure based at least in part on the identified energy detection threshold to contend for access to the shared radio frequency spectrum band.

In one example, another apparatus for wireless communication at a UE is described. The apparatus may include means for identifying a type of LBT procedure to be performed for contending for access to a shared radio frequency spectrum band. The identified type of LBT procedure may include a first type of LBT procedure or a second type of LBT procedure. The apparatus may also include means for identifying an energy detection threshold associated with the identified type of LBT procedure. The identified energy detection threshold may include a first energy detection threshold for the first type of LBT procedure or a second energy detection threshold for the second type of LBT procedure. The first energy detection threshold may be lower than the second energy detection threshold. The apparatus may also include means for performing the identified type of LBT procedure based at least in part on the identified energy detection threshold to contend for access to the shared radio frequency spectrum band.

In one example, another apparatus for wireless communication at a UE is described. The apparatus may include a processor, and memory in electronic communication with the processor. The processor and the memory may be configured to identify a type of LBT procedure to be performed for contending for access to a shared radio frequency spectrum band. The identified type of LBT procedure may include a first type of LBT procedure or a second type of LBT procedure. The processor and the memory may be configured to identify an energy detection threshold associated with the identified type of LBT procedure. The identified energy detection threshold may include a first energy detection threshold for the first type of LBT procedure or a second energy detection threshold for the second type of LBT procedure. The first energy detection threshold may be lower than the second energy detection threshold. The processor and the memory may be configured to perform the identified type of LBT procedure based at least in part on the identified energy detection threshold to contend for access to the shared radio frequency spectrum band.

In one example, another non-transitory computer-readable medium storing computer-executable code for wireless communication at a UE is described. The code may be executable by a processor to identify a type of LBT procedure to be performed for contending for access to a shared radio frequency spectrum band. The identified type of LBT procedure may include a first type of LBT procedure or a second type of LBT procedure. The code may also be executable by the processor to identify an energy detection threshold associated with the identified type of LBT procedure. The identified energy detection threshold may include a first energy detection threshold for the first type of LBT procedure or a second energy detection threshold for the second type of LBT procedure. The first energy detection threshold may be lower than the second energy detection threshold. The code may also be executable by the processor to perform the identified type of LBT procedure based at least in part on the identified energy detection threshold to contend for access to the shared radio frequency spectrum band.

In one example, another method for wireless communication at a UE is described. The method may include receiving an indication that the UE cannot update a countdown counter associated with performance of a LBT procedure during a TTI in which the UE receives a transmission, determining the UE is receiving a transmission during a TTI, and refraining from at least one of: performing a LBT procedure during the TTI, updating the countdown counter associated with performance of the LBT procedure during the TTI, or a combination thereof.

In some examples of the method, the indication that the UE cannot update the countdown counter may be received in at least one of: radio resource control (RRC) signaling, a system information block (SIB), or DCI.

In one example, another apparatus for wireless communication at a UE is described. The apparatus may include means for receiving an indication that the UE cannot update a countdown counter associated with performance of a LBT procedure during a TTI in which the UE receives a transmission, means for determining the UE is receiving a transmission during a TTI, and means for refraining from at least one of: performing a LBT procedure during the TTI, updating the countdown counter associated with performance of the LBT procedure during the TTI, or a combination thereof.

In one example, another apparatus for wireless communication at a UE is described. The apparatus may include a processor, and memory in electronic communication with the processor. The processor and the memory may be configured to receive an indication that the UE cannot update a countdown counter associated with performance of a LBT procedure during a TTI in which the UE receives a transmission, to determine the UE is receiving a transmission during a TTI, and to refrain from at least one of: performing a LBT procedure during the TTI, updating the countdown counter associated with performance of the LBT procedure during the TTI, or a combination thereof.

In one example, another non-transitory computer-readable medium storing computer-executable code for wireless communication at a UE is described. The code may be executable by a processor to receive an indication that the UE cannot update a countdown counter associated with performance of a LBT procedure during a TTI in which the UE receives a transmission, to determine the UE is receiving a transmission during a TTI, and to refrain from at least one of: performing a LBT procedure during the TTI, updating the countdown counter associated with performance of the LBT procedure during the TTI, or a combination thereof.

In one example, another method for wireless communication at a UE is described. The method may include receiving an indication of a transmission parameter for an uplink transmission to be made over a shared radio frequency spectrum band during at least one TTI, identifying a content of the uplink transmission in each TTI of the at least one TTI, and scaling the transmission parameter for at least a first TTI based at least in part on an identified content of the uplink transmission in the first TTI.

In some examples of the method, the identified content may include at least one of: a number of resource elements (REs), a number of punctured symbol periods, a first presence of a PUCCH, a second presence of a PRACH, a third presence of a sounding reference signal (SRS), or a combination thereof. In some examples, the transmission parameter may include at least one of: a transport block size (TBS), a modulation and coding scheme (MCS), or a combination thereof. In some examples, scaling the transmission parameter may include one of: switching to a fixed alternative transmission parameter, or computing an alternative transmission parameter based at least in part on a comparison of the identified content to a nominal content.

In one example, another apparatus for wireless communication at a UE is described. The apparatus may include means for receiving an indication of a transmission parameter for an uplink transmission to be made over a shared radio frequency spectrum band during at least one TTI, means for identifying a content of the uplink transmission in each TTI of the at least one TTI, and means for scaling the transmission parameter for at least a first TTI based at least in part on an identified content of the uplink transmission in the first TTI.

In one example, another apparatus for wireless communication at a UE is described. The apparatus may include a processor, and memory in electronic communication with the processor. The processor and the memory may be configured to receive an indication of a transmission parameter for an uplink transmission to be made over a shared radio frequency spectrum band during at least one TTI, to identify a content of the uplink transmission in each TTI of the at least one TTI, and to scale the transmission parameter for at least a first TTI based at least in part on an identified content of the uplink transmission in the first TTI.

In one example, another non-transitory computer-readable medium storing computer-executable code for wireless communication at a UE is described. The code may be executable by a processor to receive an indication of a transmission parameter for an uplink transmission to be made over a shared radio frequency spectrum band during at least one TTI, to identify a content of the uplink transmission in each TTI of the at least one TTI, and to scale the transmission parameter for at least a first TTI based on an identified content of the uplink transmission in the first TTI.

In one example, another method for wireless communication at a UE is described. The method may include receiving RRC signaling from a network. The RRC signaling may configure HARQ ACK feedback reporting for a first carrier in a shared radio frequency spectrum band in one of: a first mode in which the UE transmits HARQ ACK feedback is transmitted on a PUCCH on a second carrier in a dedicated radio frequency spectrum band, or a second mode in which the UE selects to transmit HARQ ACK feedback on the PUCCH on the second carrier or on a PUSCH on the first carrier. The method may also include transmitting HARQ ACK feedback in accordance with the first mode or the second mode, as configured by the RRC signaling.

In some examples of the method, the RRC signaling may configure the HARQ ACK feedback reporting for the first carrier in the second mode, and the method may further include contending for access to the first carrier in the shared radio frequency spectrum band, and selecting to transmit HARQ ACK feedback on the PUSCH on the first carrier based at least in part on winning contention for access to the first carrier.

In one example, another apparatus for wireless communication at a UE is described. The apparatus may include means for receiving RRC signaling from a network. The RRC signaling may configure HARQ ACK feedback reporting for a first carrier in a shared radio frequency spectrum band in one of: a first mode in which the UE transmits HARQ ACK feedback is transmitted on a PUCCH on a second carrier in a dedicated radio frequency spectrum band, or a second mode in which the UE selects to transmit HARQ ACK feedback on the PUCCH on the second carrier or on a PUSCH on the first carrier. The apparatus may also include means for transmitting HARQ ACK feedback in accordance with the first mode or the second mode, as configured by the RRC signaling.

In one example, another apparatus for wireless communication at a UE is described. The apparatus may include a processor, and memory in electronic communication with the processor. The processor and the memory may be configured to receive RRC signaling from a network. The RRC signaling may configure HARQ ACK feedback reporting for a first carrier in a shared radio frequency spectrum band in one of: a first mode in which the UE transmits HARQ ACK feedback is transmitted on a PUCCH on a second carrier in a dedicated radio frequency spectrum band, or a second mode in which the UE selects to transmit HARQ ACK feedback on the PUCCH on the second carrier or on a PUSCH on the first carrier. The processor and the memory may also be configured to transmit HARQ ACK feedback in accordance with the first mode or the second mode, as configured by the RRC signaling.

In one example, another non-transitory computer-readable medium storing computer-executable code for wireless communication at a UE is described. The code may be executable by a processor to receive RRC signaling from a network. The RRC signaling may configure HARQ ACK feedback reporting for a first carrier in a shared radio frequency spectrum band in one of: a first mode in which the UE transmits HARQ ACK feedback is transmitted on a PUCCH on a second carrier in a dedicated radio frequency spectrum band, or a second mode in which the UE selects to transmit HARQ ACK feedback on the PUCCH on the second carrier or on a PUSCH on the first carrier. The code may also be executable by a processor to transmit HARQ ACK feedback in accordance with the first mode or the second mode, as configured by the RRC signaling.

In one example, another method for wireless communication at a network access device is described. The method may include configuring HARQ ACK feedback reporting for a first carrier in a shared radio frequency spectrum in one of: a first mode in which a UE transmits HARQ ACK feedback on a PUCCH on a second carrier in a dedicated radio frequency spectrum band, or a second mode in which the UE selects to transmit HARQ ACK feedback on the PUCCH on the second carrier or on a PUSCH on the first carrier; transmitting an indication of the configured HARQ ACK feedback reporting mode to the UE in RRC signaling; and receiving HARQ ACK feedback for the first carrier from the UE, in accordance with the configured HARQ ACK feedback reporting mode.

In one example, another apparatus for wireless communication at a network access device is described. The apparatus may include means for configuring HARQ ACK feedback reporting for a first carrier in a shared radio frequency spectrum in one of: a first mode in which a UE transmits HARQ ACK feedback on a PUCCH on a second carrier in a dedicated radio frequency spectrum band, or a second mode in which the UE selects to transmit HARQ ACK feedback on the PUCCH on the second carrier or on a PUSCH on the first carrier; means for transmitting an indication of the configured HARQ ACK feedback reporting mode to the UE in RRC signaling; and means for receiving HARQ ACK feedback for the first carrier from the UE, in accordance with the configured HARQ ACK feedback reporting mode.

In one example, another apparatus for wireless communication at a network access device is described. The apparatus may include a processor, and memory in electronic communication with the processor. The processor and the memory may be configured to configure HARQ ACK feedback reporting for a first carrier in a shared radio frequency spectrum in one of: a first mode in which a UE transmits HARQ ACK feedback on a PUCCH on a second carrier in a dedicated radio frequency spectrum band, or a second mode in which the UE selects to transmit HARQ ACK feedback on the PUCCH on the second carrier or on a PUSCH on the first carrier; to transmit an indication of the configured HARQ ACK feedback reporting mode to the UE in RRC signaling; and to receive HARQ ACK feedback for the first carrier from the UE, in accordance with the configured HARQ ACK feedback reporting mode.

In one example, another non-transitory computer-readable medium storing computer-executable code for wireless communication at a network access device is described. The code may be executable by a processor to configure HARQ ACK feedback reporting for a first carrier in a shared radio frequency spectrum in one of: a first mode in which a UE transmits HARQ ACK feedback on a PUCCH on a second carrier in a dedicated radio frequency spectrum band, or a second mode in which the UE selects to transmit HARQ ACK feedback on the PUCCH on the second carrier or on a PUSCH on the first carrier; to transmit an indication of the configured HARQ ACK feedback reporting mode to the UE in RRC signaling; and to receive HARQ ACK feedback for the first carrier from the UE, in accordance with the configured HARQ ACK feedback reporting mode.

In one example, another method for wireless communication at a UE is described. The method may include receiving an indication of an invalid PUSCH resource allocation for a TTI over a shared radio frequency spectrum band, and transmitting aperiodic CSI without a PUSCH in the TTI.

In some examples of the method, the invalid PUSCH resource allocation may include an invalid frequency interlace combination with a designated bit pattern for a redundancy version (RV) and a NDI. In some examples, the method may include interpreting a HARQ identifier (ID) for the TTI as invalid.

In one example, another apparatus for wireless communication at a UE is described. The apparatus may include means for receiving an indication of an invalid PUSCH resource allocation for a TTI over a shared radio frequency spectrum band, and means for transmitting aperiodic CSI without a PUSCH in the TTI.

In one example, another apparatus for wireless communication at a UE is described. The apparatus may include a processor, and memory in electronic communication with the processor. The processor and the memory may be configured to receive an indication of an invalid PUSCH resource allocation for a TTI over a shared radio frequency spectrum band, and to transmit aperiodic CSI without a PUSCH in the TTI.

In one example, another non-transitory computer-readable medium storing computer-executable code for wireless communication at a UE is described. The code may be executable by a processor to receive an indication of an invalid PUSCH resource allocation for a TTI over a shared radio frequency spectrum band, and to transmit aperiodic CSI without a PUSCH in the TTI.

In one example, another method for wireless communication at a network access device is described. The method may include transmitting an indication of an invalid PUSCH resource allocation for a TTI over a shared radio frequency spectrum band, and receiving aperiodic CSI without a PUSCH in the TTI.

In some examples of the method, the invalid PUSCH resource allocation may include an invalid frequency interlace combination with a designated bit pattern for a RV and a NDI.

In one example, another apparatus for wireless communication at a network access device is described. The apparatus may include means for transmitting an indication of an invalid PUSCH resource allocation for a TTI over a shared radio frequency spectrum band, and means for receiving aperiodic CSI without a PUSCH in the TTI.

In one example, another apparatus for wireless communication at a network access device is described. The apparatus may include a processor, and memory in electronic communication with the processor. The processor and the memory may be configured to transmit an indication of an invalid PUSCH resource allocation for a TTI over a shared radio frequency spectrum band, and receive aperiodic CSI without a PUSCH in the TTI.

In one example, another non-transitory computer-readable medium storing computer-executable code for wireless communication at a network access device is described. The code may be executable by a processor to transmit an indication of an invalid PUSCH resource allocation for a TTI over a shared radio frequency spectrum band, and receive aperiodic CSI without a PUSCH in the TTI.

In one example, another method for wireless communication at a UE is described. The method may include receiving a code point associated with transmission of aperiodic CSI over a shared radio frequency spectrum band in a TTI scheduled without a PUSCH, receiving a multi-TTI grant that references the code point for a TTI scheduled by the multi-TTI grant, and transmitting aperiodic CSI without a PUSCH in the TTI, in accordance with the code point.

In one example, another apparatus for wireless communication at a UE is described. The apparatus may include means for receiving a code point associated with transmission of aperiodic CSI over a shared radio frequency spectrum band in a TTI scheduled without a PUSCH, means for receiving a multi-TTI grant that references the code point for a TTI scheduled by the multi-TTI grant, and means for transmitting aperiodic CSI without a PUSCH in the TTI, in accordance with the code point.

In one example, another apparatus for wireless communication at a UE is described. The apparatus may include a processor, and memory in electronic communication with the processor. The processor and the memory may be configured to receive a code point associated with transmission of aperiodic CSI over a shared radio frequency spectrum band in a TTI scheduled without a PUSCH, to receive a multi-TTI grant that references the code point for a TTI scheduled by the multi-TTI grant, and to transmit aperiodic CSI without a PUSCH in the TTI, in accordance with the code point.

In one example, another non-transitory computer-readable medium storing computer-executable code for wireless communication at a UE is described. The code may be executable by a processor to receive a code point associated with transmission of aperiodic CSI over a shared radio frequency spectrum band in a TTI scheduled without a PUSCH, to receive a multi-TTI grant that references the code point for a TTI scheduled by the multi-TTI grant, and to transmit aperiodic CSI without a PUSCH in the TTI, in accordance with the code point.

In one example, another method for wireless communication at a network access device is described. The method may include identifying an expected frequency of SRS requests; identifying an aperiodic SRS to be transmitted without a PUSCH, during a TTI, over a shared radio frequency spectrum band; determining a contention window size to be used by a UE when performing a LBT procedure to contend for access to the shared radio frequency spectrum band to transmit the aperiodic SRS, in which the determined contention window size based at least in part on the expected frequency of SRS requests; and transmitting an indication of the determined contention window size to the UE.

In some examples of the method, the indication of the determined contention window size may be transmitted in RRC signaling.

In one example, another apparatus for wireless communication at a network access device is described. The apparatus may include means for identifying an expected frequency of SRS requests; means for identifying an aperiodic SRS to be transmitted without a PUSCH, during a TTI, over a shared radio frequency spectrum band; means for determining a contention window size to be used by a UE when performing a LBT procedure to contend for access to the shared radio frequency spectrum band to transmit the aperiodic SRS, in which the determined contention window size based at least in part on the expected frequency of SRS requests; and means for transmitting an indication of the determined contention window size to the UE.

In one example, another apparatus for wireless communication at a network access device is described. The apparatus may include a processor, and memory in electronic communication with the processor. The processor and the memory may be configured to identify an expected frequency of SRS requests; to identify an aperiodic SRS to be transmitted without a PUSCH, during a TTI, over a shared radio frequency spectrum band; to determine a contention window size to be used by a UE when performing a LBT procedure to contend for access to the shared radio frequency spectrum band to transmit the aperiodic SRS, in which the determined contention window size based at least in part on the expected frequency of SRS requests; and to transmit an indication of the determined contention window size to the UE.

In one example, another non-transitory computer-readable medium storing computer-executable code for wireless communication at a network access device is described. The code may be executable by a processor to identify an expected frequency of SRS requests; to identify an aperiodic SRS to be transmitted without a PUSCH, during a TTI, over a shared radio frequency spectrum band; to determine a contention window size to be used by a UE when performing a LBT procedure to contend for access to the shared radio frequency spectrum band to transmit the aperiodic SRS, in which the determined contention window size based at least in part on the expected frequency of SRS requests; and to transmit an indication of the determined contention window size to the UE.

In one example, another method for wireless communication at a UE is described. The method may include receiving, in downlink DCI, a trigger to transmit a SRS during a TTI; receiving scheduling information for a PUSCH to be transmitted during the TTI, in which the scheduling information does not include a gap for transmitting the SRS; and transmitting, during the TTI, one of: the PUSCH rate matched around the SRS, the PUSCH punctured by the SRS, the PUSCH without the SRS, or the SRS without the PUSCH.

In one example, another apparatus for wireless communication at a UE is described. The apparatus may include means for receiving, in downlink DCI, a trigger to transmit a SRS during a TTI; means for receiving scheduling information for a PUSCH to be transmitted during the TTI, in which the scheduling information does not include a gap for transmitting the SRS; and means for transmitting, during the TTI, one of: the PUSCH rate matched around the SRS, the PUSCH punctured by the SRS, the PUSCH without the SRS, or the SRS without the PUSCH.

In one example, another apparatus for wireless communication at a UE is described. The apparatus may include a processor, and memory in electronic communication with the processor. The processor and the memory may be configured to receive, in downlink DCI, a trigger to transmit a SRS during a TTI; to receive scheduling information for a PUSCH to be transmitted during the TTI, in which the scheduling information does not include a gap for transmitting the SRS; and to transmit, during the TTI, one of: the PUSCH rate matched around the SRS, the PUSCH punctured by the SRS, the PUSCH without the SRS, or the SRS without the PUSCH.

In one example, another non-transitory computer-readable medium storing computer-executable code for wireless communication at a UE is described. The code may be executable by a processor to receive, in downlink DCI, a trigger to transmit a SRS during a TTI; to receive scheduling information for a PUSCH to be transmitted during the TTI, in which the scheduling information does not include a gap for transmitting the SRS; and to transmit, during the TTI, one of: the PUSCH rate matched around the SRS, the PUSCH punctured by the SRS, the PUSCH without the SRS, or the SRS without the PUSCH.

In one example, another method for wireless communication at a UE is described. The method may include receiving a first indication of a default initial timing advance for a first carrier in a shared radio frequency spectrum band, in which the default initial timing advance includes: a timing advance of a second carrier in a dedicated radio frequency spectrum band, and in which the first carrier and the second carrier are in a same timing advance group (TAG), or a static initial timing advance, or a combination thereof. The method may also include receiving a second indication of a default initial uplink transmit power, and transmitting on the first carrier based at least in part on the default initial timing advance and the default initial uplink transmit power.

In some examples of the method, the static initial timing advance may be zero. In some examples, the default initial uplink transmit power may be a maximum uplink transmit power. In some examples, the second indication may be received in at least one of: a system information block, a RRC configuration, or a combination thereof. In some examples, the method may include receiving a plurality of code points indicating different uplink transmit power adjustment steps, and a code point providing the second indication.

In one example, another apparatus for wireless communication at a UE is described. The apparatus may include means for receiving a first indication of a default initial timing advance for a first carrier in a shared radio frequency spectrum band, in which the default initial timing advance including: a timing advance of a second carrier in a dedicated radio frequency spectrum band, and in which the first carrier and the second carrier are in a same TAG, or a static initial timing advance, or a combination thereof. The apparatus may also include means for receiving a second indication of a default initial uplink transmit power, and means for transmitting on the first carrier based at least in part on the default initial timing advance and the default initial uplink transmit power.

In one example, another apparatus for wireless communication at a UE is described. The apparatus may include a processor, and memory in electronic communication with the processor. The processor and the memory may be configured to receive a first indication of a default initial timing advance for a first carrier in a shared radio frequency spectrum band, in which the default initial timing advance including: a timing advance of a second carrier in a dedicated radio frequency spectrum band, and in which the first carrier and the second carrier are in a same TAG, or a static initial timing advance, or a combination thereof. The processor and the memory may also be configured to receive a second indication of a default initial uplink transmit power, and to transmit on the first carrier based at least in part on the default initial timing advance and the default initial uplink transmit power.

In one example, another non-transitory computer-readable medium storing computer-executable code for wireless communication at a UE is described. The code may be executable by a processor to receive a first indication of a default initial timing advance for a first carrier in a shared radio frequency spectrum band, in which the default initial timing advance including: a timing advance of a second carrier in a dedicated radio frequency spectrum band, and in which the first carrier and the second carrier are in a same TAG, or a static initial timing advance, or a combination thereof. The code may also be executable by the processor to receive a second indication of a default initial uplink transmit power, and to transmit on the first carrier based at least in part on the default initial timing advance and the default initial uplink transmit power.

In one example, another method for wireless communication at a network access device is described. The method may include selecting, from a plurality of code points, at least one of: a first code point for controlling transmit power in a single TTI uplink transmission, a second code point for controlling transmit power in a multi-TTI uplink transmission, a third code point associated with transmitting at a maximum transmit power during a single TTI uplink transmission or a multi-TTI uplink transmission, or a combination thereof. The first code point and the second code point may be associated with different transmit powers. The method may also include transmitting a transmit power control (TPC) command to a UE. The TPC command may include the at least one selected code point.

In some examples, the method may include scheduling an uplink transmission by the UE, in which the scheduled uplink transmission may include a single TTI uplink transmission or a multi-TTI uplink transmission, and transmitting to the UE an uplink grant referencing a code point transmitted in the TPC command. In some examples, the second code point may identify larger uplink transmit power adjustment steps than the first code point.

In one example, another apparatus for wireless communication at a network access device is described. The apparatus may include means for selecting from a plurality of code points, at least one of: a first code point for controlling transmit power in a single TTI uplink transmission, a second code point for controlling transmit power in a multi-TTI uplink transmission, a third code point associated with transmitting at a maximum transmit power during a single TTI uplink transmission or a multi-TTI uplink transmission, or a combination thereof. The first code point and the second code point may be associated with different transmit powers.

The apparatus may also include means for transmitting a TPC command to a UE. The TPC command may include the at least one selected code point.

In one example, another apparatus for wireless communication at a network access device is described. The apparatus may include a processor, and memory in electronic communication with the processor. The processor and the memory may be configured to select from a plurality of code points, at least one of: a first code point for controlling transmit power in a single TTI uplink transmission, a second code point for controlling transmit power in a multi-TTI uplink transmission, a third code point associated with transmitting at a maximum transmit power during a single TTI uplink transmission or a multi-TTI uplink transmission, or a combination thereof. The first code point and the second code point may be associated with different transmit powers. The processor and the memory may also be configured to transmit a TPC command to a UE. The TPC command may include the at least one selected code point.

In one example, another non-transitory computer-readable medium storing computer-executable code for wireless communication at a network access device is described. The code may be executable by a processor to select from a plurality of code points, at least one of: a first code point for controlling transmit power in a single TTI uplink transmission, a second code point for controlling transmit power in a multi-TTI uplink transmission, a third code point associated with transmitting at a maximum transmit power during a single TTI uplink transmission or a multi-TTI uplink transmission, or a combination thereof. The first code point and the second code point may be associated with transmit powers. The code may be executable by the processor to transmit a TPC command to a UE. The TPC command may include the at least one selected code point.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Techniques are described in which a shared radio frequency spectrum band is used for at least a portion of communications in a wireless communication system. In some examples, the shared radio frequency spectrum band may be used for Long Term Evolution (LTE) or LTE-Advanced (LTE-A) communications. The shared radio frequency spectrum band may be used in combination with, or independent from, a dedicated radio frequency spectrum band. The dedicated radio frequency spectrum band may include a radio frequency spectrum band licensed to particular users for particular uses. The shared radio frequency spectrum band may include a radio frequency spectrum band available for Wi-Fi use, a radio frequency spectrum band available for use by different radio access technologies, or a radio frequency spectrum band available for use by multiple mobile network operators (MNOs) in an equally shared or prioritized manner.

With increasing data traffic in cellular networks that use a dedicated radio frequency spectrum band, offloading of at least some data traffic to a shared radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Use of a shared radio frequency spectrum band may also provide service in areas where access to a dedicated radio frequency spectrum band is unavailable. Before communicating over a shared radio frequency spectrum band, a transmitting apparatus may perform a listen before talk (LBT) procedure to contend for access to the shared radio frequency spectrum band. Such a LBT procedure may include performing a clear channel assessment (CCA) procedure (or extended CCA procedure) to determine whether a channel of the shared radio frequency spectrum band is available. When it is determined that the channel of the shared radio frequency spectrum band is available, a channel reservation signal (e.g., a channel usage beacon signal (CUBS)) may be transmitted to reserve the channel. When it is determined that a channel is not available, a CCA procedure (or extended CCA procedure) may be performed for the channel again at a later time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
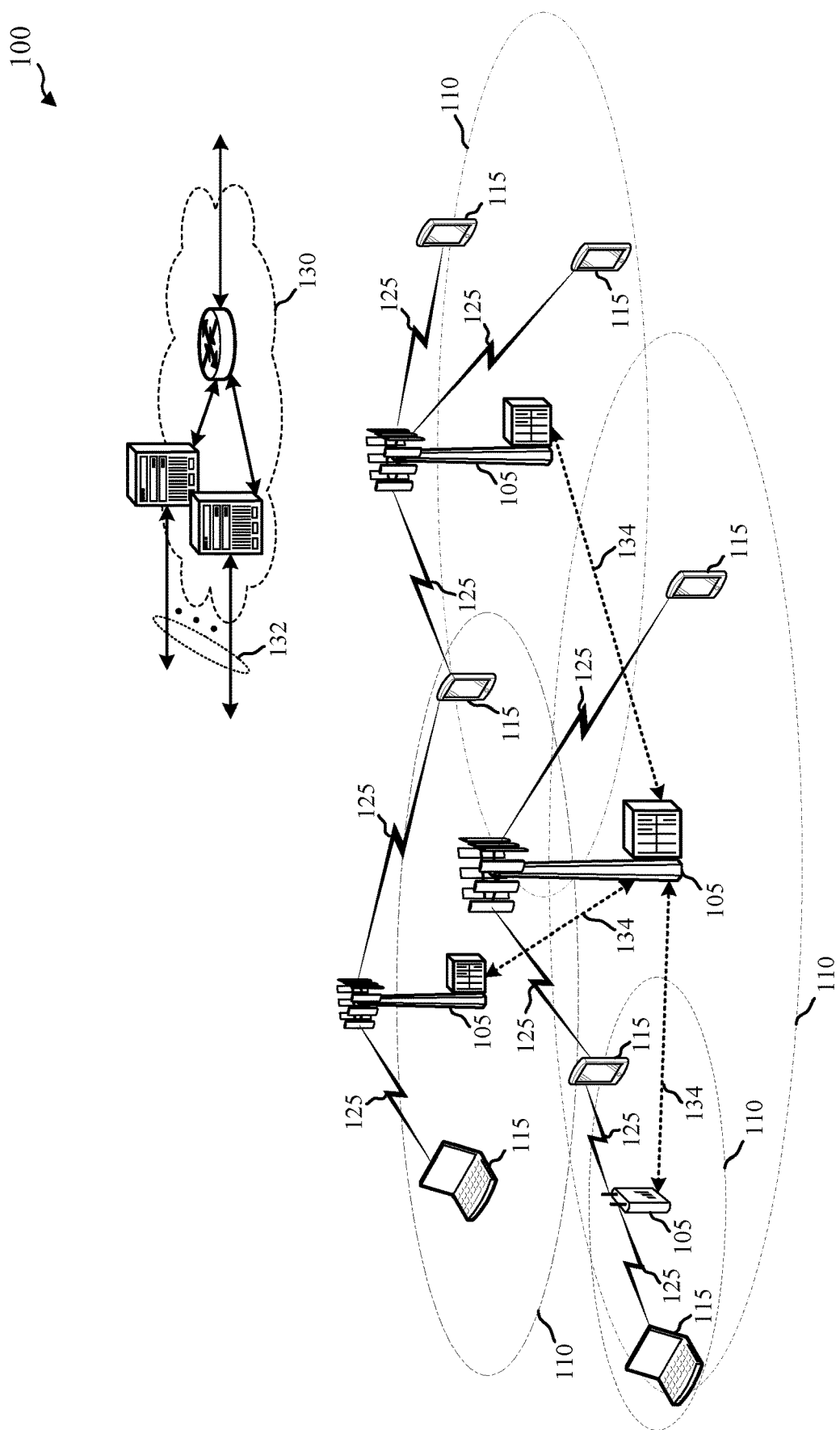
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105 (i.e., a type of network access device), UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a network access device, a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies and/or different types of network access devices.

In some examples, the wireless communication system 100 may include an LTE/LTE-A network. In LTE/LTE-A networks, the term evolved Node B (eNB) may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations or other types of network access devices or network equipment, including macro eNBs, small cell eNBs, relay base stations, and the like.

The communication links 125 shown in wireless communication system 100 may include downlinks (DLs), from a base station 105 to a UE 115, or uplinks (ULs), from a UE 115 to a base station 105. The downlinks may also be called forward links, while the uplinks may also be called reverse links.

In some examples, each communication link 125 may include one or more carriers, where each carrier may be a signal made up of multiple sub-carriers (e.g., waveform signals of different frequencies) modulated according to the various radio technologies described above. Each modulated signal may be transmitted on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105, or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In an LTE/LTE-A network, a UE 115 may be configured to communicate using up to five CCs when operating in a carrier aggregation mode or dual-connectivity mode. One or more of the CCs may be configured as a DL CC, and one or more of the CCs may be configured as a UL CC. Also, one of the CCs allocated to a UE 115 may be configured as a primary CC (PCC), and the remaining CCs allocated to the UE 115 may be configured as secondary CCs (SCCs).

In some examples, the wireless communication system 100 may support operation over a dedicated radio frequency spectrum band (e.g., a radio frequency spectrum band licensed to particular users for particular uses) or a shared radio frequency spectrum band (e.g., a radio frequency spectrum band that is available for Wi-Fi use, a radio frequency spectrum band that is available for use by different radio access technologies, or a radio frequency spectrum band that is available for use by multiple MNOs in an equally shared or prioritized manner).

Figure 2:
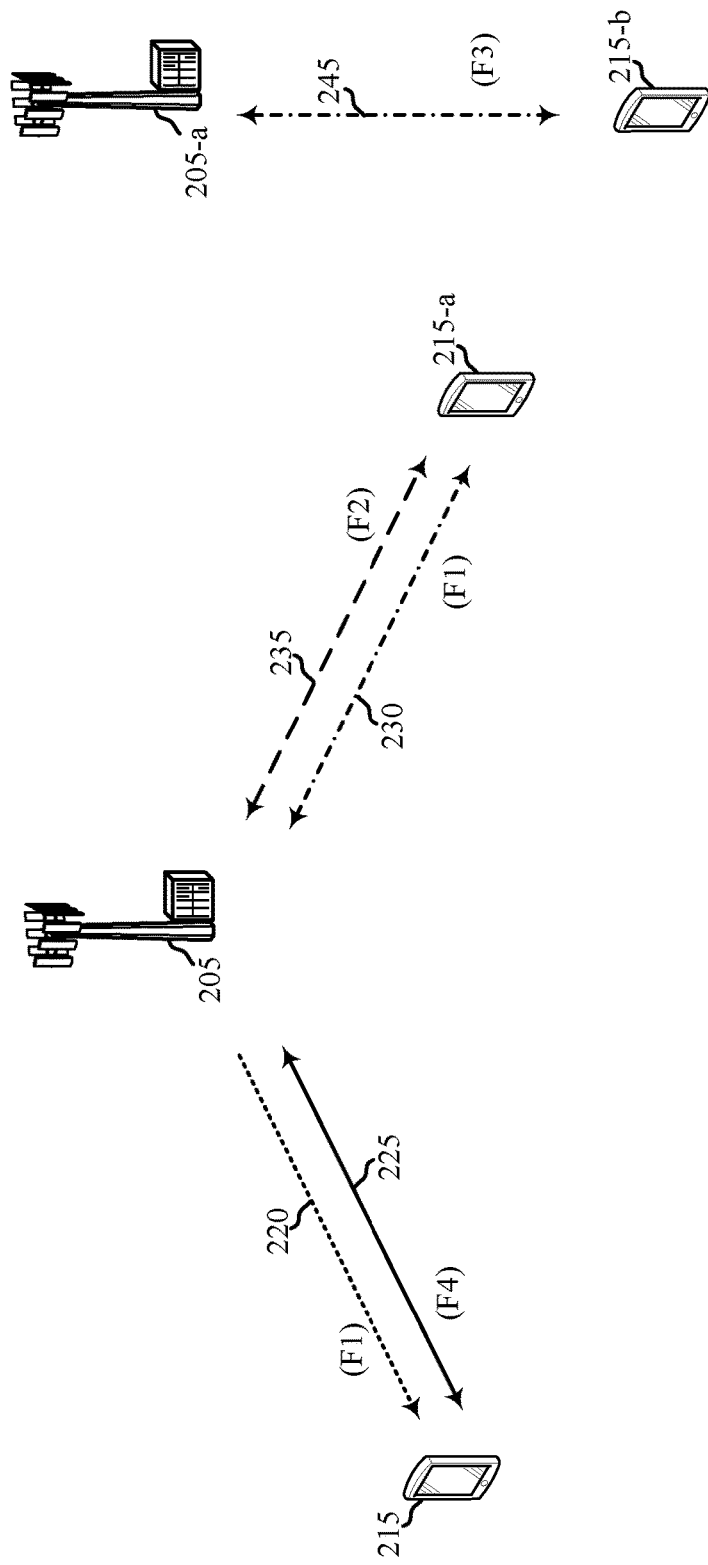
FIG. 2 shows a wireless communication system in which LTE/LTE-A may be deployed under different scenarios using a shared radio frequency spectrum band, in accordance with various aspects of the present disclosure.

FIG. 2 shows a wireless communication system 200 in which LTE/LTE-A may be deployed under different scenarios using a shared radio frequency spectrum band, in accordance with various aspects of the present disclosure. More specifically, FIG. 2 illustrates examples of a supplemental downlink mode (also referred to as a licensed assisted access (LAA) mode), a carrier aggregation mode (also referred to as an enhanced LAA (eLAA) mode), and a standalone mode, in which LTE/LTE-A is deployed using a shared radio frequency spectrum band. The wireless communication system 200 may be an example of portions of the wireless communication system 100 as described with reference to FIG. 1. Moreover, a first base station 205 and a second base station 205-a may be examples of aspects of one or more of the base stations 105 described with reference to FIG. 1, while a first UE 215, a second UE 215-a, and a third UE 215-b may be examples of aspects of one or more of the UEs 115 as described with reference to FIG. 1.

In the example of the supplemental downlink mode (e.g., the LAA mode) in the wireless communication system 200, the first base station 205 may transmit orthogonal frequency-division multiple access (OFDMA) waveforms to the first UE 215 using a downlink channel 220. The downlink channel 220 may be associated with a frequency F1 in a shared radio frequency spectrum band. The first base station 205 may transmit OFDMA waveforms to the first UE 215 using a first bidirectional link 225 and may receive single-carrier frequency-division multiple access (FDMA) (SC-FDMA) waveforms from the first UE 215 using the first bidirectional link 225. The first bidirectional link 225 may be associated with a frequency F4 in a dedicated radio frequency spectrum band. The downlink channel 220 in the shared radio frequency spectrum band and the first bidirectional link 225 in the dedicated radio frequency spectrum band may operate contemporaneously. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a MNO) that uses a dedicated radio frequency spectrum band and needs to relieve some of the traffic or signaling congestion.

In the example of the carrier aggregation mode (e.g., the eLAA mode) in the wireless communication system 200, the first base station 205 may transmit OFDMA waveforms to the second UE 215-*a* using a second bidirectional link 230 and may receive OFDMA waveforms, SC-FDMA waveforms, or resource block interleaved FDMA waveforms from the second UE 215-*a* using the second bidirectional link 230. The second bidirectional link 230 may be associated with the frequency F1 in the shared radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a dedicated radio frequency spectrum band. The third bidirectional link 235 may provide a downlink and uplink capacity offload for the first base station 205. Like the supplemental downlink mode (e.g., the LAA mode) described above, this scenario may occur with any service provider (e.g., MNO) that uses a dedicated radio frequency spectrum band and needs to relieve some of the traffic or signaling congestion.

As described above, one type of service provider that may benefit from the capacity offload offered by using LTE/LTE-A in a shared radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A PCC on the dedicated radio frequency spectrum band and at least one SCC on the shared radio frequency spectrum band.

In the carrier aggregation mode, data and control may, for example, be communicated in the dedicated radio frequency spectrum band (e.g., via the third bidirectional link 235) while data may, for example, be communicated in the shared radio frequency spectrum band (e.g., via second bidirectional link 230). The carrier aggregation mechanisms supported when using a shared radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the third UE 215-*b* using a bidirectional link 245 and may receive OFDMA waveforms, SC-FDMA waveforms, or resource block interleaved FDMA waveforms from the third UE 215-*b* using the bidirectional link 245. The bidirectional link 245 may be associated with the frequency F3 in the shared radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a dedicated radio frequency spectrum band.

In some examples, a transmitting apparatus such as one of the base stations 105, 205, or 205-*a* as described with reference to FIG. 1 or 2, or one of the UEs 115, 215, 215-*a*, or 215-*b* as described with reference to FIG. 1 or 2, may use a gating interval to gain access to a wireless channel of a shared radio frequency spectrum band (e.g., to a physical channel of the shared radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a sharing protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure or an extended CCA (ECCA) procedure. The outcome of the CCA procedure or ECCA procedure may indicate to the transmitting apparatus whether a wireless channel of a shared radio frequency spectrum band is available or in use for the gating interval (e.g., an LBT radio frame or transmission burst). When a CCA procedure or ECCA procedure indicates the wireless channel is available for a corresponding LBT radio frame or transmission burst (e.g., "clear" for use), the transmitting apparatus may reserve or use the wireless channel of the shared radio frequency spectrum band during part or all of the LBT radio frame. When a CCA procedure or ECCA procedure indicates the wireless channel is not available (e.g., that the wireless channel is in use or reserved by another transmitting apparatus), the transmitting apparatus may be prevented from using the wireless channel during the LBT radio frame. In some examples, a transmitting apparatus may need to perform a CCA procedure or ECCA procedure for some but not other wireless channels in a shared radio frequency spectrum band.

Figure 3:
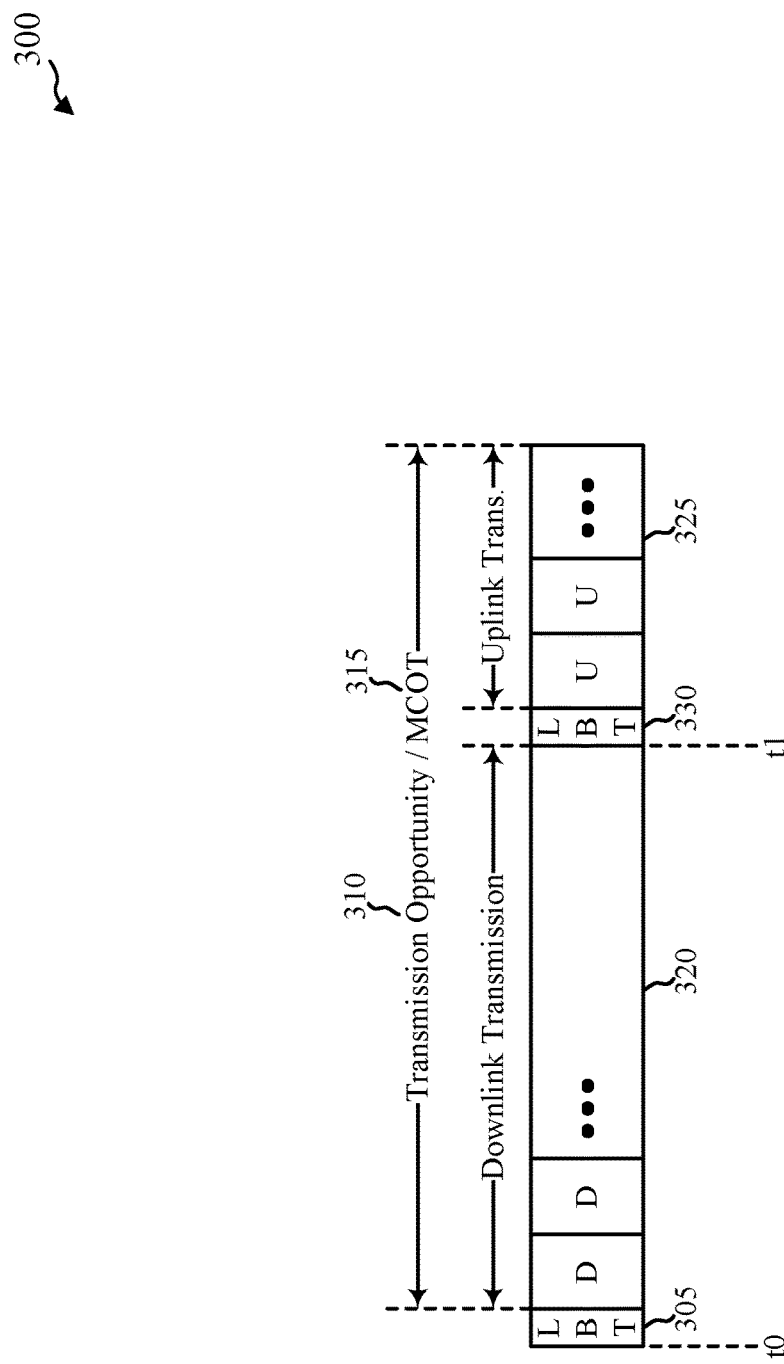
FIG. 3 shows a timeline of wireless communications between a base station and number of UEs, in accordance with various aspects of the present disclosure.

FIG. 3 shows a timeline 300 of wireless communications between a base station and number of UEs, in accordance with various aspects of the present disclosure. The wireless communications may occur in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. In some examples, the base station(s) and UE(s) that communicate in the shared radio frequency spectrum band may be examples of aspects of the base stations 105, 205, or 205-*a* and UEs 115, 215, 215-*a*, or 215-*b* as described with reference to FIG. 1 or 2.

In some examples, a base station may perform a LBT procedure 305 (e.g., a CCA procedure or ECCA procedure) at a time t0, prior to a transmission opportunity 310. The LBT procedure 305 may be performed to contend for access to the shared radio frequency spectrum band during the transmission opportunity 310. The transmission opportunity 310 may be associated with a maximum channel occupancy time (MCOT) 315. When the base station wins contention for access to the shared radio frequency spectrum band for the transmission opportunity 310, the base station may transmit to one or more UEs during a number of TTIs transmission time intervals (TTIs) (e.g., during a number of downlink (DL) subframes). The base station may also schedule uplink transmissions from one or more UEs during a number of TTIs (e.g., during a number of uplink (UL) subframes). When the base station loses contention for access to the shared radio frequency spectrum band for the transmission opportunity 310, the base station may not transmit or schedule uplink transmissions during the transmission opportunity 310, and may have to delay communication with one or more UEs until a subsequent transmission opportunity (e.g., a subsequent transmission opportunity for which the base station wins contention for access to the shared radio frequency spectrum band). FIG. 3 assumes the base station wins contention for access to the shared radio frequency spectrum band during the LBT procedure 305.

By way of example, the timeline 300 shows a downlink period 320 followed by an uplink period 325 that ends within the transmission opportunity 310. A downlink transmission may be transmitted during the downlink period 320, and an uplink transmission may be transmitted during the uplink period 325. One or more uplink grants for the uplink transmission may be transmitted and received during the downlink period 320. Prior to transmitting an uplink transmission during the uplink period 325, a UE may perform a LBT procedure 330 (e.g., a CCA procedure or ECCA procedure) at a time t1, prior to the uplink period 325. The LBT procedure 330 may be performed to contend for access to the shared radio frequency spectrum band for an uplink transmission during the uplink period 325. When the UE wins contention for access to the shared radio frequency spectrum band for the uplink transmission, the UE may transmit to the base station during a number of TTIs (e.g., during a number of U subframes). When the UE loses contention for access to the shared radio frequency spectrum band for the uplink transmission, the UE may not transmit during the uplink period 325, and may have to delay communication with the base station until a subsequent uplink period (e.g., a subsequent uplink period for which the UE wins contention for access to the shared radio frequency spectrum band). FIG. 3 assumes the UE wins contention for access to the shared radio frequency spectrum band for an uplink transmission during the uplink period 325.

In some examples, the base station may transmit, and the UE may receive, information indicative of at least one type of LBT procedure to perform for the uplink transmission. The information may be transmitted/received prior to performance of the LBT procedure 330. In some examples, the information indicative of the at least one type of LBT procedure to perform for the uplink transmission may indicate whether a duration of the uplink transmission is within the MCOT 315 for which the shared radio frequency spectrum band was reserved by the base station. In some examples, the information indicative of the at least one type of LBT procedure to perform for the uplink transmission may indicate a type of LBT procedure to perform prior to transmitting the uplink transmission. In some examples, the indication of whether the duration of the uplink transmission is within the MCOT 315, or the indication of the type of LBT procedure to perform prior to transmitting the uplink transmission, may be transmitted/received as at least one bit in an uplink grant for the uplink transmission.

In some examples, the information indicative of the at least one type of LBT procedure to perform for the uplink transmission may indicate a duration of a portion of the MCOT 315 for which the shared radio frequency spectrum band is reserved by the base station and available for uplink transmissions (e.g., the portion of the MCOT 315 following the downlink period 320). In some examples, the indication of the duration of the portion of the MCOT 315 for which the shared radio frequency spectrum band is reserved by the base station and available for uplink transmissions may be signaled in a common physical downlink control channel (CPDCCH) received by more than one (or all) UEs. A UE that receives the duration of the portion of the MCOT 315 for which the shared radio frequency spectrum band is reserved by the base station and available for uplink transmissions may use the duration of the portion of the MCOT and a duration of an uplink transmission to determine whether the duration of the uplink transmission is within the MCOT 315.

In some examples, a UE receiving the information indicative of the at least one type of LBT procedure to perform for the uplink transmission may use the information to determine that an uplink transmission of the UE has a duration that is within the MCOT 315. The UE may also determine that, because the uplink transmission has a duration that is within the MCOT 315, the LBT procedure 330 may be a shorter LBT procedure (e.g., a 25 microsecond (μs) LBT procedure).

In some examples, the transmission opportunity 310 may include more than one DL-UL transition (e.g., more than one instance of a downlink period 320 followed by an uplink period 325).

Figure 4:
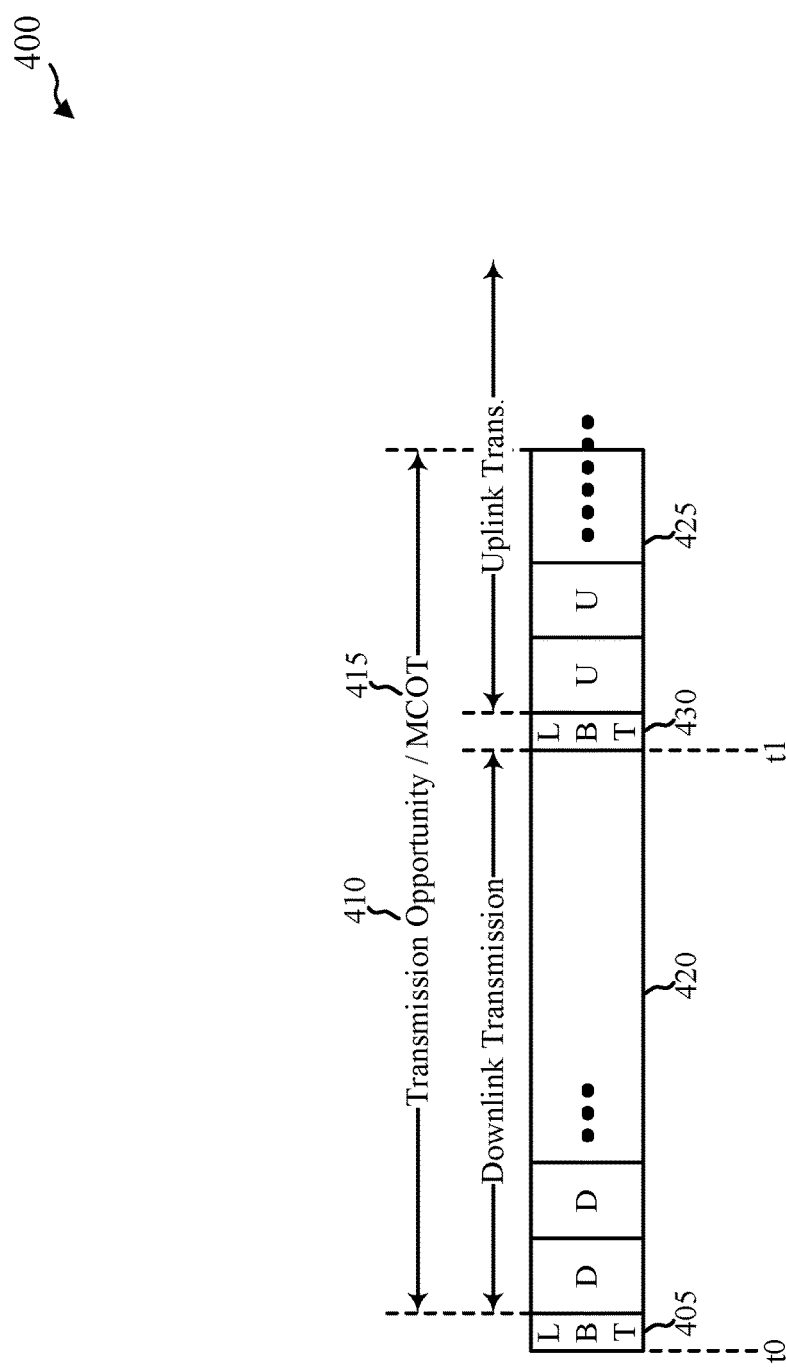
FIG. 4 shows a timeline of wireless communications between a base station and number of UEs, in accordance with various aspects of the present disclosure.

FIG. 4 shows a timeline 400 of wireless communications between a base station and number of UEs, in accordance with various aspects of the present disclosure. The wireless communications may occur in a shared radio frequency spectrum band. The shared radio frequency spectrum band may include a radio frequency spectrum band available for Wi-Fi use, a radio frequency spectrum band available for use by different radio access technologies, or a radio frequency spectrum band available for use by multiple MNOs in an equally shared or prioritized manner. In some examples, the base station(s) and UE(s) that communicate in the shared radio frequency spectrum band may be examples of aspects of the base stations 105, 205, or 205-a and UEs 115, 215, 215-a, or 215-b as described with reference to FIG. 1 or 2.

In some examples, a base station may perform a LBT procedure 405 (e.g., a CCA procedure or ECCA procedure) at a time t0, prior to a transmission opportunity 410. The LBT procedure 405 may be performed to contend for access to the shared radio frequency spectrum band during the transmission opportunity 410. The transmission opportunity 410 may be associated with a MCOT 415. When the base station wins contention for access to the shared radio frequency spectrum band for the transmission opportunity 410, the base station may transmit to one or more UEs during a number of TTIs (e.g., during a number of D subframes). The base station may also schedule uplink transmissions from one or more UEs during a number of TTIs (e.g., during a number of U subframes). When the base station loses contention for access to the shared radio frequency spectrum band for the transmission opportunity 410, the base station may not transmit or schedule uplink transmissions during the transmission opportunity 410, and may have to delay communication with one or more UEs until a subsequent transmission opportunity (e.g., a subsequent transmission opportunity for which the base station wins contention for access to the shared radio frequency spectrum band). FIG. 4 assumes the base station wins contention for access to the shared radio frequency spectrum band during the LBT procedure 405.

By way of example, the timeline 400 shows a downlink period 420 followed by an uplink period 425. The uplink period 425 may extend past an end of the transmission opportunity 410. A downlink transmission may be transmitted during the downlink period 420, and an uplink transmission may be transmitted during the uplink period 425. One or more uplink grants for the uplink transmission may be transmitted and received during the downlink period 420. Prior to transmitting an uplink transmission during the uplink period 425, a UE may perform a LBT procedure 430 (e.g., a CCA procedure or ECCA procedure) at a time t1, prior to the uplink period 425. The LBT procedure 430 may be performed to contend for access to the shared radio frequency spectrum band for an uplink transmission during the uplink period 425. When the UE wins contention for access to the shared radio frequency spectrum band for the uplink transmission, the UE may transmit to the base station during a number of TTIs (e.g., during a number of U subframes). When the UE loses contention for access to the shared radio frequency spectrum band for the uplink transmission, the UE may not transmit during the uplink period 425, and may have to delay communication with the base station until a subsequent uplink period (e.g., a subsequent uplink period for which the UE wins contention for access to the shared radio frequency spectrum band). FIG. 4 assumes the UE wins contention for access to the shared radio frequency spectrum band for an uplink transmission during the uplink period 425.

In some examples, the base station may transmit, and the UE may receive, information indicative of at least one type of LBT procedure to perform for the uplink transmission. The information may be transmitted/received prior to performance of the LBT procedure 430. In some examples, the information indicative of the at least one type of LBT procedure to perform for the uplink transmission may indicate whether a duration of the uplink transmission is within the MCOT 415 for which the shared radio frequency spectrum band was reserved by the base station. In some examples, the information indicative of the at least one type of LBT procedure to perform for the uplink transmission may indicate a type of LBT procedure to perform prior to transmitting the uplink transmission. In some examples, the indication of whether the duration of the uplink transmission is within the MCOT 415, or the indication of the type of LBT to perform prior to transmitting the uplink transmission, may be transmitted/received as at least one bit in an uplink grant for the uplink transmission.

In some examples, the information indicative of the at least one type of LBT procedure to perform for the uplink transmission may indicate a duration of a portion of the MCOT 415 for which the shared radio frequency spectrum band is reserved by the base station and available for uplink transmissions (e.g., the portion of the MCOT 415 following the downlink period 420). In some examples, the indication of the duration of the portion of the MCOT 415 for which the shared radio frequency spectrum band is reserved by the base station and available for uplink transmissions may be signaled in a CPDCCH received by more than one (or all) UEs. A UE that receives the duration of the portion of the MCOT 415 for which the shared radio frequency spectrum band is reserved by the base station and available for uplink transmissions may use the duration of the portion of the MCOT 415 and a duration of an uplink transmission to determine whether the duration of the uplink transmission is within the MCOT 415.

In some examples, a UE receiving the information indicative of the at least one type of LBT procedure to perform for the uplink transmission may use the information to determine that an uplink transmission of the UE has a duration that exceeds the MCOT 415. The UE may also determine that, because the uplink transmission has a duration that exceeds the MCOT 415, the LBT procedure 430 may be a shorter type of LBT procedure (e.g., a 25 LBT procedure), but a longer type of LBT procedure (e.g., a category 4 (CAT 4) LBT procedure) needs to be performed before continuing the uplink transmission past the end of the MCOT 415. Alternatively, the UE may determine that, because the uplink transmission has a duration that exceeds the MCOT 415, the LBT procedure 430 may need to be a longer type of LBT procedure (e.g., a CAT 4 LBT procedure). A longer LBT procedure may be performed using parameters for a LBT priority class. When performing a LBT procedure associated with a LBT priority class, the UE may continue to transmit as long as allowed by the parameters of the LBT priority class (subject to scheduling constraints of the base station).

In some examples, the transmission opportunity 410 may include more than one DL-UL transition (e.g., more than one instance of a downlink period 420 followed by an uplink period 425).

In some examples, the LBT procedure 305 or 405 performed by the base station as described with reference to FIGS. 3 and 4 may be performed for multiple carriers included in a multiple-carrier transmission opportunity. Similarly, the LBT procedure 330 or 430 performed by the UE as described with reference to FIGS. 3 and 4 may be performed for multiple carriers included in a multiple-carrier transmission opportunity.

In some examples, a UE may perform a LBT procedure during a contention window having a contention window size. When a UE performs a LBT procedure to contend for access to a channel of a shared radio frequency spectrum band, but does not gain access to the shared radio frequency spectrum band, the contention window size may be adjusted and the UE may perform the LBT procedure again based at least in part on the updated contention window size.

A contention window size used by a UE to contend for access to a shared radio frequency spectrum band (e.g., a contention window size for a Cat 4 LBT procedure) may be determined (e.g., initialized, adjusted, or reset) by a network access device, a UE, or a combination thereof. In some examples, a contention window size may be determined based at least in part on the transmissions made in or for, or the transmissions received in or for, a reference scheduled transmission burst including a plurality of contiguous TTIs (e.g., uplink TTIs or uplink subframes) transmitted/received over a shared radio frequency spectrum band. In some examples, a contention window size may be determined based at least in part on the transmissions made in or for, or the transmissions received in or for, a reference TTI of a reference scheduled transmission burst transmitted over a shared radio frequency spectrum band.

In an example in which a network access device determines a contention window size usable by a UE, the UE may begin transmitting TTIs (e.g., uplink TTIs or uplink subframes) of a reference scheduled transmission burst over a shared radio frequency spectrum band, and the network access device may monitor for a first reference signal (e.g., a sounding reference signal (SRS) or demodulation reference signal (DMRS)) received from the UE in the reference scheduled transmission burst. Upon detecting the first reference signal, the network access device may identify a reference TTI in which the first reference signal is received. The network access device may then determine one or more of the following: whether a transport block (TB) on a scheduled physical uplink shared channel (PUSCH) of the reference TTI is correctly decoded; whether aperiodic channel state information (CSI) without a PUSCH is triggered on the reference TTI; whether a physical uplink control channel (PUCCH) with a cyclic redundancy check (CRC) is scheduled in the reference TTI and correctly decoded; whether a random access preamble scheduled on a physical random access channel (PRACH) in the reference TTI (e.g., a PRACH Msg 1) is correctly decoded; whether a first scheduled uplink transmission associated with a random access procedure and received in the reference TTI (e.g., a PRACH Msg 3) is correctly decoded, or a combination thereof.

In response to correctly decoding a TB on a scheduled PUSCH of the reference TTI, the network access device may reset the contention window size used by the UE (e.g., to an initial contention window size or a smallest contention window size). In response to determining aperiodic CSI without a PUSCH is triggered on the reference TTI, the network access device may not update the contention window size. In response to correctly decoding a PUCCH with a CRC scheduled in the reference TTI, the network access device may reset the contention window size. In response to correctly decoding a random access preamble scheduled on a PRACH in the reference TTI, the network access device may reset the contention window size. In response to correctly decoding a first scheduled uplink transmission associated with a random access procedure, which first scheduled uplink transmission is received in the reference TTI, the network access device may reset the contention window size. Otherwise, the network access device may increase the contention window size to a next highest value for all LBT priority classes. The network access device may transmit an indication of the determined contention window size to the UE.

A potential advantage of determining the contention window size used by a UE at a network device is a reduction in overhead at the UE and an ability to determine the contention window size based at least in part on the network access device's success in receiving and correctly decoding transmissions of the UE.

In an example in which a UE determines a contention window size used by the UE, the UE may receive at least one uplink grant for a reference scheduled transmission burst including a plurality of contiguous TTIs (e.g., uplink TTIs or uplink subframes) transmitted over a shared radio frequency spectrum band. In some examples, the UE may receive all of the uplink grants for the reference scheduled transmission burst. In other examples, the UE may not receive all of the uplink grants for the reference scheduled transmission burst. At least a first uplink grant may include a first indication that the uplink grant is associated with a first scheduled TTI of the reference scheduled transmission burst, a second indication of a position of the first scheduled TTI within the reference scheduled transmission burst (e.g., an indication that the first scheduled TTI is associated with a TTI number that is two less than the number of the TTI scheduled by the current uplink grant), or a combination thereof. In some examples, each uplink grant for the reference scheduled transmission burst may include an indication of the position of the first scheduled TTI of the reference scheduled transmission burst.

The UE may transmit during at least one TTI of the reference scheduled transmission burst, beginning with a first transmission TTI. The first transmission TTI may or may not coincide with the first scheduled TTI, depending on whether the UE received and correctly decoded the uplink grant for the first scheduled TTI.

A network access device may monitor for TTIs of the reference scheduled transmission burst and identify a first TTI of the reference scheduled transmission burst in which the network access device correctly decodes at least one TB transmitted by the UE. This first TTI may be identified (e.g., by the network access device) as a reference TTI of the reference scheduled transmission burst. Alternatively, the network access device may identify the reference TTI as a first TTI of the reference scheduled transmission burst in which the network access device correctly decodes at least one of: a PUCCH with a CRC; a random access preamble scheduled on a PRACH (e.g., a PRACH Msg 1); a first scheduled uplink transmission associated with a random access procedure (e.g., a PRACH Msg 3). The network access device may transmit an indication of the reference TTI to the UE. In some examples, the indication of the reference TTI may be an indication relative to the first scheduled TTI. When the network access device does not correctly decode at least one TB transmitted by the UE, the network access device may, in some examples, indicate to the UE that no reference TTI was identified.

In response to receiving the indication of the reference TTI, the UE may determine a contention window size used by the UE to contend for access to the shared radio frequency spectrum band. The contention window size may be determined based at least in part on a relationship between the first scheduled TTI, the reference TTI, and the first transmission TTI. For example, the UE may determine, based at least in part on a first relationship between the reference TTI and the first scheduled TTI, and based at least in part on a second relationship between the first transmission TTI and the first scheduled TTI, a third relationship between the first transmission TTI and the reference TTI. When the first transmission TTI is determined to be an earlier TTI than the reference TTI, the UE may increase the contention window size used by the UE. When the first transmission TTI is determined to be a later TTI than the reference TTI, the UE may not update the contention window size. When the first transmission TTI is the reference TTI, the contention window size may be reset (e.g., to an initial contention window size or a smallest contention window size).

A potential advantage of determining the contention window size used by a UE at the UE is that both network access device and UE information regarding transmission activity may be factored into the contention window size determination.

In another example in which a UE determines a contention window size used by the UE, the UE may transmit a reference scheduled transmission burst including a plurality of contiguous TTIs (e.g., uplink TTIs or uplink subframes) over a shared radio frequency spectrum band. The UE may monitor for HARQ acknowledgement (ACK) for the transmission TTIs, and may identify a first of the TTIs for which a HARQ ACK is received as a reference TTI. The UE may also identify a HARQ process corresponding to the reference TTI. The UE may then monitor for an instance of the HARQ process associated with a TTI subsequent to the reference TTI. The instance of the HARQ process may be identified based at least in part on: whether the TTI is within the reference scheduled transmission burst or a subsequent transmission burst, whether the TTI includes aperiodic CSI without a PUSCH, or a combination thereof. In some examples, the identified instance of the HARQ process may be a first instance of the HARQ process that is transmitted within the reference scheduled transmission burst and does not include aperiodic CSI without a PUSCH. The UE may determine a contention window size used to contend for access to the shared radio frequency spectrum band based on a state of a new data indicator (NDI) associated with the identified instance of the HARQ process.

As described with reference to FIG. 3 or 4, a network access device may reserve a shared radio frequency spectrum band for a MCOT after successfully contending for access to the shared radio frequency spectrum band. In some examples, the network access device may signal, to a UE, a type of LBT procedure that the UE needs to perform before transmitting in a set of one or more TTIs. In some examples, the type of LBT procedure may include a LBT procedure associated with a smaller contention window size (e.g., a 25 µs single slot LBT procedure) when an uplink transmission begins within a MCOT of the network access device, and a LBT procedure associated with a larger contention window size (e.g., a Cat 4 LBT procedure) when the uplink transmission extends outside the MCOT of the network access device. In some examples, the type of LBT procedure that the UE needs to perform (or needs to have performed), if any, may be signaled in each uplink grant. In some examples, the signaling in an uplink grant may include one bit indicating whether the UE needs to perform a first type of LBT procedure or a second type of LBT procedure. However, a UE may be unable to employ power saving techniques when the type of LBT procedure to be performed is indicated in uplink grants, because the indication is just available to scheduled UEs.

In addition to, or as an alternative to, signaling a type of LBT procedure to be performed by a UE in an uplink grant transmitted to the UE, a network access device may indicate a remaining channel occupancy time (RCOT) of the network access device to the UE. The UE may then determine, based at least in part on the RCOT, a type of LBT procedure to be performed (or to have been performed) before transmitting in a TTI.

The LBT priority class and/or other parameters that a UE uses to configure a Cat 4 LBT procedure may be signaled to the UE by a network access device or determined by the UE. For example, a UE may transmit a buffer status report (BSR) to a network access device, and the network access device may determine, based at least in part on the BSR, a LBT priority class (or other LBT parameters) for the UE to use when performing a Cat 4 LBT procedure. The network access device may then schedule TTIs and gaps for a shared radio frequency spectrum band according to the determined LBT priority class, and may signal the determined LBT priority class (or an associated contention window size) to the UE. The UE may contend for access to the shared radio frequency spectrum band (e.g., perform a Cat 4 LBT procedure) based at least in part on the signaled LBT priority class, contention window size, or other LBT parameters. Regardless of the LBT priority class used when performing the Cat 4 LBT procedure, the UE may use logical channel prioritization (LCP) when transmitting during the TTI(s) for which the Cat 4 LBT procedure was performed. In some examples, the BSR transmitted to the network access device, by the UE, maybe a first type of BSR including an indication of an amount of data to be transmitted for each of a plurality of LBT priority classes. The amount of data to be transmitted for each LBT priority class may be used by the network access device, in some examples, to determine whether scheduling the UE in multiple TTIs would lead to the UE likely transmitting data associated with different LBT priority classes in different TTIs. In some examples, the network access device may determine the LBT priority class to be used by the UE based on the amounts of data that the UE has buffered for different LBT priority classes, or the network access device may determine different LBT priority classes to be performed by the UE for different TTIs in which the UE is scheduled to transmit.

Instead of signaling a determined LBT priority class (or other LBT parameters) to a UE, a network access device may receive a BSR from a UE and determine, based at least in part on the BSR, a LBT priority class (or other LBT parameters) that the UE is likely to use when performing a Cat 4 LBT procedure. The network access device may then schedule TTIs and gaps for a shared radio frequency spectrum band according to the determined LBT priority class, and may optionally signal, to the UE, a LBT priority class boundary (or an associated contention window size boundary). The LBT priority class boundary may be, for example, a highest LBT priority class usable by the UE, a lowest LBT priority class usable by the UE, or a combination thereof. Independently from the LBT priority class determination made by the network access device, or based at least in part on the LBT priority class boundary signaled by the network access device, the UE may select a LBT priority class for performing a Cat 4 LBT procedure. The UE's selection of a LBT priority class may be based at least in part on a type of data to be transmitted over a shared radio frequency spectrum band by the UE and/or on a number of TTIs in which the UE is scheduled. The UE may contend for access to the shared radio frequency spectrum band (e.g., perform a Cat 4 LBT procedure) based at least in part on the selected LBT priority class. Regardless of the LBT priority class used when performing the Cat 4 LBT procedure, the UE may use LCP when transmitting during the TTI(s) for which the Cat 4 LBT procedure was performed.

In some examples, a network access device may signal (e.g., in a first uplink grant) that a UE should perform a first LBT procedure in accordance with a first LBT priority class before transmitting in a first set of one or more TTIs over a shared radio frequency spectrum band, but the UE may not win contention for access to a shared radio frequency spectrum band for the first set of one or more TTIs. The network access device may then signal (e.g., in a second uplink grant) that the UE should perform a second LBT procedure in accordance with a second LBT priority class before transmitting in a second set of one or more TTIs over the shared radio frequency spectrum band. In some examples, the UE may perform the second LBT procedure without regard to the LBT state at the (unsuccessful) conclusion of the first LBT procedure. In other examples, the UE may perform the second LBT procedure based at least in part on the LBT state at the conclusion of the first LBT procedure. For example, when the first LBT priority class and the second LBT priority class are the same LBT priority class, the UE may initialize the second LBT procedure based at least in part on the LBT state at the conclusion of the first LBT procedure (e.g., a CCA slot countdown counter for the second LBT procedure may be initialized to a reduced value, if any, corresponding to the terminal value of the CCA slot countdown counter used for the first LBT procedure). When the first LBT priority class and the second LBT priority class are different LBT priority classes, the UE may initialize the second LBT procedure based at least in part on an adjustment to the LBT state at the conclusion of the first LBT procedure (e.g., an adjustment based on a difference between the first LBT priority class and the second LBT priority class). For example, consider a scenario in which the first LBT priority class is lower than the second LBT priority class, the first LBT priority class has a defer time of 3 CCA slots (after 16 µs) and a 7 CCA slot countdown counter, and the CCA slot countdown counter was interrupted once (leaving a defer time of 2 CCA slots). In this scenario, the LBT state associated with the first LBT procedure may be adjusted, based on a second LBT priority class associated with a defer time of 2 CCA slots, to a defer time of 2 CCA slots and a 9 CCA slot countdown timer. In a scenario in which the first LBT priority class is higher than the second LBT priority class, a UE may track how many CCA slots are successfully cleared after each defer time (e.g., by tracking CCA clearance in each CCA slot).

When a transmission opportunity (TxOP) contains downlink TTIs and uplink TTIs, the contention window size used by a network access device to contend for access to a shared radio frequency spectrum band may be determined (e.g., initialized, adjusted, reset) based at least in part on feedback (e.g., physical downlink shared channel (PDSCH) HARQ ACK/NACK feedback) received from one or more UEs for a downlink reference TTI of the TxOP. Alternatively, the contention window size may be determined based at least in part on feedback (e.g., PDSCH HARQ ACK/NACK feedback) received from one or more UEs for the downlink reference TTI, and also based at least in part on at least one uplink transmission received in an uplink TTI scheduled in the downlink reference TTI. For example, the contention window size may be based at least in part on a success or failure of decoding at least one channel scheduled in the uplink TTI. In some examples, the success or failure of decoding the at least one channel may be based at least in part on ACK/NACK feedback for the at least one channel. In some examples, the at least one channel may include a PUSCH, a PUCCH, or a PRACH.

Before transmitting a multi-carrier transmission over a shared radio frequency spectrum band, a UE may perform a LBT procedure for one or more carriers in a plurality of carriers allocated for the multi-carrier transmission. In some examples, a UE may receive scheduling information for an uplink transmission to be made over a plurality of carriers of a shared radio frequency spectrum band, and may perform a separate LBT procedure (e.g., a separate Cat 4 LBT procedure) for each carrier. A separate CCA slot countdown counter may be maintained for each LBT procedure. In other examples, a UE may perform a separate LBT procedure (e.g., a separate Cat 4 LBT procedure) for each carrier on which an uplink transmission of the UE is scheduled, and maintain a joint CCA slot countdown counter for each LBT procedure. In further examples, a UE may perform a first type of LBT procedure (e.g., a Cat 4 LBT procedure) for one carrier of a plurality of carriers on which an uplink transmission of the UE is scheduled, and may perform a second type of LBT procedure for each other carrier in the plurality of carriers. In some examples, the second type of LBT procedure may be associated with a smaller contention window size than the first type of LBT procedure. For example, the second type of LBT procedure may be associated with a 25 LBT procedure. In some examples, the carrier for which the first type of LBT procedure is performed may be identified based at least in part on an indication received from a network access device. The indication may be received, for example, in uplink downlink control information (DCI) for the identified carrier, or in uplink DCI for each carrier of the plurality of carriers on which the UE is scheduled. When a network access device transmits the indication on each carrier on which a UE is scheduled, the UE may be more likely to receive the indication (and conversely, when a network access device transmits the indication on just the carrier identified by the indication, the UE may be less likely to receive the indication (e.g., because the UE is more likely to receive uplink DCI for at least one of a plurality of carriers than it is likely to receive uplink DCI for one particular carrier). In other examples, the carrier for the first type of LBT procedure is performed may be identified by the UE independently. In some examples, a UE that does not receive a network access device's indication of a carrier for which to perform the first type of LBT procedure may, as a fallback, independently identify a carrier for which to perform the first type of LBT procedure. In all of the above examples, the UE may transmit a transmission (and in some examples, a multi-carrier transmission) on each of the plurality of carriers on which the UE is scheduled and wins contention for access.

In some examples, a UE may use the same energy detection threshold for all types of LBT procedures. In other examples, a UE may use different energy detection thresholds for different types of LBT procedures (e.g., a first energy detection threshold for a first type of LBT procedure, and a second energy detection threshold for a second type of LBT procedure). For example, a UE may perform a 25 µs LBT procedure using a −72 dBm energy detection threshold (or a same energy detection threshold used by a network access device when performing a LBT procedure prior to transmitting on a downlink), and may perform a Cat 4 LBT procedure using a different (e.g., lower) energy detection threshold (e.g., an energy detection threshold lower than −72 dBm).

In some examples, a UE may begin performing a LBT procedure upon receiving an uplink grant, or in a next TTI following receipt of an uplink grant, or at a next symbol period boundary or next CCA slot boundary following receipt of an uplink grant. In some examples, the UE may begin performing the LBT procedure regardless of whether the UE is currently receiving a transmission. In other examples, the UE may be prohibited from performing a LBT procedure, or prohibited from updating a countdown timer associated with the performance of a LBT procedure, while the UE is receiving a transmission (e.g., from a network access device or another device). The UE may also or alternatively be prohibited from performing a LBT procedure, or updating a countdown timer associated with the performance of a LBT procedure, during a TTI in which the UE receives a transmission (e.g., from a network access device or another device). For example, a UE may receive (e.g., from a network access device) an indication that the UE cannot update a countdown counter associated with performance of a LBT procedure during a TTI in which the UE receives a transmission. When the UE then determines the UE is receiving a transmission during a TTI, the UE may refrain from at least one of: performing a LBT procedure during the TTI, updating a countdown counter associated with performance of the LBT procedure, or a combination thereof. In some examples, refraining from updating a countdown counter may include updating the countdown counter during a TTI, but rolling back the countdown counter so that a value of the countdown counter at the end of the TTI is the same as the value of the countdown counter at the beginning of the TTI. In some examples, the indication that the UE cannot update the countdown counter may be received in at least one of RRC signaling, a system information block (SIB), DCI, or a combination thereof.

In some examples, frequency resources may be allocated to a PUSCH in interlaced sets. For example, a set of 100 resource blocks (RBs) spanning a system bandwidth may be divided into 10 interlaces, with each interlace allocated 10 non-contiguous RBs in the frequency domain. When allocating a number of interlaces to a PUSCH, the interlaces may be allocated in a number of ways. For example, a bitmap may include one bit per interlace (i.e., a total of 10 bits), and a bit corresponding to an interlace may be set when the interlace is allocated and cleared when the interlace is not allocated. Alternatively, a number of interlaces may be allocated to a PUSCH using a resource indication value (MV). A MV for allocating one or more of 10 interlaces to a PUSCH may include 6 bits, which bits may indicate a first interlace and number of interlaces contiguous with the first interlace that are allocated to a PUSCH. Alternatively, a number of interlaces may be allocated to a PUSCH using an extended length MV. The extended length MV may include one or more additional bits, which additional bits enable the allocation of some custom interlace combinations to a PUSCH. The custom interlace combinations may include interlace combinations that anticipate the allocation of a PUCCH or PRACH that overlaps a PUSCH in the frequency domain.

When a PUCCH or PRACH is allocated resources that overlap the resources allocated to a PUSCH in the frequency domain, or when a PUSCH is allocated a custom interlace combination, the modulation and coding scheme (MCS) for the PUSCH may be rate-matched around the PUCCH or PRACH. A PUSCH may also be rate-matched around a SRS. However, in the case of a multi-TTI grant in which a MCS is indicated for all of the TTIs in the grant, the MCS cannot be rate-matched around different channels or signals transmitted in different TTIs. In some examples, one or more MCS offsets may be signaled to a UE to enable rate-matching around channels or signals that reduce, in a TTI, the number of resource elements (REs) available for transmission of a PUSCH. In some examples, one or more TBS offsets or other transmission parameters may also or alternatively be signaled to a UE.

In one example, a network access device may transmit (and a UE may receive) an indication of a transmission parameter (e.g., a MCS or TBS) for an uplink transmission to be made over a shared radio frequency spectrum band during at least one TTI. The UE may identify the content of the uplink transmission in each TTI, and may optionally scale the received transmission parameter (e.g., the MCS or TBS) for a TTI having a content that differs (or differs enough) from a nominal content of a TTI. In some examples, the nominal content of a TTI may include a PUSCH, and the content of a TTI for which the transmission parameter may be scaled may include, for example, at least one of: a number of REs that differs (or differs enough) from a number of REs in the nominal content, a number of punctured symbol periods (e.g., for a LBT procedure, transmission of a SRS, etc.), a PUCCH, a PRACH, a SRS, or a combination thereof. Upon identifying a TTI having a content that differs (or differs enough) from the nominal content of a TTI, the UE may scale a transmission parameter for the identified TTI. In some examples, scaling the transmission parameter may include switching to a fixed alternative transmission parameter. In some examples, scaling the transmission parameter may include computing an alternative transmission parameter based at least in part on a comparison of the identified content to the nominal content. A UE may or may not scale a transmission parameter, or may or may not scale a transmission parameter in the same way, when performing a retransmission of a PUSCH.

In some examples, HARQ ACK feedback for a PDSCH received on a carrier in a shared radio frequency spectrum band may be transmitted on a PUCCH on a carrier in a dedicated radio frequency spectrum band. When a PUCCH transmitted on a carrier in a dedicated radio frequency spectrum band is not available, transmission of the HARQ ACK feedback to a network access device may be delayed. In some examples, it may be undesirable to transmit or receive HARQ ACK feedback on a carrier in a shared radio frequency spectrum band. In other examples, it may not be undesirable to transmit or receive HARQ ACK feedback on a carrier in a shared radio frequency spectrum band. Thus, in some examples, a network access device may transmit, to a UE, a configuration for reporting HARQ ACK feedback for a carrier in a shared radio frequency spectrum band. In some examples, the configuration may include a configuration in one of: a first mode in which the UE transmits HARQ ACK feedback on a PUCCH on a carrier in a dedicated radio frequency spectrum band, or a second mode in which the UE selects to transmit HARQ ACK feedback on the PUCCH on the carrier in the dedicated radio frequency spectrum band or on a PUSCH on the carrier for which the HARQ ACK feedback is provided. The configuration for reporting HARQ ACK feedback may be transmitted, for example, using RRC signaling.

In some examples, a UE may report periodic CSI for a first carrier in a shared radio frequency spectrum band on a second carrier in a dedicated radio frequency spectrum band, and may be prohibited from reporting periodic CSI for the first carrier on the first carrier (or on a PUSCH on the first carrier). In some examples, a UE may report aperiodic CSI for carriers in a dedicated radio frequency spectrum band and carriers in a shared radio frequency spectrum band on a carrier in the shared radio frequency spectrum band, with aperiodic CSI being dropped when a UE does not win contention for access to the shared radio frequency spectrum band for a TTI in which the aperiodic CSI is to be reported. Aperiodic CSI may also be dropped when a TTI in which the aperiodic CSI is to be reported does not include a PUSCH on which to report the aperiodic CSI. To enable a UE's transmission of aperiodic CSI without a PUSCH, a network access device may in some examples transmit, to a UE, an indication of an invalid PUSCH resource allocation for a TTI over a shared radio frequency spectrum band. The invalid PUSCH resource allocation may signal to the UE that the UE can transmit aperiodic CSI in the TTI despite a PUSCH not being scheduled in the TTI. In some examples, the invalid PUSCH resource allocation may include an invalid frequency interlace combination (e.g., 7 interlaces) with a designated bit pattern for a redundancy version (RV) and a NDI. In some examples, the network access device may signal a HARQ ID for the transmission of the aperiodic CSI without a PUSCH. In some examples, the signaled HARQ ID may be considered invalid (i.e., because a PUSCH will not be transmitted in the TTI).

To trigger a transmission of aperiodic CSI without a PUSCH, TTI transmitted on over a shared radio frequency spectrum band, and in a scenario in which the TTI is scheduled by a multi-TTI grant, a network access device may indicate, to a UE, that just the first TTI scheduled by the multi-TTI grant is active. In response to receiving the indication that just the first TTI is active, the UE may transmit aperiodic CSI without a PUSCH in the first TTI.

To trigger the transmission of aperiodic CSI without a PUSCH, in a TTI transmitted on over a shared radio frequency spectrum band, and in a scenario in which the TTI is scheduled by a multi-TTI grant, a network access device may transmit, to the UE, a code point associated with transmission of aperiodic CSI over a shared radio frequency spectrum band, in a TTI scheduled without a PUSCH. When the network access device determines the UE should transmit aperiodic CSI in a TTI without a PUSCH, in which the TTI is scheduled by a multi-TTI grant, the network access device may reference the code point in the multi-TTI grant. The UE may then transmit aperiodic CSI without a PUSCH in the TTI, in accordance with the code point.

In some examples, the transmission of aperiodic CSI without a PUSCH, in a TTI scheduled in a multi-TTI grant and transmitted over a shared radio frequency spectrum band, may not be allowed.

Before transmitting an aperiodic SRS without a PUSCH in a TTI of a shared radio frequency spectrum band, a UE may perform a LBT procedure such as a Cat 3 LBT procedure or a Cat 4 LBT procedure. In some examples, the UE may perform a Cat 3 LBT procedure, and may select a contention window size for performing the Cat 3 LBT procedure. In some examples, the contention window sizes from which the UE may select a contention window size may be limited (e.g., to a contention window size of 3 CCA slots or 7 CCA slots). In other examples, the UE may perform a Cat 3 LBT procedure based on a predetermined or signaled contention window size (e.g., a contention window size of 7 CCA slots). In some examples, the defer time associated with a Cat 3 LBT procedure performed by a UE, prior to transmission of an aperiodic SRS without a PUSCH, may be set to a defer time associated with a highest LBT priority class.

In some examples, a UE may perform a Cat 4 LBT procedure prior to transmitting an aperiodic SRS without a PUSCH in a TTI of a shared radio frequency spectrum band. Because there is no ACK/NACK of SRS transmissions, there may be no information on which to base an adjustment of a contention window size associated with a Cat 4 LBT procedure. In some examples, the contention window size associated with the Cat 4 LBT procedure may be adjusted randomly, by the UE. In other examples, the contention window size associated with the Cat 4 LBT procedure may be adjusted by the network access device, based at least in part on an expected frequency of SRS requests made by the network access device. In some examples, the determined contention window size may be larger when the network access device expects to make a greater number of SRS requests. The network access device may signal the determined contention window size to the UE in RRC signaling or DCI.

In some examples, a SRS may be triggered in a TTI of a shared radio frequency spectrum band in which a PUSCH is scheduled, but because the SRS is triggered and the PUSCH is scheduled using different mechanisms, the scheduling of the PUSCH may not leave a gap for transmitting the SRS. For example, a SRS may be triggered by DCI in a TTI n, and a PUSCH may be scheduled in the TTI n by an uplink grant transmitted/received in an earlier TTI. When the scheduling of the PUSCH does not leave a gap for the SRS, a UE may transmit, during the TTI, one of: the PUSCH rate matched around the SRS, the PUSCH punctured by the SRS, the PUSCH without the SRS, or the SRS without the PUSCH.

In some examples, a network access device may not allocate resources to transmit a PRACH over a shared radio frequency spectrum band. A UE may operate effectively without a PRACH, for example, in scenarios in which there is limited separation between the network access devices that are respectively associated with one or more carriers in a dedicated radio frequency spectrum band and one or more carriers in a shared radio frequency spectrum band (e.g., when the network access devices are in the same timing advance group (TAG)). In other scenarios, the absence of a PRACH may make it more difficult for a UE to effectively initialize a timing advance (TA) or uplink transmit power. In these and other scenarios, a network access device may transmit an indication of a default initial TA for a carrier of a shared radio frequency spectrum band. In some examples, the default initial TA may be a TA of a carrier in a dedicated radio frequency spectrum band, with the carrier in the dedicated radio frequency spectrum band being in a same TAG as the carrier in the shared radio frequency spectrum band. Alternatively, the default initial TA may be a static initial TA (e.g., "0").

A network access device may also transmit an indication of a default uplink transmit power. In some examples, the default initial transmit power may be a maximum uplink transmit power, and a UE that receives the indication of the maximum uplink transmit power may initially transmit at the maximum uplink transmit power, and lower the uplink transmit power in steps when needed. In some examples, the default initial transmit power may be included in a code point transmitted to a UE. For example, a plurality of code points indicating different uplink transmit power adjustment steps may be transmitted to a UE, in addition to a code point providing the indication of the default uplink transmit power. In some examples, the indication of the default uplink transmit power may be transmitted to a UE in at least one of: a SIB, a RRC configuration, or a combination thereof.

Figure 5:
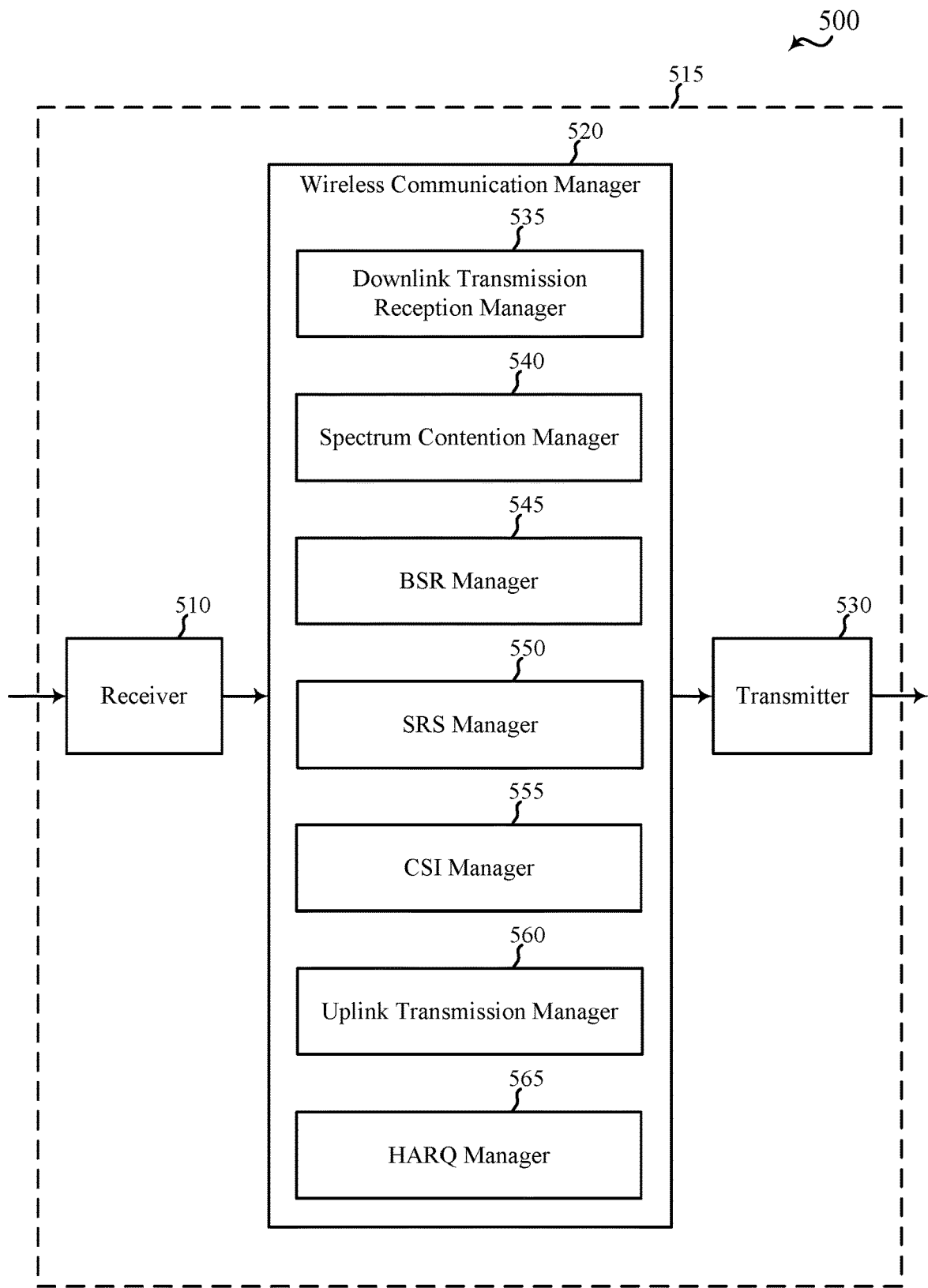
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 215, 215-*a*, or 215-*b* as described with reference to FIG. 1 or 2. The apparatus 515 may also be or include a processor. The apparatus 515 may include a receiver 510, a wireless communication manager 520, or a transmitter 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, or 4. The receiver 510 may be used to receive various types of data or control signals (i.e., "data" or transmissions) over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 530 may include at least one RF transmitter, such as at least one RF transmitter operable to transmit over the dedicated radio frequency spectrum band or the shared radio frequency spectrum band. The transmitter 530 may be used to transmit various types of data or control signals (i.e., "data" or transmissions) over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 520 may be used to manage one or more aspects of wireless communication for the apparatus 515. In some examples, part of the wireless communication manager 520 may be incorporated into or shared with the receiver 510 or the transmitter 530. In some examples, the wireless communication manager 520 may include a downlink transmission reception manager 535, a spectrum contention manager 540, a BSR manager 545, a SRS manager 550, a CSI manager 555, an uplink transmission manager 560, or a HARQ manager.

Figure 13:
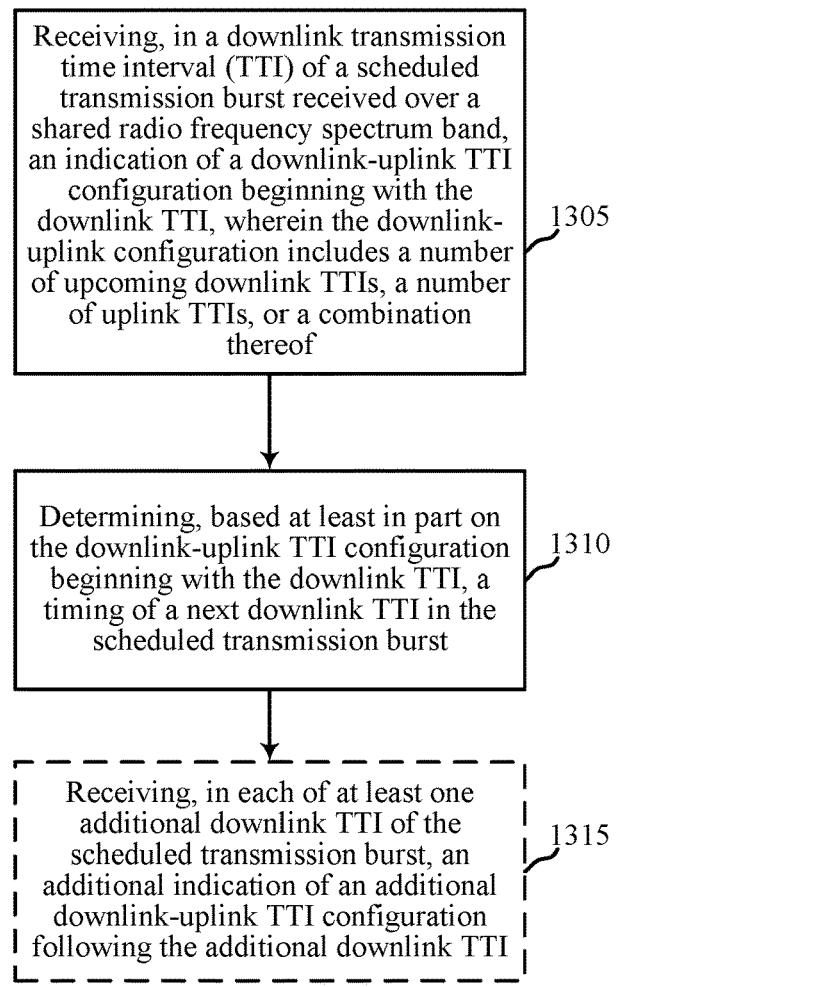
FIG. 13 is a flow chart illustrating an example of a method for wireless communication at a UE, in accordance with various aspects of the present disclosure.
Figure 21:
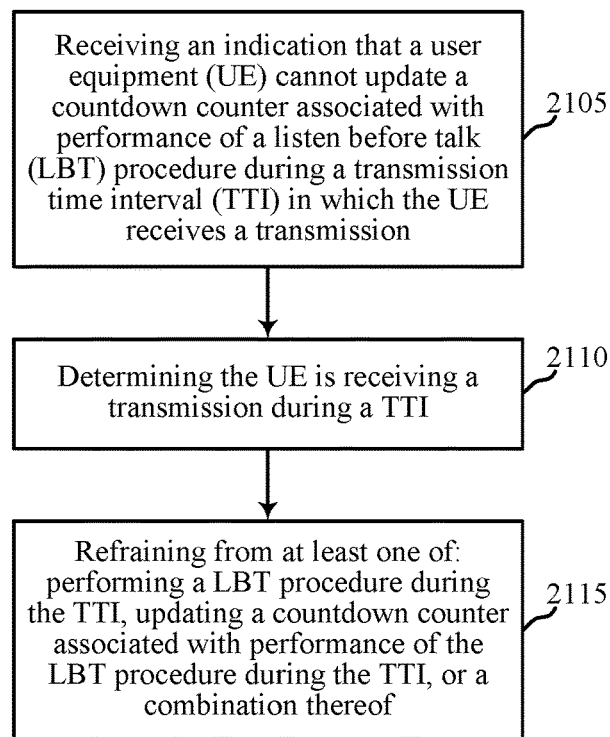
FIG. 21 is a flow chart illustrating an example of a method for wireless communication at a UE, in accordance with various aspects of the present disclosure.

The downlink transmission reception manager 535 may be used, for example, to receive and process downlink transmissions, as described, for example, with reference to FIG. 13 or 21.

The spectrum contention manager 540 may be used, for example, to configure, or to assist in configuring, one or more types of LBT procedure to be performed by the apparatus 515 to contend for access to a shared radio frequency spectrum band (e.g., to a channel of a shared radio frequency spectrum band), as described, for example, with reference to FIG. 10, 11, 14, 15, 16, 18, 20, or 21.

Figure 14:
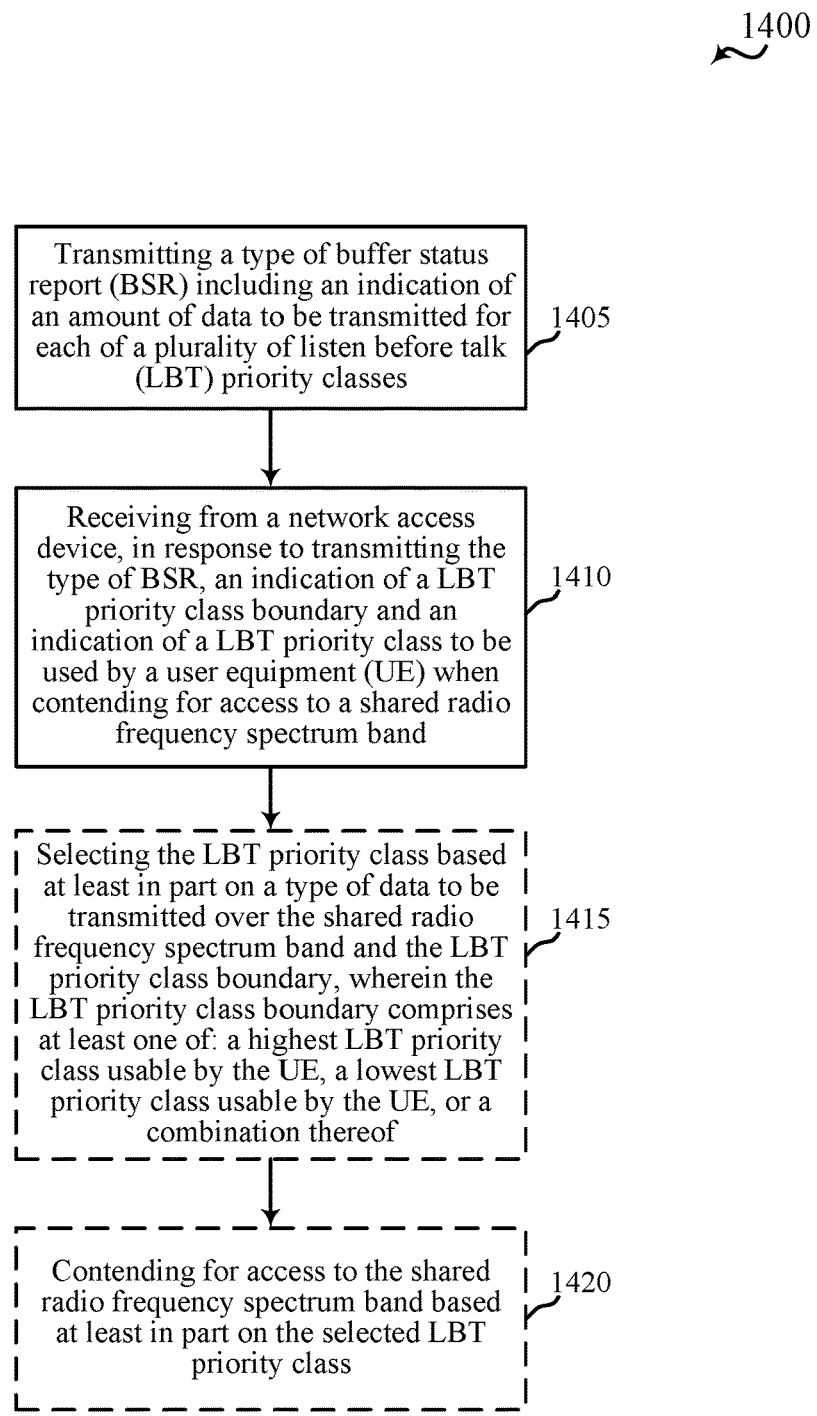
FIG. 14 is a flow chart illustrating an example of a method for wireless communication at a UE, in accordance with various aspects of the present disclosure.
Figure 15:
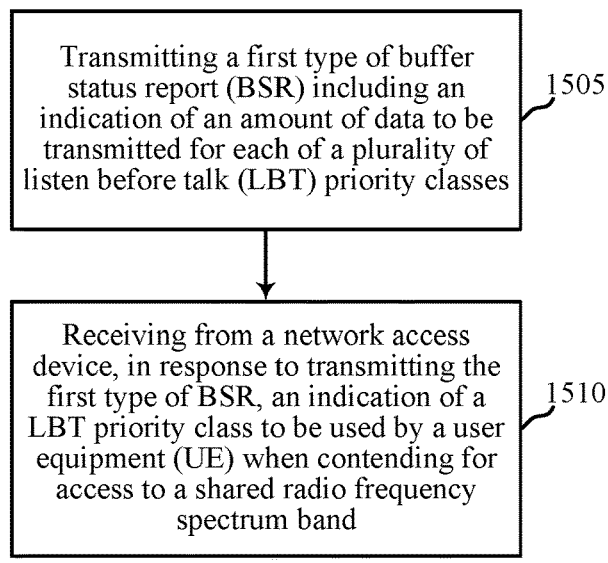
FIG. 15 is a flow chart illustrating an example of a method for wireless communication at a UE, in accordance with various aspects of the present disclosure.

The BSR manager 545 may be used, for example, to configure and transmit one or more types of BSR, as described, for example, with reference to FIG. 14 or 15.

Figure 29:
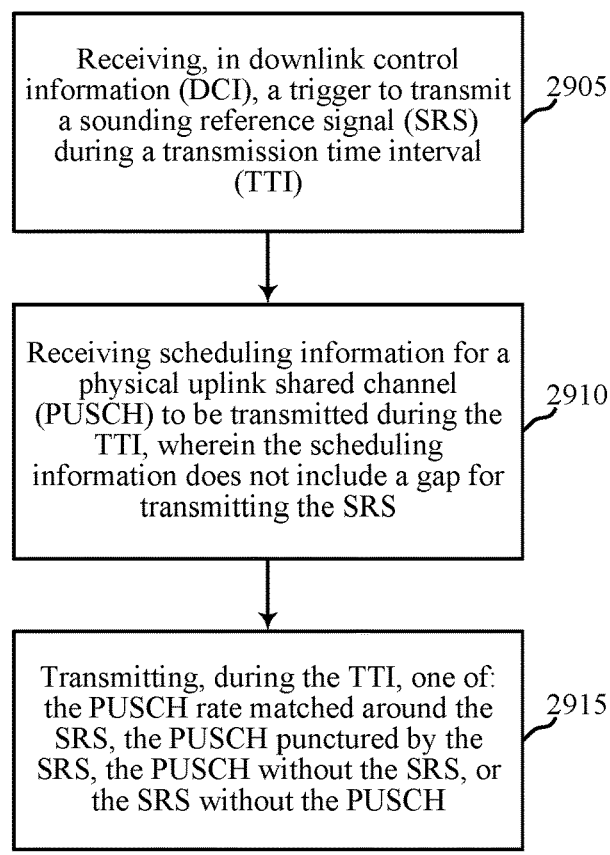
FIG. 29 is a flow chart illustrating an example of a method for wireless communication at a UE, in accordance with various aspects of the present disclosure.

The SRS manager 550 may be used, for example, to allocate resources to and transmit SRS transmissions, including aperiodic SRS transmissions, as described, for example, with reference to FIG. 29.

Figure 25:
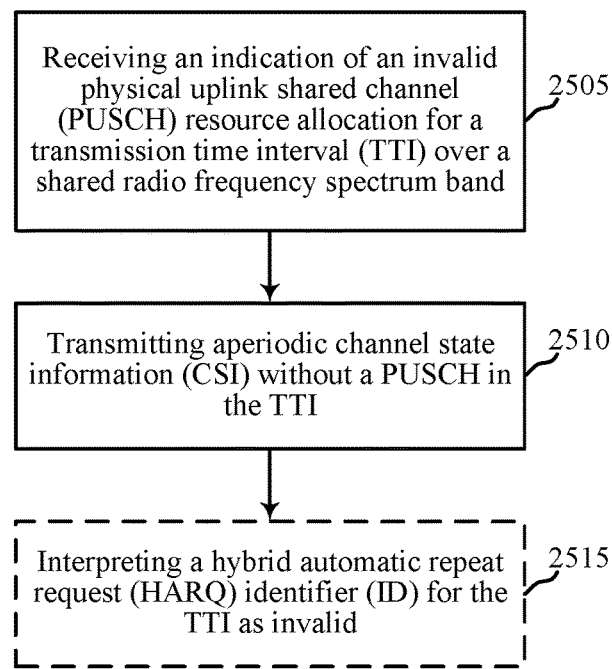
FIG. 25 is a flow chart illustrating an example of a method for wireless communication at a UE, in accordance with various aspects of the present disclosure.
Figure 27:
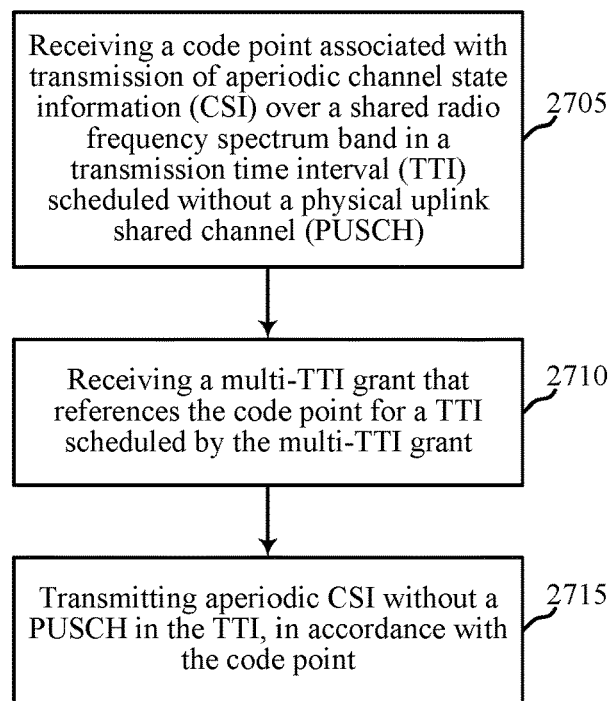
FIG. 27 is a flow chart illustrating an example of a method for wireless communication at a UE, in accordance with various aspects of the present disclosure.

The CSI manager 555 may be used, for example, to acquire and transmit CSI transmissions, including aperiodic CSI transmissions, as described, for example, with reference to FIG. 25 or 27.

The uplink transmission manager 560 may be used, for example, to receive scheduling information for, and transmit, uplink transmissions, as described, for example, with reference to FIG. 10, 11, 12, 16, 18, 22, 27, 29, or 30.

Figure 11:
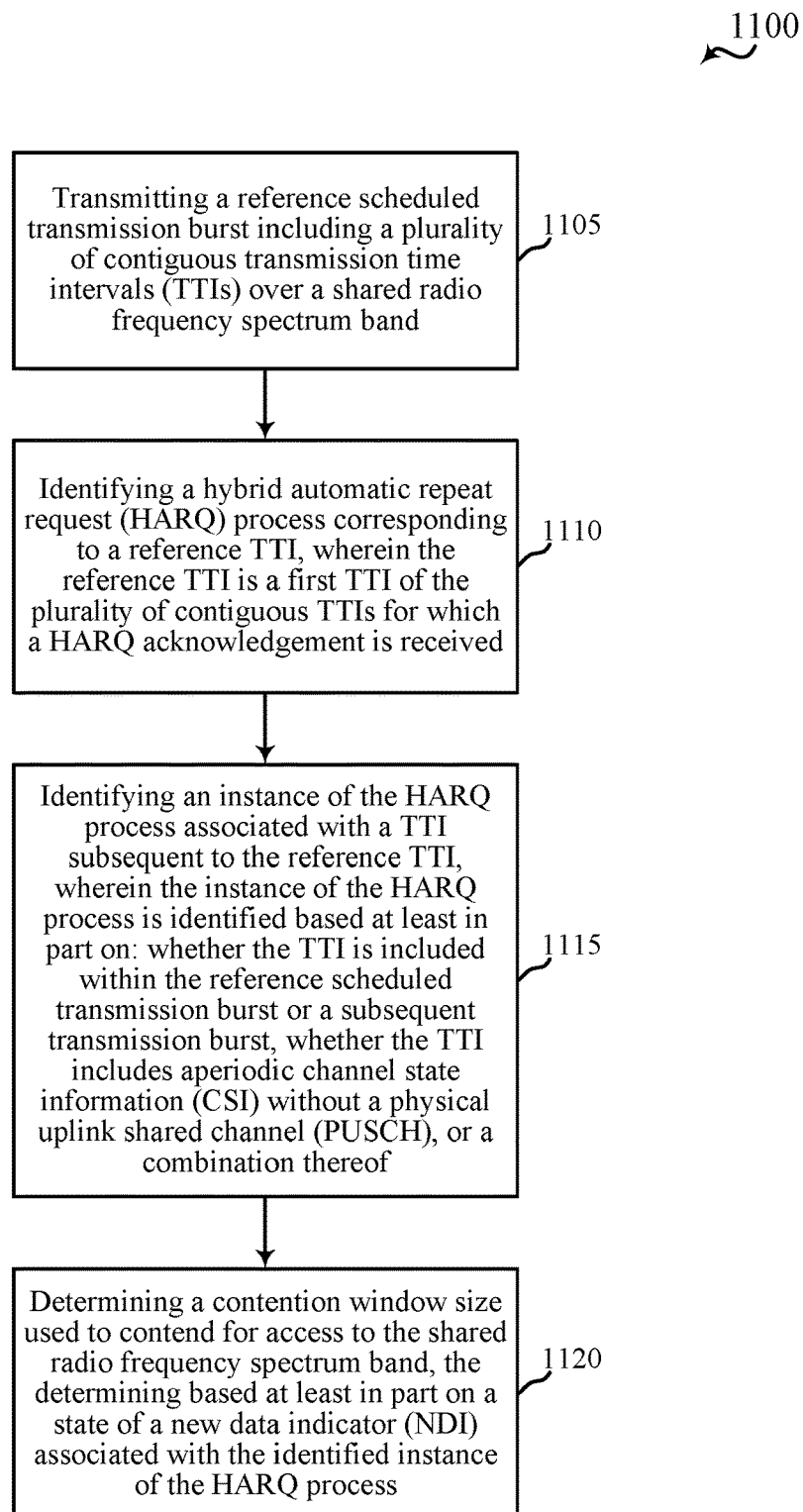
FIG. 11 is a flow chart illustrating an example of a method for wireless communication at a UE, in accordance with various aspects of the present disclosure.
Figure 23:
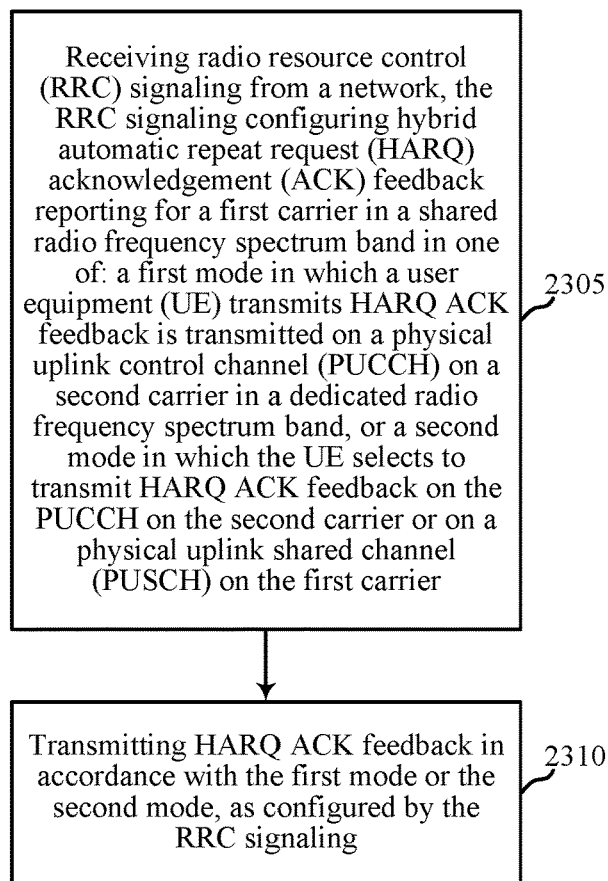
FIG. 23 is a flow chart illustrating an example of a method for wireless communication at a UE, in accordance with various aspects of the present disclosure.

The HARQ manager may be used, for example, to manage HARQ processes (e.g., to transmit HARQ feedback, process HARQ feedback, perform HARQ retransmissions, etc.), as described, for example, with reference to FIG. 11, 23, or 25.

Figure 6:
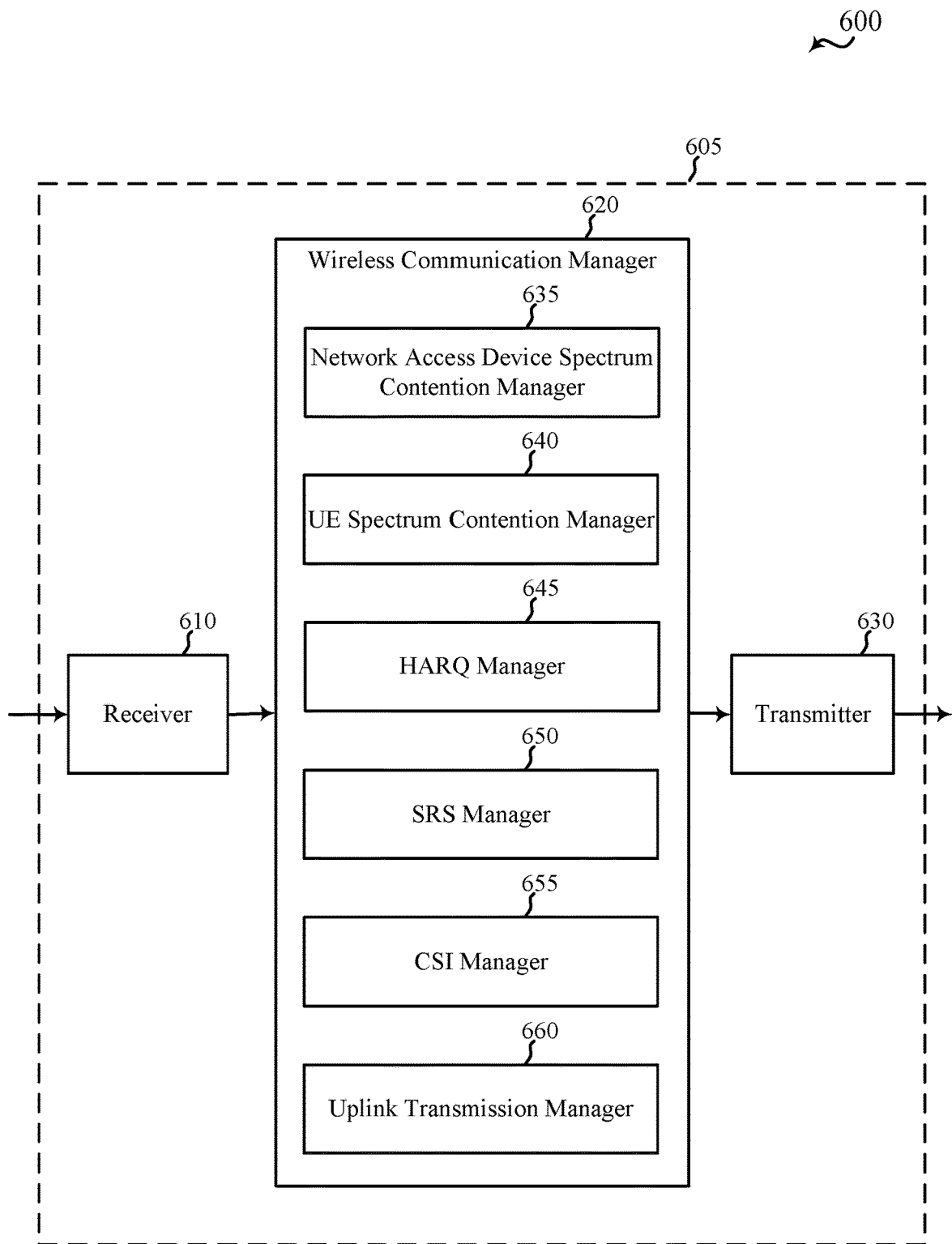
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. The apparatus 605 may be an example of aspects of one or more of the base stations 105, 205, or 205-a as described with reference to FIG. 1 or 2. The apparatus 605 may also be or include a processor. The apparatus 605 may include a receiver 610, a wireless communication manager 620, or a transmitter 630. Each of these components may be in communication with each other.

The components of the apparatus 605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one RF receiver, such as at least one RF receiver operable to receive transmissions over a dedicated radio frequency spectrum band (e.g., a radio frequency spectrum band licensed to particular users for particular uses) or a shared radio frequency spectrum band (e.g., a radio frequency spectrum band available for Wi-Fi use, a radio frequency spectrum band available for use by different radio access technologies, or a radio frequency spectrum band available for use by multiple MNOs in an equally shared or prioritized manner). In some examples, the dedicated radio frequency spectrum band or the shared radio frequency spectrum band may be used for LTE/LTE-A communications, as described, for example, with reference to FIG. 1, 2, 3, or 4. The receiver 610 may be used to receive various types of data or control signals (i.e., "data" or transmissions) over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the transmitter 630 may include at least one RF transmitter, such as at least one RF transmitter operable to transmit over the dedicated radio frequency spectrum band or the shared radio frequency spectrum band. The transmitter 630 may be used to transmit various types of data or control signals (i.e., "data" or transmissions) over one or more communication links of a wireless communication system, such as one or more communication links of the wireless communication system 100 or 200 as described with reference to FIG. 1 or 2. The communication links may be established over the dedicated radio frequency spectrum band or the shared radio frequency spectrum band.

In some examples, the wireless communication manager 620 may be used to manage one or more aspects of wireless communication for the apparatus 605. In some examples, part of the wireless communication manager 620 may be incorporated into or shared with the receiver 610 or the transmitter 630. In some examples, the wireless communication manager 620 may include a network access device spectrum contention manager 635, a UE spectrum contention manager 640, a HARQ manager 645, a SRS manager 650, a CSI manager 655, or an uplink transmission manager 660.

Figure 17:
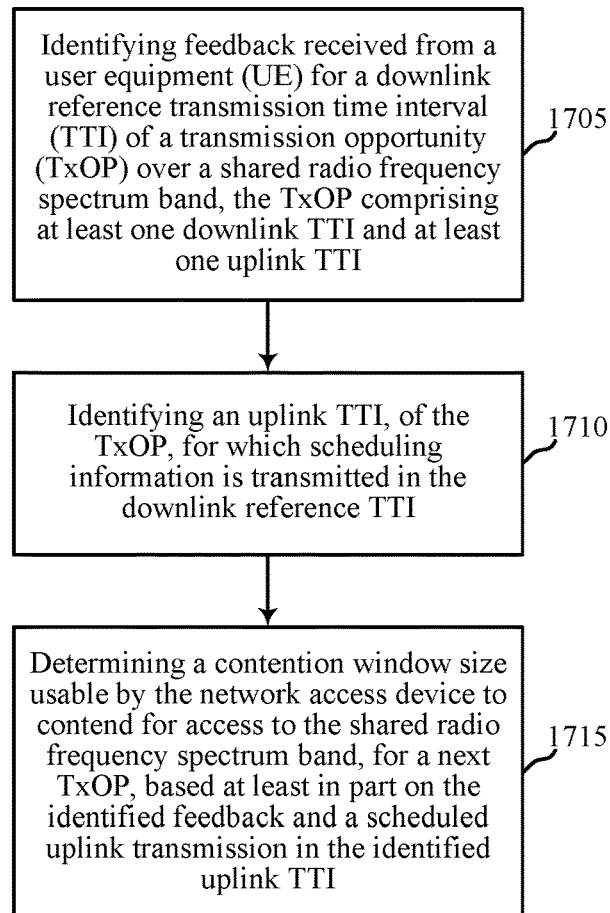
FIG. 17 is a flow chart illustrating an example of a method for wireless communication at a network access device, in accordance with various aspects of the present disclosure.

The network access device spectrum contention manager 635 may be used, for example, to configure and perform one or more types of LBT procedure to contend for access to a shared radio frequency spectrum band (e.g., to a channel of a shared radio frequency spectrum band), as described, for example, with reference to FIG. 17.

Figure 9:
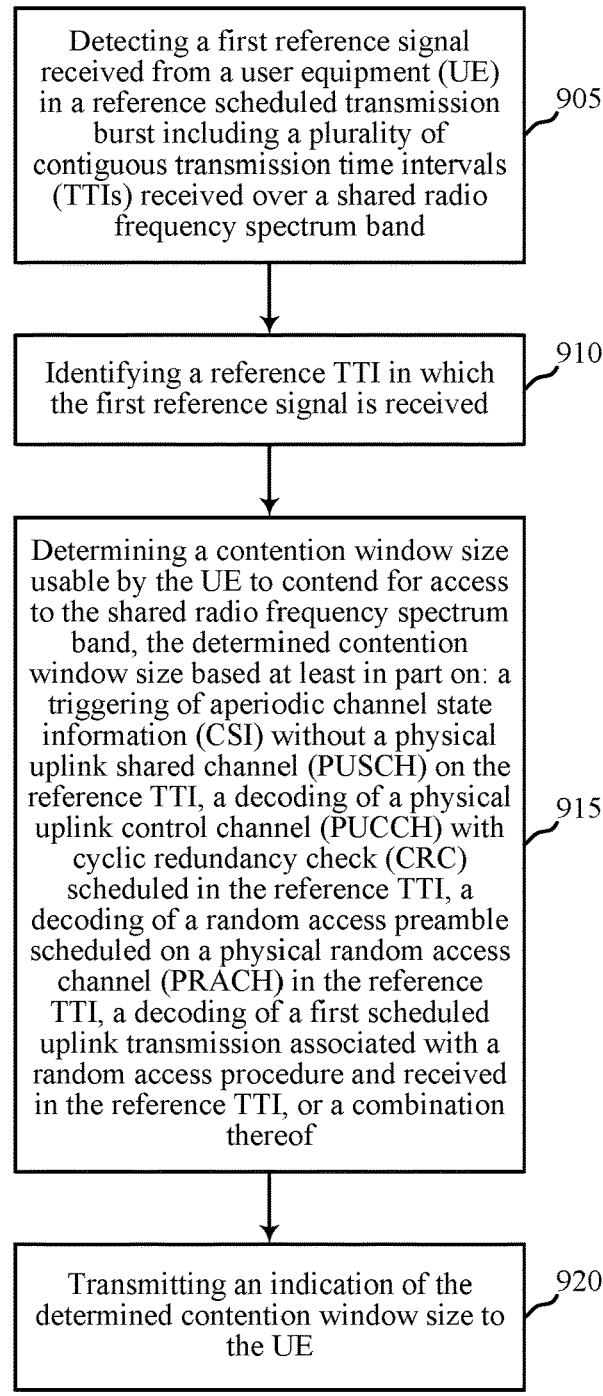
FIG. 9 is a flow chart illustrating an example of a method for wireless communication at a network access device, in accordance with various aspects of the present disclosure.
Figure 19:
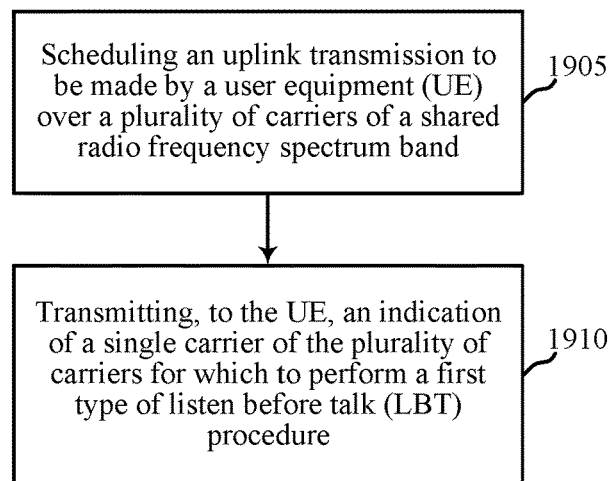
FIG. 19 is a flow chart illustrating an example of a method for wireless communication at a network access device, in accordance with various aspects of the present disclosure.
Figure 28:
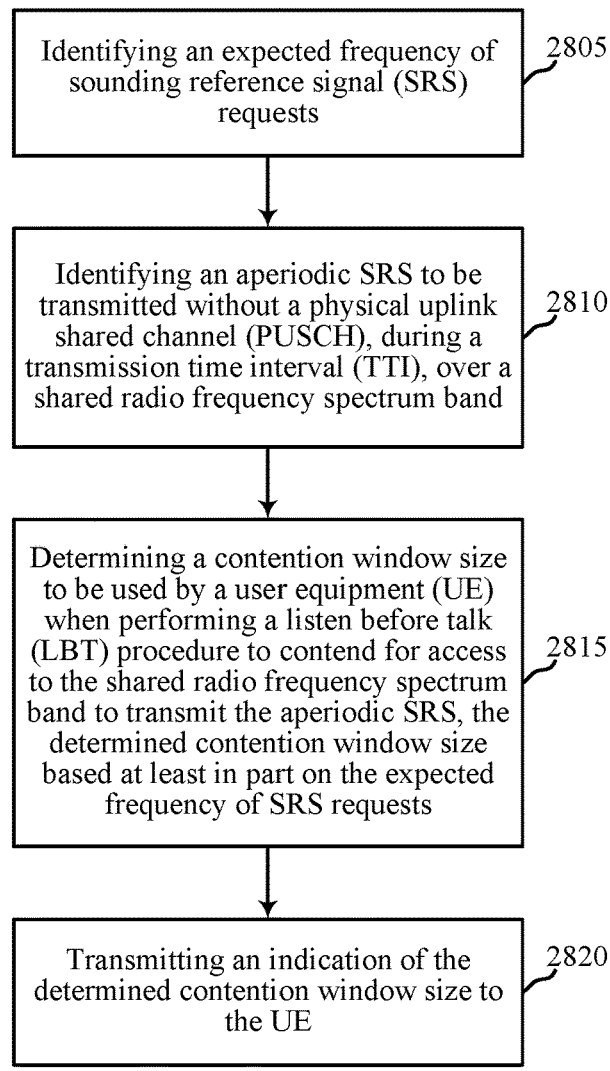
FIG. 28 is a flow chart illustrating an example of a method for wireless communication at a network access device, in accordance with various aspects of the present disclosure.

The UE spectrum contention manager 640 may be used, for example, to configure, or to assist in configuring, one or more types of LBT procedure to be performed by a UE to contend for access to a shared radio frequency spectrum band (e.g., to a channel of a shared radio frequency spectrum band), as described, for example, with reference to FIG. 9, 19, or 28.

Figure 24:
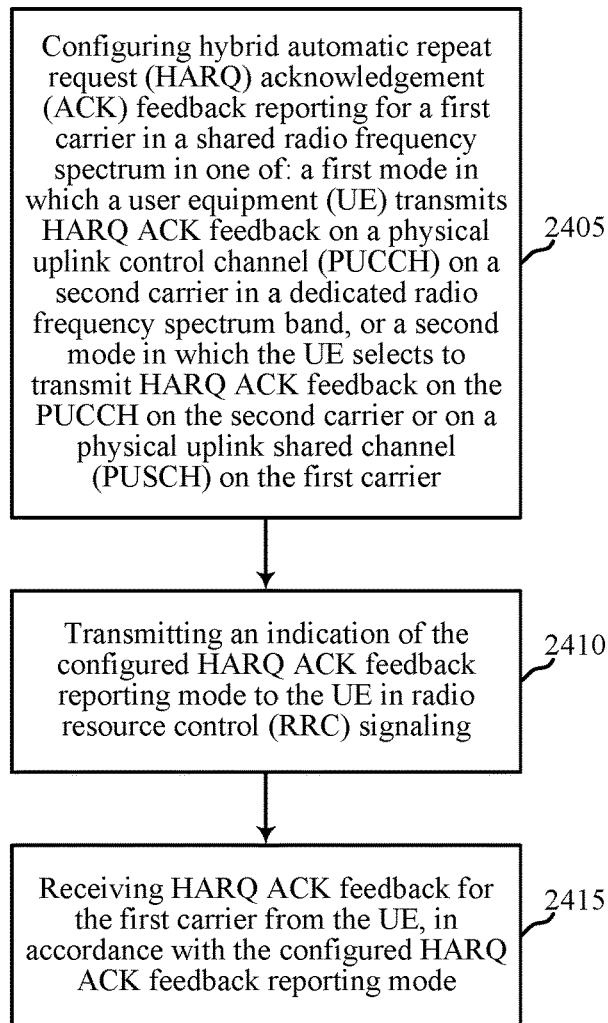
FIG. 24 is a flow chart illustrating an example of a method for wireless communication at a network access device, in accordance with various aspects of the present disclosure.

The HARQ manager 645 may be used, for example, to manage HARQ processes (e.g., to allocate HARQ resources, transmit HARQ feedback, process HARQ feedback, initiate HARQ retransmissions, etc.), as described, for example, with reference to FIG. 17 or 24.

The SRS manager 650 may be used, for example, to allocate resources to, request, and/or process SRS transmissions, including aperiodic SRS transmissions, as described, for example, with reference to FIG. 28.

Figure 26:
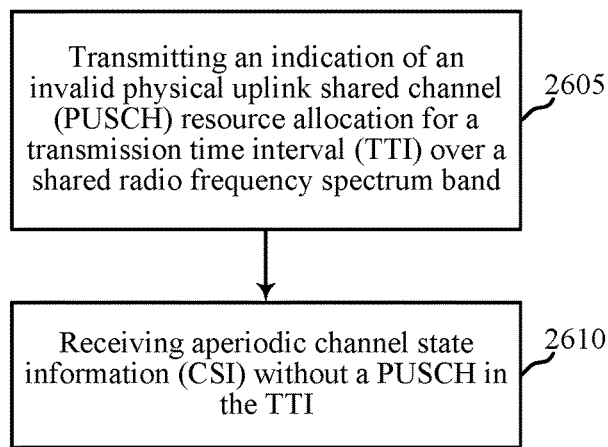
FIG. 26 is a flow chart illustrating an example of a method for wireless communication at a network access device, in accordance with various aspects of the present disclosure.

The CSI manager 655 may be used, for example, to allocate resources to, request, and/or process CSI transmissions, including aperiodic CSI transmissions, as described, for example, with reference to FIG. 26.

The uplink transmission manager 660 may be used, for example, to schedule and receive uplink transmissions, as described, for example, with reference to FIG. 19 or 26.

Figure 7:
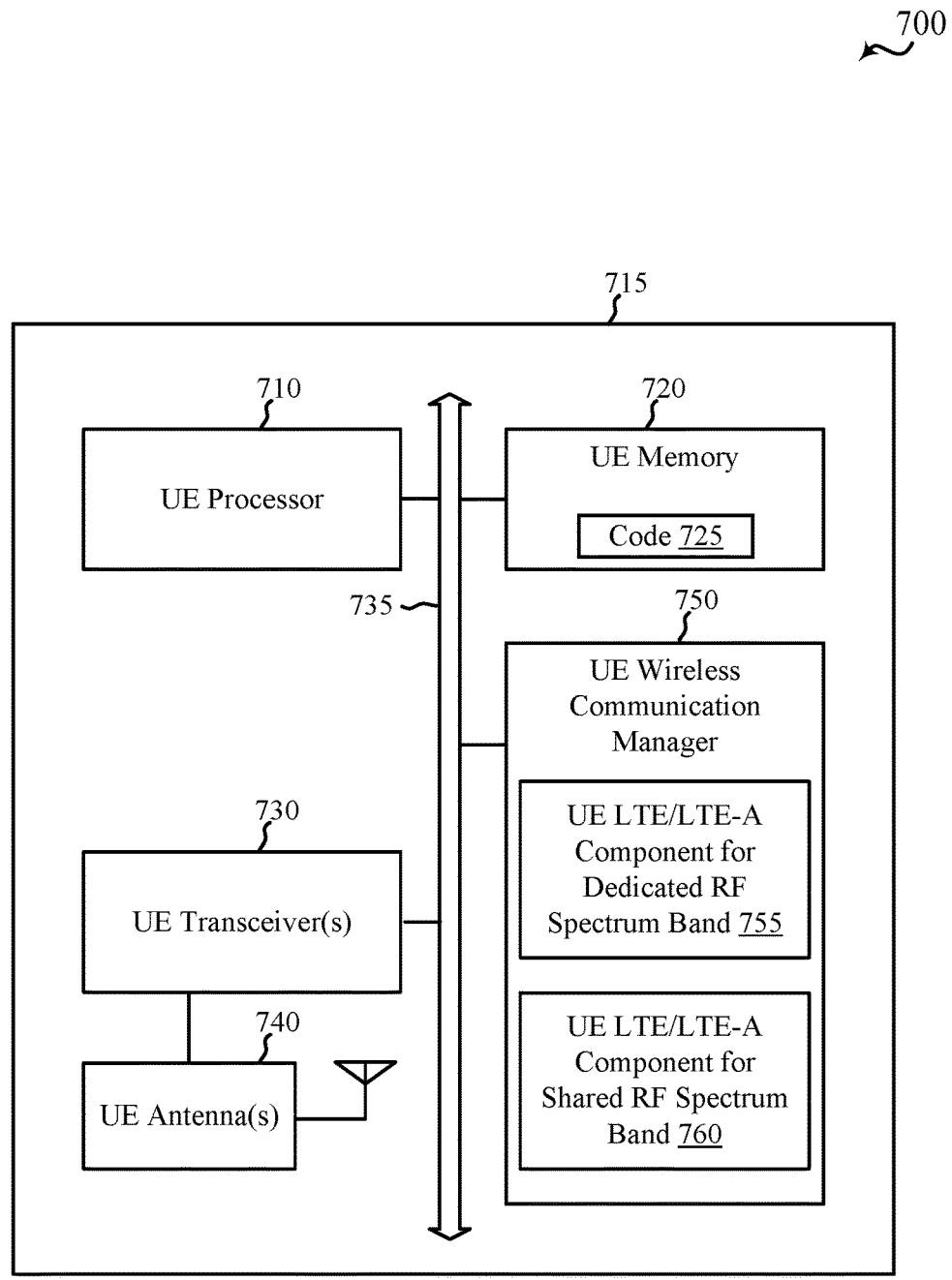
FIG. 7 shows a block diagram of a UE for use in wireless communication, in accordance with various aspects of the present disclosure.

FIG. 7 shows a block diagram 700 of a UE 715 for use in wireless communication, in accordance with various aspects of the present disclosure. The UE 715 may be included or be part of a personal computer (e.g., a laptop computer, a netbook computer, a tablet computer, etc.), a cellular telephone, a PDA, a DVR, an internet appliance, a gaming console, an e-reader, etc. The UE 715 may, in some examples, have an internal power supply (not shown), such as a small battery, to facilitate mobile operation. In some examples, the UE 715 may be an example of aspects of one or more of the UEs 115, 215, 215-a, or 215-b as described with reference to FIG. 1 or 2, or aspects of the apparatus 515 as described with reference to FIG. 5. The UE 715 may be configured to implement at least some of the UE or apparatus techniques and functions as described with reference to FIG. 1, 2, 3, 4, or 5.

The UE 715 may include a UE processor 710, a UE memory 720, at least one UE transceiver (represented by UE transceiver(s) 730), at least one UE antenna (represented by UE antenna(s) 740), or a UE wireless communication manager 750. Each of these components may be in communication with each other, directly or indirectly, over one or more buses 735.

The UE memory 720 may include random access memory (RAM) or read-only memory (ROM). The UE memory 720 may store computer-readable, computer-executable code 725 containing instructions that are configured to, when executed, cause the UE processor 710 to perform various functions described herein related to wireless communication, including, for example, determining a contention window size for performing a LBT procedure with respect to a shared radio frequency spectrum band, transmitting an uplink transmission over the shared radio frequency spectrum band, transmitting aperiodic CSI for a carrier transmitted over the shared radio frequency spectrum band, transmitting a SRS over a carrier transmitted over the shared radio frequency spectrum band, etc. Alternatively, the computer-executable code 725 may not be directly executable by the UE processor 710 but be configured to cause the UE 715 (e.g., when compiled and executed) to perform various of the functions described herein.

The UE processor 710 may include an intelligent hardware device, e.g., a central processing unit (CPU), a microcontroller, an ASIC, etc. The UE processor 710 may process information received through the UE transceiver(s) 730 or information to be sent to the UE transceiver(s) 730 for transmission through the UE antenna(s) 740. The UE processor 710 may handle, alone or in connection with the UE wireless communication manager 750, various aspects of communicating over (or managing communications over) a dedicated radio frequency spectrum band or a shared radio frequency spectrum band.

The UE transceiver(s) 730 may include a modem configured to modulate packets and provide the modulated packets to the UE antenna(s) 740 for transmission, and to demodulate packets received from the UE antenna(s) 740. The UE transceiver(s) 730 may, in some examples, be implemented as one or more UE transmitters and one or more separate UE receivers. The UE transceiver(s) 730 may support communications in the dedicated radio frequency spectrum band or the shared radio frequency spectrum band. The UE transceiver(s) 730 may be configured to communicate bi-directionally, via the UE antenna(s) 740, with one or more network access devices, base stations, or apparatuses, such as one or more of the base stations 105, 205, or 205-a described with reference to FIG. 1 or 2, or one or more of the apparatus 605 as described with reference to FIG. 6. While the UE 715 may include a single UE antenna, there may be examples in which the UE 715 may include multiple UE antennas 740.

The UE wireless communication manager 750 may be configured to perform or control some or all of the UE or apparatus techniques or functions as described with reference to FIG. 1, 2, 3, 4, or 5 related to wireless communication over the dedicated radio frequency spectrum band or the shared radio frequency spectrum band. For example, the UE wireless communication manager 750 may be configured to support a supplemental downlink mode (e.g., a licensed assisted access mode), a carrier aggregation mode (e.g., an enhanced licensed assisted access mode), or a standalone mode using the dedicated radio frequency spectrum band or the shared radio frequency spectrum band. The UE wireless communication manager 750 may include a UE LTE/LTE-A component for dedicated RF spectrum band 755 configured to handle LTE/LTE-A communications in the dedicated radio frequency spectrum band, and a UE LTE/LTE-A component for shared RF spectrum band 760 configured to handle LTE/LTE-A communications in the shared radio frequency spectrum band. The UE wireless communication manager 750, or portions of it, may include a processor, or some or all of the functions of the UE wireless communication manager 750 may be performed by the UE processor 710 or in connection with the UE processor 710. In some examples, the UE wireless communication manager 750 may be an example of the wireless communication manager 520 as described with reference to FIG. 5.

Figure 8:
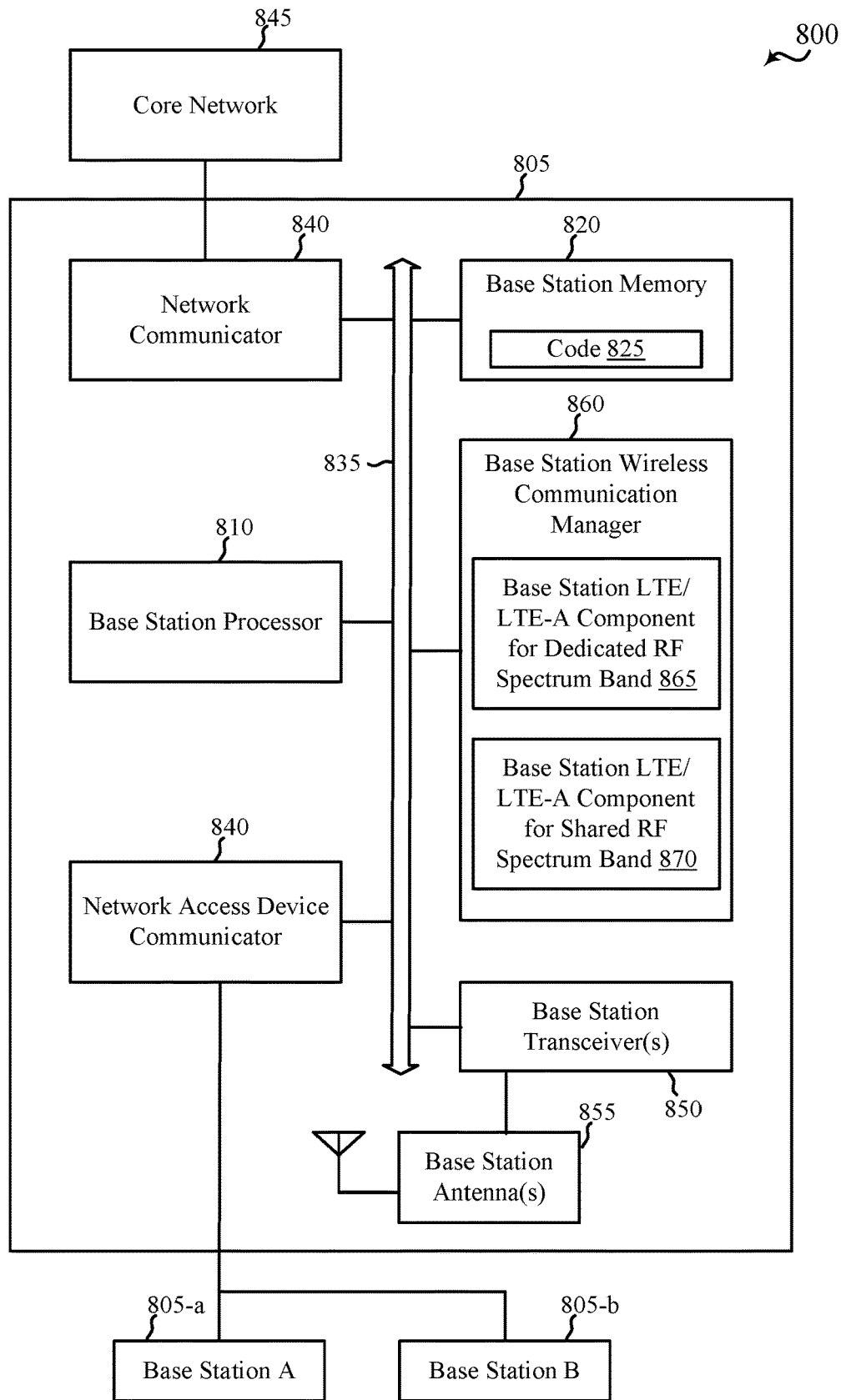
FIG. 8 shows a block diagram of a base station for use in wireless communication, in accordance with various aspects of the present disclosure.

FIG. 8 shows a block diagram 800 of a base station 805 for use in wireless communication, in accordance with various aspects of the present disclosure. In some examples, the base station 805 may be an example of one or more aspects of the base stations 105, 205, or 205-a as described with reference to FIG. 1 or 2, or aspects of the apparatus 605 as described with reference to FIG. 6. The base station 805 may be configured to implement or facilitate at least some of the base station or apparatus techniques and functions as described with reference to FIG. 1, 2, 3, 4, or 6.

The base station 805 may include a base station processor 810, a base station memory 820, at least one base station transceiver (represented by base station transceiver(s) 750), at least one base station antenna (represented by base station antenna(s) 855), or a base station wireless communication manager 860. The base station 805 may also include one or more of a network access device communicator 830 or a network communicator 840. Each of these components may be in communication with each other, directly or indirectly, over one or more buses 875.

The base station memory 820 may include RAM or ROM. The base station memory 820 may store computer-readable, computer-executable code 825 containing instructions that are configured to, when executed, cause the base station processor 810 to perform various functions described herein related to wireless communication, including, for example, determining a contention window size for performing a LBT procedure with respect to a shared radio frequency spectrum band, transmitting an uplink transmission over the shared radio frequency spectrum band, receiving aperiodic CSI for a carrier transmitted over the shared radio frequency spectrum band, receiving a SRS over a carrier transmitted over the shared radio frequency spectrum band, etc. Alternatively, the computer-executable code 825 may not be directly executable by the base station processor 810 but be configured to cause the base station 805 (e.g., when compiled and executed) to perform various of the functions described herein.

The base station processor 810 may include an intelligent hardware device, e.g., a CPU, a microcontroller, an ASIC, etc. The base station processor 810 may process information received through the base station transceiver(s) 750, the network access device communicator 830, or the network communicator 840. The base station processor 810 may also process information to be sent to the transceiver(s) 750 for transmission through the antenna(s) 855, to the network access device communicator 830, for transmission to one or more other network access devices (e.g., base station 805-a and/or base station 805-b), or to the network communicator 840 for transmission to a core network 845, which may be an example of one or more aspects of the core network 130 as described with reference to FIG. 1. The base station processor 810 may handle, alone or in connection with the base station wireless communication manager 860, various aspects of communicating over (or managing communications over) a dedicated radio frequency spectrum band or a shared radio frequency spectrum band.

The base station transceiver(s) 750 may include a modem configured to modulate packets and provide the modulated packets to the base station antenna(s) 855 for transmission, and to demodulate packets received from the base station antenna(s) 855. The base station transceiver(s) 750 may, in some examples, be implemented as one or more base station transmitters and one or more separate base station receivers. The base station transceiver(s) 750 may support communications in the dedicated radio frequency spectrum band or the shared radio frequency spectrum band. The base station transceiver(s) 750 may be configured to communicate bi-directionally, via the base station antenna(s) 855, with one or more UEs or apparatuses, such as one or more of the UEs 115, 215, 215-a, or 215-b as described with reference to FIG. 1 or 2, or one or more of the apparatus 515 as described with reference to FIG. 5. The base station 805 may, for example, include multiple base station antennas 855 (e.g., an antenna array). The base station 805 may communicate with the core network 845 through the network communicator 840. The base station 805 may also communicate with other network access devices, such as the base station 805-a and/or the base station 805-b, using the network access device communicator 830.

The base station wireless communication manager 860 may be configured to perform or control some or all of the techniques or functions as described with reference to FIG. 1, 2, 3, 4, or 6 related to wireless communication over the dedicated radio frequency spectrum band or the shared radio frequency spectrum band. For example, the base station wireless communication manager 860 may be configured to support a supplemental downlink mode (e.g., a licensed assisted access mode), a carrier aggregation mode (e.g., an enhanced licensed assisted access mode), or a standalone mode using the dedicated radio frequency spectrum band or the shared radio frequency spectrum band. The base station wireless communication manager 860 may include a base station LTE/LTE-A component for dedicated RF spectrum band 865 configured to handle LTE/LTE-A communications in the dedicated radio frequency spectrum band, and a base station LTE/LTE-A component for shared RF spectrum band 870 configured to handle LTE/LTE-A communications in the shared radio frequency spectrum band. The base station wireless communication manager 860, or portions of it, may include a processor, or some or all of the functions of the base station wireless communication manager 860 may be performed by the base station processor 810 or in connection with the base station processor 810. In some examples, the base station wireless communication manager 860 may be an example of the wireless communication manager 620 as described with reference to FIG. 6.

FIG. 9 is a flow chart illustrating an example of a method 900 for wireless communication at a network access device, in accordance with various aspects of the present disclosure. For clarity, the method 900 is described below with reference to aspects of one or more of the base stations 105, 205, 205-a, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 905, the method 900 may include detecting a first reference signal received from a UE in a reference scheduled transmission burst including a plurality of contiguous TTIs received over a shared radio frequency spectrum band. The operation(s) at block 905 may be performed using the wireless communication manager 620 as described with reference to FIG. 6, the base station wireless communication manager 860 as described with reference to FIG. 8, or the UE spectrum contention manager 640 as described with reference to FIG. 6.

At block 910, the method 900 may include identifying a reference TTI in which the first reference is received. The operation(s) at block 910 may be performed using the wireless communication manager 620 as described with reference to FIG. 6, the base station wireless communication manager 860 as described with reference to FIG. 8, or the UE spectrum contention manager 640 as described with reference to FIG. 6.

At block 915, the method 900 may include determining a contention window size usable by the UE to contend for access to the shared radio frequency spectrum band. The determined contention window size may be based at least in part on: a triggering of aperiodic CSI without a PUSCH on the reference TTI, a decoding of a PUCCH with CRC scheduled in the reference TTI, a decoding of a random access preamble scheduled on a PRACH in the reference TTI, a decoding of a first scheduled uplink transmission associated with a random access procedure and received in the reference TTI, or a combination thereof. The operation(s) at block 915 may be performed using the wireless communication manager 620 as described with reference to FIG. 6, the base station wireless communication manager 860 as described with reference to FIG. 8, or the UE spectrum contention manager 640 as described with reference to FIG. 6.

At block 920, the method 900 may include transmitting an indication of the determined contention window size to the UE. The operation(s) at block 920 may be performed using the wireless communication manager 620 as described with reference to FIG. 6, the base station wireless communication manager 860 as described with reference to FIG. 8, or the UE spectrum contention manager 640 as described with reference to FIG. 6.

Figure 10:
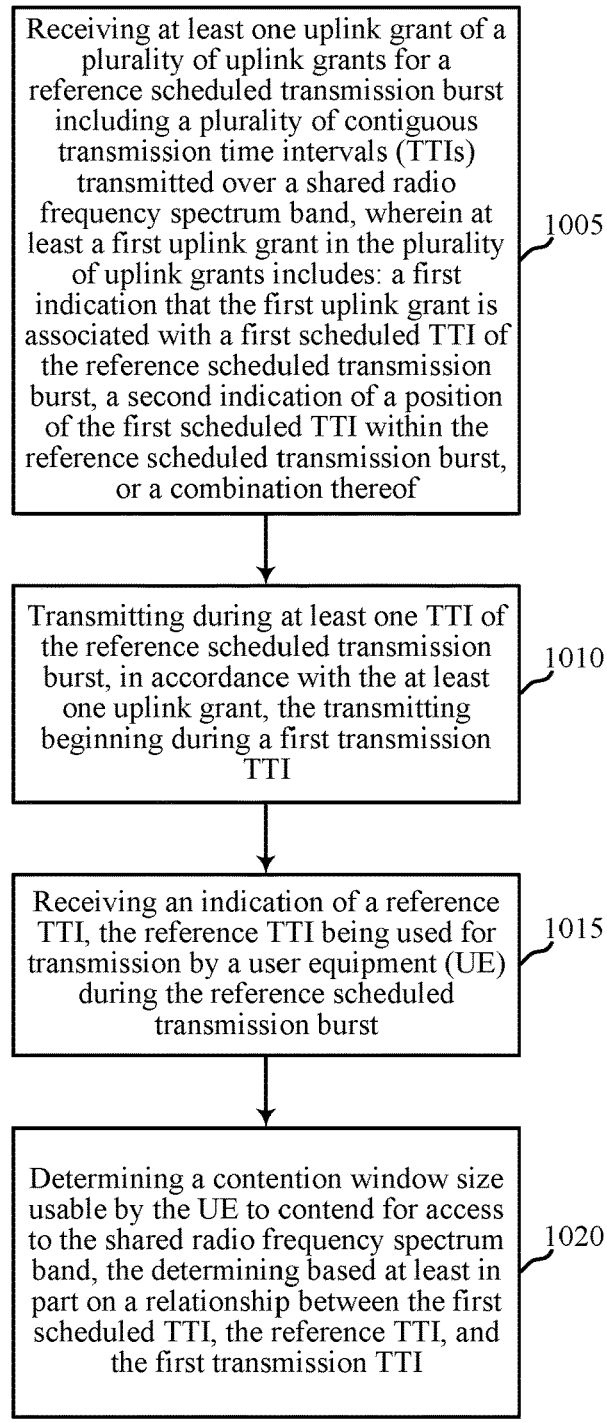
FIG. 10 is a flow chart illustrating an example of a method for wireless communication at a UE, in accordance with various aspects of the present disclosure.

FIG. 10 is a flow chart illustrating an example of a method 1000 for wireless communication at a UE, in accordance with various aspects of the present disclosure. For clarity, the method 1000 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include receiving (e.g., from a network access device) at least one uplink grant of a plurality of uplink grants for a reference scheduled transmission burst including a plurality of contiguous TTIs transmitted over a shared radio frequency spectrum band. At least a first uplink grant in the plurality of uplink grants may include: a first indication that the first uplink grant is associated with a first scheduled TTI of the reference scheduled transmission burst, a second indication of a position of the first scheduled TTI within the reference scheduled transmission burst, or a combination thereof. In some examples, each uplink grant for the reference scheduled transmission burst may include an indication of the position of the first scheduled TTI of the reference scheduled transmission burst. The operation(s) at block 1005 may be performed using the wireless communication manager 520 as described with reference to FIG. 5, the UE wireless communication manager 750 as described with reference to FIG. 7, or the uplink transmission manager 560 as described with reference to FIG. 5.

At block 1010, the method 1000 may include transmitting (e.g., to the network access device) during at least one TTI of the reference scheduled transmission burst, in accordance with the at least one uplink grant. The transmitting may begin during a first transmission TTI. The operation(s) at block 1010 may be performed using the wireless communication manager 520 as described with reference to FIG. 5, the UE wireless communication manager 750 as described with reference to FIG. 7, or the uplink transmission manager 560 as described with reference to FIG. 5.

At block 1015, the method 1000 may include receiving (e.g., from the network access device) an indication of a reference TTI. The reference TTI may be used for transmission by the UE during the reference scheduled transmission burst. In some examples, the indication of the reference TTI may be relative to the first scheduled TTI. The operation(s) at block 1015 may be performed using the wireless communication manager 520 as described with reference to FIG. 5, the UE wireless communication manager 750 as described with reference to FIG. 7, or the uplink transmission manager 560 as described with reference to FIG. 5.

At block 1020, the method 1000 may include determining a contention window size usable by the UE to contend for access to the shared radio frequency spectrum band. The contention window size may be determined based at least in part on a relationship between the first scheduled TTI, the reference TTI, and the first transmission TTI. The operation(s) at block 1020 may be performed using the wireless communication manager 520 as described with reference to FIG. 5, the UE wireless communication manager 750 as described with reference to FIG. 7, or the spectrum contention manager 540 as described with reference to FIG. 5.

FIG. 11 is a flow chart illustrating an example of a method 1100 for wireless communication at a UE, in accordance with various aspects of the present disclosure. For clarity, the method 1100 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1105, the method 1100 may include transmitting a reference scheduled transmission burst including a plurality of contiguous TTIs over a shared radio frequency spectrum band. The operation(s) at block 1105 may be performed using the wireless communication manager 520 as described with reference to FIG. 5, the UE wireless communication manager 750 as described with reference to FIG. 7, or the uplink transmission manager 560 as described with reference to FIG. 5.

At block 1110, the method 1100 may include identifying a HARQ process corresponding to a reference TTI. The reference TTI may be a first TTI of the plurality of TTIs for which a HARQ acknowledgement is received. The operation(s) at block 1110 may be performed using the wireless communication manager 520 as described with reference to FIG. 5, the UE wireless communication manager 750 as described with reference to FIG. 7, or the HARQ manager 565 as described with reference to FIG. 5.

At block 1115, the method 1100 may include identifying an instance of the HARQ process associated with a TTI subsequent to the reference TTI. The instance of the HARQ process may be identified based at least in part on: whether the TTI is included within the reference scheduled transmission burst or a subsequent transmission burst, whether the TTI includes aperiodic CSI without a PUSCH, or a combination thereof. The operation(s) at block 1115 may be performed using the wireless communication manager 520 as described with reference to FIG. 5, the UE wireless communication manager 750 as described with reference to FIG. 7, or the HARQ manager 565 as described with reference to FIG. 5.

At block 1120, the method 1100 may include determining a contention window size usable by the UE to contend for access to the shared radio frequency spectrum band. The contention window size may be determined based at least in part on a state of a NDI associated with the identified instance of the HARQ process. The operation(s) at block 1120 may be performed using the wireless communication manager 520 as described with reference to FIG. 5, the UE wireless communication manager 750 as described with reference to FIG. 7, or the spectrum contention manager 540 as described with reference to FIG. 5.

Figure 12:
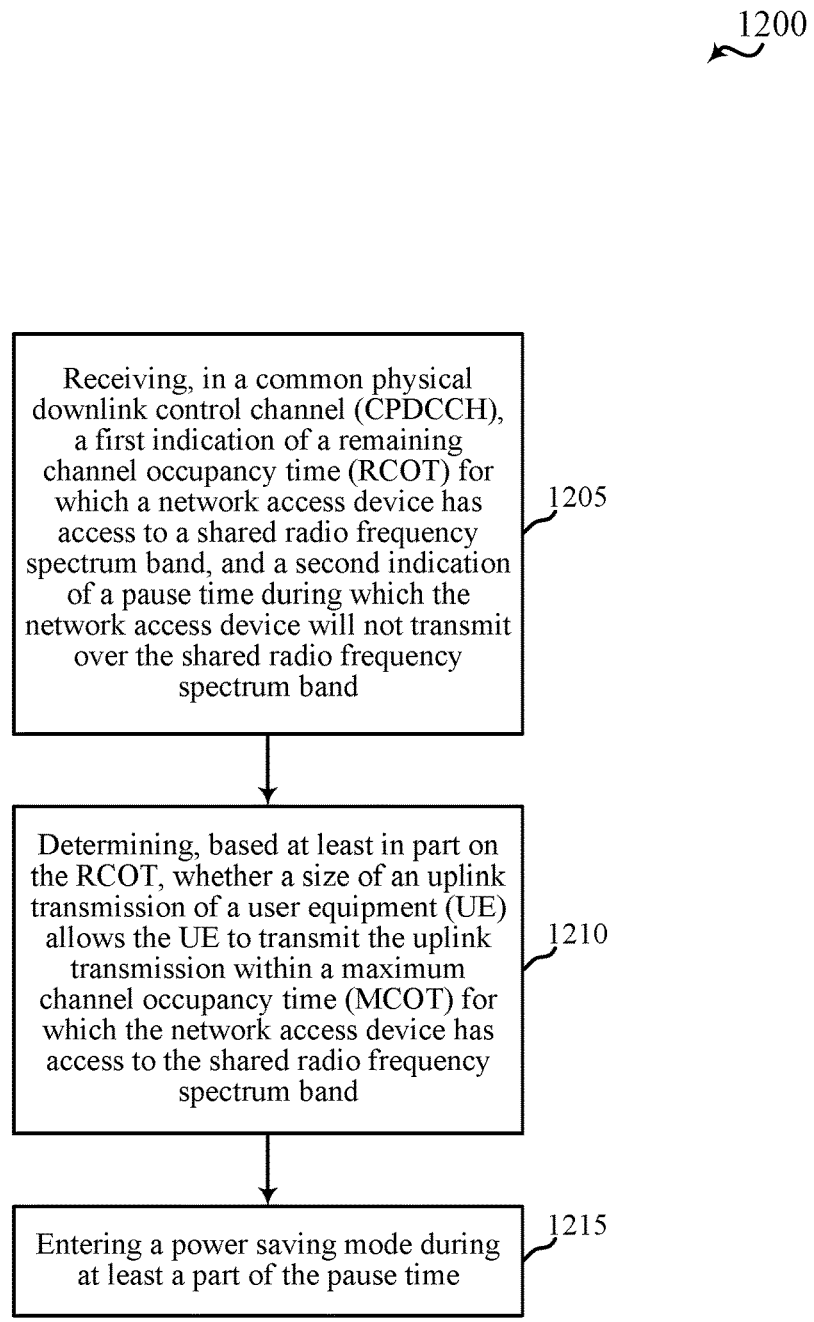
FIG. 12 is a flow chart illustrating an example of a method for wireless communication at a UE, in accordance with various aspects of the present disclosure.

FIG. 12 is a flow chart illustrating an example of a method 1200 for wireless communication at a UE, in accordance with various aspects of the present disclosure. For clarity, the method 1200 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1205, the method 1200 may include receiving, in a CPDCCH, a first indication of a RCOT for which a network access device has access to a shared radio frequency spectrum band, and a second indication of a pause time during which the network access device will not transmit over the shared radio frequency spectrum band. In some examples, the RCOT may include the pause time. In some examples, the RCOT may not include the pause time. The operation(s) at block 1205 may be performed using the wireless communication manager 520 as described with reference to FIG. 5, the UE wireless communication manager 750 as described with reference to FIG. 7, or the uplink transmission manager 560 as described with reference to FIG. 5.

At block 1210, the method 1200 may include determining, based at least in part on the RCOT, whether a size of an uplink transmission of the UE allows the UE to transmit the uplink transmission within a MCOT for which the network access device has access to the shared radio frequency spectrum band. The operation(s) at block 1210 may be performed using the wireless communication manager 520 as described with reference to FIG. 5, the UE wireless communication manager 750 as described with reference to FIG. 7, or the uplink transmission manager 560 as described with reference to FIG. 5.

At block 1215, the method 1200 may include entering a power saving mode during at least a part of the pause time. The operation(s) at block 1215 may be performed using the wireless communication manager 520 as described with reference to FIG. 5, or the UE wireless communication manager 750 as described with reference to FIG. 7.

FIG. 13 is a flow chart illustrating an example of a method 1300 for wireless communication at a UE, in accordance with various aspects of the present disclosure. For clarity, the method 1300 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1305, the method 1300 may include receiving, in a downlink TTI of a scheduled transmission burst received over a shared radio frequency spectrum band, an indication of a downlink-uplink TTI configuration beginning with the downlink TTI. The downlink-uplink configuration may include a number of upcoming downlink TTIs, a number of uplink TTIs, or a combination thereof. In some examples, the method 1300 may also include receiving, in the downlink TTI, at least one of: a second indication of a downlink TTI duration, a third indication of an uplink TTI duration, or a combination thereof. In some examples, the downlink TTI may include a downlink subframe and the downlink-uplink TTI configuration may include a downlink-uplink subframe configuration. The operation(s) at block 1305 may be performed using the wireless communication manager 520 as described with reference to FIG. 5, the UE wireless communication manager 750 as described with reference to FIG. 7, or the downlink transmission reception manager 535 as described with reference to FIG. 5.

At block 1310, the method 1300 may include determining, based at least in part on the downlink-uplink TTI configuration beginning with the downlink TTI, a timing of a next downlink TTI in the scheduled transmission burst. The operation(s) at block 1310 may be performed using the wireless communication manager 520 as described with reference to FIG. 5, the UE wireless communication manager 750 as described with reference to FIG. 7, or the downlink transmission reception manager 535 as described with reference to FIG. 5.

At block 1315, the method 1300 may optionally include receiving, in each of at least one additional downlink TTI of the scheduled transmission burst, an additional indication of an additional downlink-uplink TTI configuration following the additional downlink TTI. The operation(s) at block 1315 may be performed using the wireless communication manager 520 as described with reference to FIG. 5, the UE wireless communication manager 750 as described with reference to FIG. 7, or the downlink transmission reception manager 535 as described with reference to FIG. 5.

FIG. 14 is a flow chart illustrating an example of a method 1400 for wireless communication at a UE, in accordance with various aspects of the present disclosure. For clarity, the method 1400 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include transmitting a type of BSR, which may include an indication of an amount of data to be transmitted for each of a plurality of LBT priority classes. The operation(s) at block 1405 may be performed using the wireless communication manager 520 as described with reference to FIG. 5, the UE wireless communication manager 750 as described with reference to FIG. 7, or the BSR manager 545 as described with reference to FIG. 5.

At block 1410, the method 1400 may include receiving from a network access device, in response to transmitting the type of BSR, an indication of a LBT priority class boundary and an indication of a LBT priority class to be used by the UE when contending for access to a shared radio frequency spectrum band. The operation(s) at block 1410 may be performed using the wireless communication manager 520 as described with reference to FIG. 5, the UE wireless communication manager 750 as described with reference to FIG. 7, or the spectrum contention manager 540 as described with reference to FIG. 5.

At block 1415, the method 1400 may include selecting a LBT priority class based at least in part on a type of data to be transmitted over a shared radio frequency spectrum band and the LBT priority class boundary. In some examples, the LBT priority class boundary may include at least one of: a highest LBT priority class usable by the UE, a lowest LBT priority class usable by the UE, or a combination thereof. The operation(s) at block 1415 may be performed using the wireless communication manager 520 as described with reference to FIG. 5, the UE wireless communication manager 750 as described with reference to FIG. 7, or the spectrum contention manager 540 as described with reference to FIG. 5.

At block 1420, the method 1400 may include contending for access to the shared radio frequency spectrum band based at least in part on the selected LBT priority class. The operation(s) at block 1420 may be performed using the wireless communication manager 520 as described with reference to FIG. 5, the UE wireless communication manager 750 as described with reference to FIG. 7, or the spectrum contention manager 540 as described with reference to FIG. 5.

FIG. 15 is a flow chart illustrating an example of a method 1500 for wireless communication at a UE, in accordance with various aspects of the present disclosure. For clarity, the method 1500 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include transmitting a first type of BSR including an indication of an amount of data to be transmitted for each of a plurality of LBT priority classes. The operation(s) at block 1505 may be performed using the wireless communication manager 520 as described with reference to FIG. 5, the UE wireless communication manager 750 as described with reference to FIG. 7, or the BSR manager 545 as described with reference to FIG. 5.

At block 1510, the method 1500 may include receiving from a network access device, in response to transmitting the first type of BSR, an indication of a LBT priority class to be used by the UE when contending for access to a shared radio frequency spectrum band. The operation(s) at block 1510 may be performed using the wireless communication manager 520 as described with reference to FIG. 5, the UE wireless communication manager 750 as described with reference to FIG. 7, or the spectrum contention manager 540 as described with reference to FIG. 5.

In some examples, the method 1500 may include selecting the first type of BSR from a plurality of BSR types including at least the first type of BSR and a second type of BSR. In some examples, the second type of BSR may include a LTE/LTE-A type of BSR. In some examples, the first type of BSR may be selected from the plurality of BSR types based at least in part on a BSR selection criterion. In some examples, the criterion may include receiving data to transmit, in which the data is associated with a LBT priority class satisfying (e.g., exceeding) a threshold LBT priority class.

Figure 16:
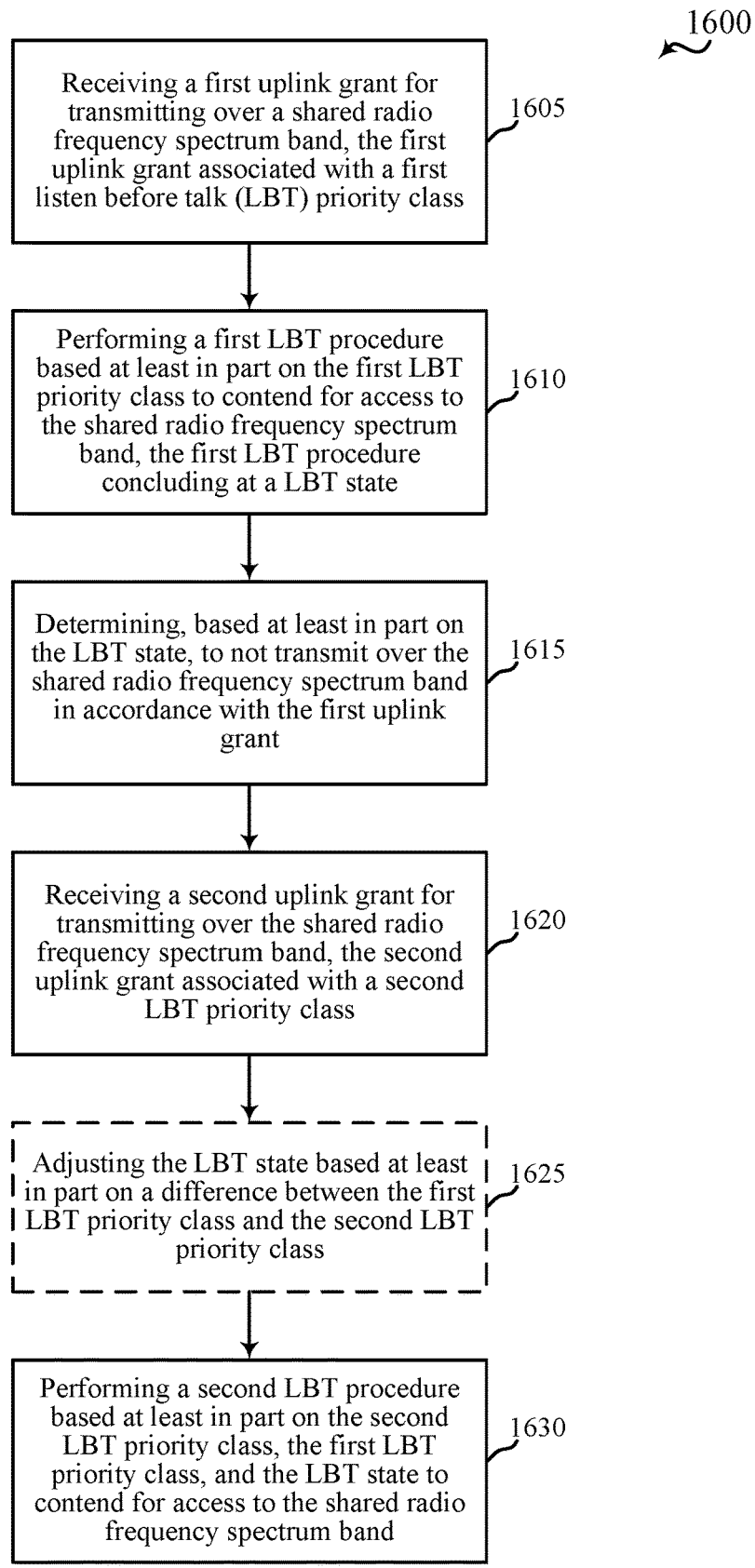
FIG. 16 is a flow chart illustrating an example of a method for wireless communication at a UE, in accordance with various aspects of the present disclosure.

FIG. 16 is a flow chart illustrating an example of a method 1600 for wireless communication at a UE, in accordance with various aspects of the present disclosure. For clarity, the method 1600 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1605, the method 1600 may include receiving a first uplink grant for transmitting over a shared radio frequency spectrum band. The first uplink grant may be associated with a first LBT priority class. The operation(s) at block 1605 may be performed using the wireless communication manager 520 as described with reference to FIG. 5, the UE wireless communication manager 750 as described with reference to FIG. 7, or the uplink transmission manager 560 as described with reference to FIG. 5.

At block 1610, the method 1600 may include performing a first LBT procedure based at least in part on the first LBT priority class to contend for access to the shared radio frequency spectrum band. The first LBT procedure may conclude at a LBT state. The operation(s) at block 1610 may be performed using the wireless communication manager 520 as described with reference to FIG. 5, the UE wireless communication manager 750 as described with reference to FIG. 7, or the spectrum contention manager 540 as described with reference to FIG. 5.

At block 1615, the method 1600 may include determining, based at least in part on the LBT state, to not transmit over the shared radio frequency spectrum band in accordance with the first uplink grant. The operation(s) at block 1615 may be performed using the wireless communication manager 520 as described with reference to FIG. 5, the UE wireless communication manager 750 as described with reference to FIG. 7, or the spectrum contention manager 540 as described with reference to FIG. 5.

At block 1620, the method 1600 may include receiving a second uplink grant for transmitting over the shared radio frequency spectrum band. The second uplink grant may be associated with a second LBT priority class. The operation(s) at block 1620 may be performed using the wireless communication manager 520 as described with reference to FIG. 5, the UE wireless communication manager 750 as described with reference to FIG. 7, or the uplink transmission manager 560 as described with reference to FIG. 5.

At block 1625, the method 1600 may optionally include adjusting the LBT state based at least in part on a difference between the first LBT priority class and the second LBT priority class. Accordingly, in some cases, the LBT state may be adjusted at the conclusion of the first LBT procedure. Additionally or alternatively, the second LBT procedure may be initialized. In some examples, the operation(s) at block 1625 may include determining the first LBT priority class and the second LBT priority class are a same LBT priority class, and initializing the second LBT procedure based at least in part on the LBT state. In some examples, the operation(s) at block 1625 may include determining the first LBT priority class and the second LBT priority class are different LBT priority classes, adjusting the LBT state at the conclusion of the first LBT procedure based at least in part on a difference between the first LBT priority class and the second LBT priority class, and initializing the second LBT procedure based at least in part on the adjusted LBT state.

The operation(s) at block 1625 may be performed using the wireless communication manager 520 as described with reference to FIG. 5, the UE wireless communication manager 750 as described with reference to FIG. 7, or the spectrum contention manager 540 as described with reference to FIG. 5.

At block 1630, the method 1600 may include performing a second LBT procedure based at least in part on the second LBT priority class, the first LBT priority class, and the LBT state to contend for access to the shared radio frequency spectrum band. The operation(s) at block 1630 may be performed using the wireless communication manager 520 as described with reference to FIG. 5, the UE wireless communication manager 750 as described with reference to FIG. 7, or the spectrum contention manager 540 as described with reference to FIG. 5.

FIG. 17 is a flow chart illustrating an example of a method 1700 for wireless communication at a network access device, in accordance with various aspects of the present disclosure. For clarity, the method 1700 is described below with reference to aspects of one or more of the base stations 105, 205, 205-*a*, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 1705, the method 1700 may include identifying feedback received from a UE for a downlink reference TTI of a TxOP over a shared radio frequency spectrum band. The TxOP may include at least one downlink TTI and at least one uplink TTI. In some examples, the at least one downlink TTI may include at least one downlink subframe, and the at least one uplink TTI may include at least one uplink subframe. The operation(s) at block 1705 may be performed using the wireless communication manager 620 as described with reference to FIG. 6, the base station wireless communication manager 860 as described with reference to FIG. 8, or the HARQ manager 645 as described with reference to FIG. 6.

At block 1710, the method 1700 may include identifying an uplink TTI, of the TxOP, for which scheduling information is transmitted in the downlink reference TTI. The operation(s) at block 1710 may be performed using the wireless communication manager 620 as described with reference to FIG. 6, the base station wireless communication manager 860 as described with reference to FIG. 8, or the network access device spectrum contention manager 635 as described with reference to FIG. 6.

At block 1715, the method 1700 may include determining a contention window size usable by the network access device to contend for access to the shared radio frequency spectrum band, for a next TxOP, based at least in part on the identified feedback and a scheduled uplink transmission in the identified uplink TTI. In some examples, determining the contention window size based at least in part on the scheduled uplink transmission in the identified uplink TTI may include determining the contention window size based at least in part on a decoding of at least one channel including: a scheduled PUSCH, or a scheduled PUCCH, or a scheduled PRACH, or a combination thereof. In some examples, determining the contention window size based at least in part on the decoding of the at least one channel may include determining the contention window size based least in part on ACK/NACK feedback for the at least one channel. The operation(s) at block 1715 may be performed using the wireless communication manager 620 as described with reference to FIG. 6, the base station wireless communication manager 860 as described with reference to FIG. 8, or the network access device spectrum contention manager 635 as described with reference to FIG. 6.

Figure 18:
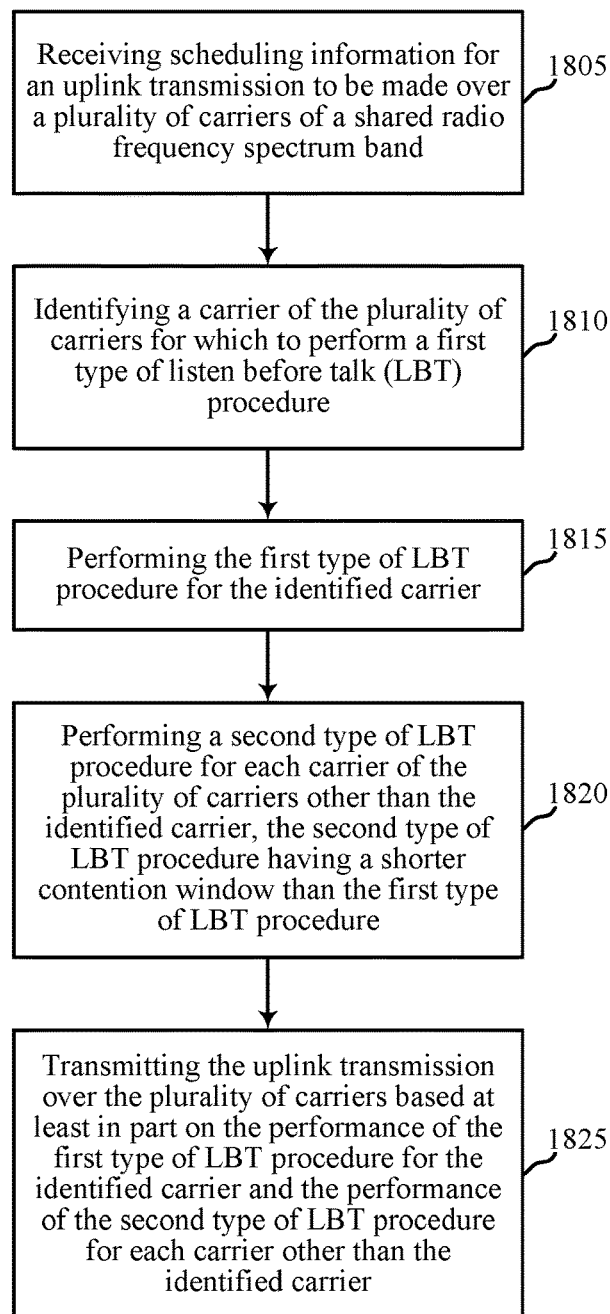
FIG. 18 is a flow chart illustrating an example of a method for wireless communication at a UE, in accordance with various aspects of the present disclosure.

FIG. 18 is a flow chart illustrating an example of a method 1800 for wireless communication at a UE, in accordance with various aspects of the present disclosure. For clarity, the method 1800 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 1805, the method 1800 may include receiving scheduling information for an uplink transmission to be made over a plurality of carriers of a shared radio frequency spectrum band. The operation(s) at block 1805 may be performed using the wireless communication manager 520 as described with reference to FIG. 5, the UE wireless communication manager 750 as described with reference to FIG. 7, or the uplink transmission manager 560 as described with reference to FIG. 5.

At block 1810, the method 1800 may include identifying a carrier of the plurality of carriers for which to perform a first type of LBT procedure. In some examples, identifying the carrier may include one of: identifying the carrier from an indication received from a network access device, or independently identifying the carrier. The operation(s) at block 1810 may be performed using the wireless communication manager 520 as described with reference to FIG. 5, the UE wireless communication manager 750 as described with reference to FIG. 7, or the spectrum contention manager 540 as described with reference to FIG. 5.

At block 1815, the method 1800 may include performing the first type of LBT procedure for the identified carrier. The operation(s) at block 1815 may be performed using the wireless communication manager 520 as described with reference to FIG. 5, the UE wireless communication manager 750 as described with reference to FIG. 7, or the spectrum contention manager 540 as described with reference to FIG. 5.

At block 1820, the method 1800 may include performing a second type of LBT procedure for each carrier of the plurality of carriers other than the identified carrier. The second type of LBT procedure may have a shorter contention window than the first type of LBT procedure. The operation(s) at block 1820 may be performed using the wireless communication manager 520 as described with reference to FIG. 5, the UE wireless communication manager 750 as described with reference to FIG. 7, or the spectrum contention manager 540 as described with reference to FIG. 5.

At block 1825, the method 1800 may include transmitting the uplink transmission over the plurality of carriers based at least in part on the performance of the first type of LBT procedure for the identified carrier and the performance of the second type of LBT procedure for each carrier other than the identified carrier. The operation(s) at block 1825 may be performed using the wireless communication manager 520 as described with reference to FIG. 5, the UE wireless communication manager 750 as described with reference to FIG. 7, or the uplink transmission manager 560 as described with reference to FIG. 5.

FIG. 19 is a flow chart illustrating an example of a method 1900 for wireless communication at a network access device, in accordance with various aspects of the present disclosure. For clarity, the method 1900 is described below with reference to aspects of one or more of the base stations 105, 205, 205-*a*, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 1905, the method 1900 may include scheduling an uplink transmission to be made by a UE over a plurality of carriers of a shared radio frequency spectrum band. The operation(s) at block 1905 may be performed using the wireless communication manager 620 as described with reference to FIG. 6, the base station wireless communication manager 860 as described with reference to FIG. 8, or the uplink transmission manager 660 as described with reference to FIG. 6.

At block 1910, the method 1900 may include transmitting, to the UE, an indication of a single carrier of the plurality of carriers for which to perform a first type of LBT procedure. In some examples, transmitting the indication of the single carrier may include: transmitting the indication of the single carrier in uplink DCI for the single carrier, or transmitting the indication of the single carrier in uplink DCI for each carrier of the plurality of carriers. The operation(s) at block 1910 may be performed using the wireless communication manager 620 as described with reference to FIG. 6, the base station wireless communication manager 860 as described with reference to FIG. 8, or the UE spectrum contention manager 640 as described with reference to FIG. 6.

Figure 20:
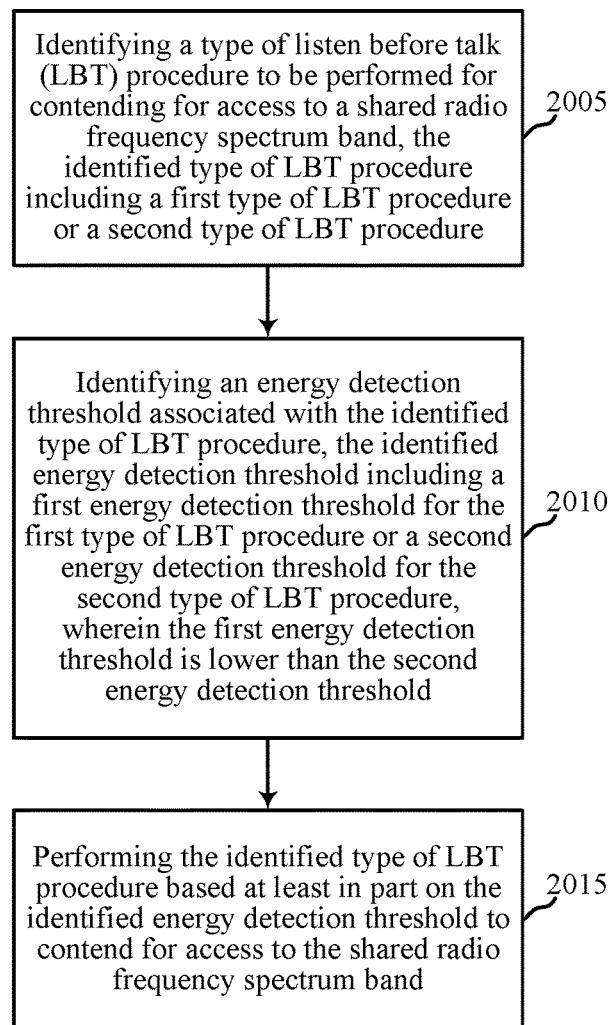
FIG. 20 is a flow chart illustrating an example of a method for wireless communication at a UE, in accordance with various aspects of the present disclosure.

FIG. 20 is a flow chart illustrating an example of a method 2000 for wireless communication at a UE, in accordance with various aspects of the present disclosure. For clarity, the method 2000 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2005, the method 2000 may include identifying a type of LBT procedure to be performed for contending for access to a shared radio frequency spectrum band. The identified type of LBT procedure may include a first type of LBT procedure or a second type of LBT procedure. The operation(s) at block 2005 may be performed using the wireless communication manager 520 as described with reference to FIG. 5, the UE wireless communication manager 750 as described with reference to FIG. 7, or the spectrum contention manager 540 as described with reference to FIG. 5.

At block 2010, the method 2000 may include identifying an energy detection threshold associated with the identified type of LBT procedure, the identified energy detection threshold including a first energy detection threshold for the first type of LBT procedure or a second energy detection threshold for the second type of LBT procedure, where the first energy detection threshold may be lower than the second energy detection threshold. The operation(s) at block 2010 may be performed using the wireless communication manager 520 as described with reference to FIG. 5, the UE wireless communication manager 750 as described with reference to FIG. 7, or the spectrum contention manager 540 as described with reference to FIG. 5.

At block 2015, the method 2000 may include performing the identified type of LBT procedure based at least in part on the identified energy detection threshold to contend for access to the shared radio frequency spectrum band. The operation(s) at block 2015 may be performed using the wireless communication manager 520 as described with reference to FIG. 5, the UE wireless communication manager 750 as described with reference to FIG. 7, or the spectrum contention manager 540 as described with reference to FIG. 5.

FIG. 21 is a flow chart illustrating an example of a method 2100 for wireless communication at a UE, in accordance with various aspects of the present disclosure. For clarity, the method 2100 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2105, the method 2100 may include receiving an indication that the UE cannot update a countdown counter associated with performance of a LBT procedure during a TTI in which the UE receives a transmission. In some examples, the indication that the UE cannot update the countdown counter may be received in at least one of: RRC signaling, a SIB, or DCI. The operation(s) at block 2105 may be performed using the wireless communication manager 520 as described with reference to FIG. 5, the UE wireless communication manager 750 as described with reference to FIG. 7, or the spectrum contention manager 540 as described with reference to FIG. 5.

At block 2110, the method 2100 may include determining the UE is receiving a transmission during a TTI. The operation(s) at block 2110 may be performed using the wireless communication manager 520 as described with reference to FIG. 5, the UE wireless communication manager 750 as described with reference to FIG. 7, or the downlink transmission reception manager 535 as described with reference to FIG. 5.

At block 2115, the method 2100 may include refraining from at least one of: performing a LBT procedure during the TTI, updating a countdown counter associated with performance of the LBT procedure during the TTI, or a combination thereof. The operation(s) at block 2115 may be performed using the wireless communication manager 520 as described with reference to FIG. 5, the UE wireless communication manager 750 as described with reference to FIG. 7, or the spectrum contention manager 540 as described with reference to FIG. 5.

Figure 22:
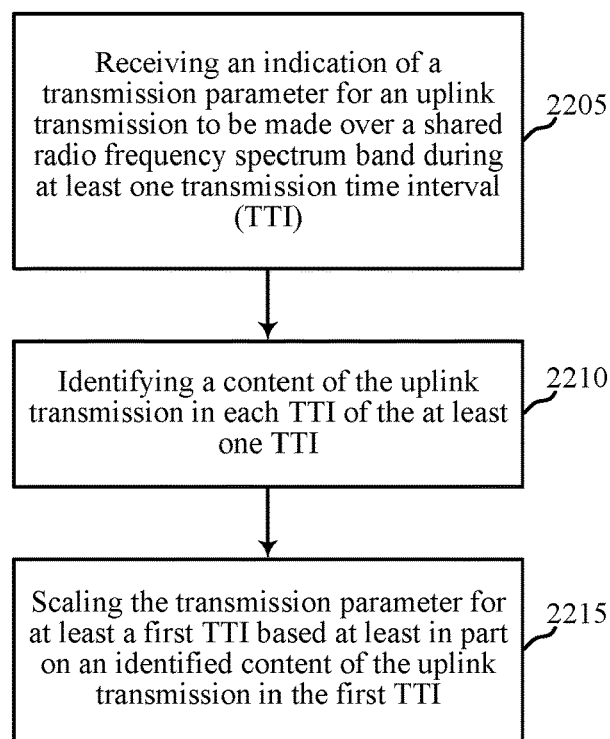
FIG. 22 is a flow chart illustrating an example of a method for wireless communication at a UE, in accordance with various aspects of the present disclosure.

FIG. 22 is a flow chart illustrating an example of a method 2200 for wireless communication at a UE, in accordance with various aspects of the present disclosure. For clarity, the method 2200 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2205, the method 2200 may include receiving an indication of a transmission parameter for an uplink transmission to be made over a shared radio frequency spectrum band during at least one TTI. In some examples, the transmission parameter may include at least one of: a TBS, a MCS, or a combination thereof. The operation(s) at block 2205 may be performed using the wireless communication manager 520 as described with reference to FIG. 5, the UE wireless communication manager 750 as described with reference to FIG. 7, or the uplink transmission manager 560 as described with reference to FIG. 5.

At block 2210, the method 2200 may include identifying a content of the uplink transmission in each TTI of the at least one TTI. In some examples, the identified content may include at least one of: a number of REs, a number of punctured symbol periods, a first presence of a PUCCH, a second presence of a PRACH, a third presence of a SRS, or a combination thereof. The operation(s) at block 2210 may be performed using the wireless communication manager 520 as described with reference to FIG. 5, the UE wireless communication manager 750 as described with reference to FIG. 7, or the uplink transmission manager 560 as described with reference to FIG. 5.

At block 2215, the method 2200 may include scaling the transmission parameter for at least a first TTI based on an identified content of the uplink transmission in the first TTI. In some examples, scaling the transmission parameter may include one of: switching to a fixed alternative transmission parameter, or computing an alternative transmission parameter based at least in part on a comparison of the identified content to a nominal content. The operation(s) at block 2215 may be performed using the wireless communication manager 520 as described with reference to FIG. 5, the UE wireless communication manager 750 as described with reference to FIG. 7, or the uplink transmission manager 560 as described with reference to FIG. 5.

FIG. 23 is a flow chart illustrating an example of a method 2300 for wireless communication at a UE, in accordance with various aspects of the present disclosure. For clarity, the method 2300 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2305, the method 2300 may include receiving RRC signaling from a network. The RRC signaling may configure HARQ ACK feedback reporting for a first carrier in a shared radio frequency spectrum band in one of: a first mode in which the UE transmits HARQ ACK feedback is transmitted on a PUCCH on a second carrier in a dedicated radio frequency spectrum band, or a second mode in which the UE selects to transmit HARQ ACK feedback on the PUCCH on the second carrier or on a PUSCH on the first carrier. The operation(s) at block 2305 may be performed using the wireless communication manager 520 as described with reference to FIG. 5, the UE wireless communication manager 750 as described with reference to FIG. 7, or the HARQ manager 565 as described with reference to FIG. 5.

At block 2310, the method 2300 may include transmitting HARQ ACK feedback in accordance with the first mode or the second mode, as configured by the RRC signaling. The operation(s) at block 2310 may be performed using the wireless communication manager 520 as described with reference to FIG. 5, the UE wireless communication manager 750 as described with reference to FIG. 7, or the HARQ manager 565 as described with reference to FIG. 5.

In some examples of the method 2300, the RRC signaling may configure the HARQ ACK feedback reporting for the first carrier in the second mode, and the method 2300 may include contending for access to the first carrier in the shared radio frequency spectrum band, and selecting to transmit HARQ ACK feedback on the PUSCH on the first carrier based at least in part on winning contention for access to the first carrier.

FIG. 24 is a flow chart illustrating an example of a method 2400 for wireless communication at a network access device, in accordance with various aspects of the present disclosure. For clarity, the method 2400 is described below with reference to aspects of one or more of the base stations 105, 205, 205-a, or 805 as described with reference to FIGS. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 2405, the method 2400 may include configuring HARQ ACK feedback reporting for a first carrier in a shared radio frequency spectrum in one of: a first mode in which a UE transmits HARQ ACK feedback on a PUCCH on a second carrier in a dedicated radio frequency spectrum band, or a second mode in which the UE selects to transmit HARQ ACK feedback on the PUCCH on the second carrier or on a PUSCH on the first carrier. The operation(s) at block 2405 may be performed using the wireless communication manager 620 as described with reference to FIG. 6, the base station wireless communication manager 860 as described with reference to FIG. 8, or the HARQ manager 645 as described with reference to FIG. 6.

At block 2410, the method 2400 may include transmitting an indication of the configured HARQ ACK feedback reporting mode to the UE in RRC signaling. The operation(s) at block 2410 may be performed using the wireless communication manager 620 as described with reference to FIG. 6, the base station wireless communication manager 860 as described with reference to FIG. 8, or the HARQ manager 645 as described with reference to FIG. 6.

At block 2415, the method 2400 may include receiving HARQ ACK feedback for the first carrier from the UE, in accordance with the configured HARQ ACK feedback reporting mode. The operation(s) at block 2415 may be performed using the wireless communication manager 620 as described with reference to FIG. 6, the base station wireless communication manager 860 as described with reference to FIG. 8, or the HARQ manager 645 as described with reference to FIG. 6.

FIG. 25 is a flow chart illustrating an example of a method 2500 for wireless communication at a UE, in accordance with various aspects of the present disclosure. For clarity, the method 2500 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2505, the method 2500 may include receiving an indication of an invalid PUSCH resource allocation for a TTI over a shared radio frequency spectrum band. In some examples, the invalid PUSCH resource allocation may include an invalid frequency interlace combination with a designated bit pattern for a RV and a NDI. The operation(s) at block 2505 may be performed using the wireless communication manager 520 as described with reference to FIG. 5, the UE wireless communication manager 750 as described with reference to FIG. 7, or the CSI manager 555 as described with reference to FIG. 5.

At block 2510, the method 2500 may include transmitting aperiodic CSI without a PUSCH in the TTI. The operation(s) at block 2510 may be performed using the wireless communication manager 520 as described with reference to FIG. 5, the UE wireless communication manager 750 as described with reference to FIG. 7, or the CSI manager 555 as described with reference to FIG. 5.

At block 2515, the method 2500 may optionally include interpreting a HARQ ID for the TTI as invalid. The operation(s) at block 2515 may be performed using the wireless communication manager 520 as described with reference to FIG. 5, the UE wireless communication manager 750 as described with reference to FIG. 7, or the HARQ manager 565 as described with reference to FIG. 5.

FIG. 26 is a flow chart illustrating an example of a method 2600 for wireless communication at a network access device, in accordance with various aspects of the present disclosure. For clarity, the method 2600 is described below with reference to aspects of one or more of the base stations 105, 205, 205-a, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 2605, the method 2600 may include transmitting an indication of an invalid PUSCH resource allocation for a TTI over a shared radio frequency spectrum band. In some examples, the invalid PUSCH resource allocation comprises an invalid frequency interlace combination with a designated bit pattern for a RV and a NDI. The operation(s) at block 2605 may be performed using the wireless communication manager 620 as described with reference to FIG. 6, the base station wireless communication manager 860 as described with reference to FIG. 8, or the uplink transmission manager 660 as described with reference to FIG. 6.

At block 2610, the method 2600 may include receiving aperiodic CSI without a PUSCH in the TTI. The operation(s) at block 2610 may be performed using the wireless communication manager 620 as described with reference to FIG. 6, the base station wireless communication manager 860 as described with reference to FIG. 8, or the CSI manager 655 as described with reference to FIG. 6.

FIG. 27 is a flow chart illustrating an example of a method 2700 for wireless communication at a UE, in accordance with various aspects of the present disclosure. For clarity, the method 2700 is described below with reference to aspects of one or more of the UEs 115, 215, 215-a, 215-b, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2705, the method 2700 may include receiving a code point associated with transmission of aperiodic CSI over a shared radio frequency spectrum band in a TTI scheduled without a PUSCH. The operation(s) at block 2705 may be performed using the wireless communication manager 520 as described with reference to FIG. 5, the UE wireless communication manager 750 as described with reference to FIG. 7, or the CSI manager 555 as described with reference to FIG. 5.

At block 2710, the method 2700 may include receiving a multi-TTI grant that references the code point for a TTI scheduled by the multi-TTI grant. The operation(s) at block 2705 may be performed using the wireless communication manager 520 as described with reference to FIG. 5, the UE wireless communication manager 750 as described with reference to FIG. 7, or the uplink transmission manager 560 as described with reference to FIG. 5.

At block 2715, the method 2700 may include transmitting aperiodic CSI without a PUSCH in the TTI, in accordance with the code point. The operation(s) at block 2705 may be performed using the wireless communication manager 520 as described with reference to FIG. 5, the UE wireless communication manager 750 as described with reference to FIG. 7, or the CSI manager 555 as described with reference to FIG. 5.

FIG. 28 is a flow chart illustrating an example of a method 2800 for wireless communication at a network access device, in accordance with various aspects of the present disclosure. For clarity, the method 2800 is described below with reference to aspects of one or more of the base stations 105, 205, 205-a, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 2805, the method 2800 may include identifying an expected frequency of SRS requests. The operation(s) at block 2805 may be performed using the wireless communication manager 620 as described with reference to FIG. 6, the base station wireless communication manager 860 as described with reference to FIG. 8, or the SRS manager 650 as described with reference to FIG. 6.

At block 2810, the method 2800 may include identifying an aperiodic SRS to be transmitted without a PUSCH, during a TTI, over a shared radio frequency spectrum band. The operation(s) at block 2810 may be performed using the wireless communication manager 620 as described with reference to FIG. 6, the base station wireless communication manager 860 as described with reference to FIG. 8, or the SRS manager 650 as described with reference to FIG. 6.

At block 2815, the method 2800 may include determining a contention window size to be used by a UE when performing a LBT procedure to contend for access to the shared radio frequency spectrum band to transmit the aperiodic SRS, the determined contention window size based at least in part on the expected frequency of SRS requests. The operation(s) at block 2815 may be performed using the wireless communication manager 620 as described with reference to FIG. 6, the base station wireless communication manager 860 as described with reference to FIG. 8, or the UE spectrum contention manager 640 as described with reference to FIG. 6.

At block 2820, the method 2800 may include transmitting an indication of the determined contention window size to the UE. In some examples, the indication of the determined contention window size may be transmitted in RRC signaling. The operation(s) at block 2820 may be performed using the wireless communication manager 620 as described with reference to FIG. 6, the base station wireless communication manager 860 as described with reference to FIG. 8, or the UE spectrum contention manager 640 as described with reference to FIG. 6.

FIG. 29 is a flow chart illustrating an example of a method 2900 for wireless communication at a UE, in accordance with various aspects of the present disclosure. For clarity, the method 2900 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 2905, the method 2900 may include receiving, in downlink DCI, a trigger to transmit a SRS during a TTI. The operation(s) at block 2905 may be performed using the wireless communication manager 520 as described with reference to FIG. 5, the UE wireless communication manager 750 as described with reference to FIG. 7, or the SRS manager 550 as described with reference to FIG. 5.

At block 2910, the method 2900 may include receiving scheduling information for a PUSCH to be transmitted during the TTI, in which the scheduling information does not include a gap for transmitting the SRS. The operation(s) at block 2910 may be performed using the wireless communication manager 520 as described with reference to FIG. 5, the UE wireless communication manager 750 as described with reference to FIG. 7, or the uplink transmission manager 560 as described with reference to FIG. 5.

At block 2915, the method 2900 may include transmitting, during the TTI, one of: the PUSCH rate matched around the SRS, the PUSCH punctured by the SRS, the PUSCH without the SRS, or the SRS without the PUSCH. The operation(s) at block 2915 may be performed using the wireless communication manager 520 as described with reference to FIG. 5, the UE wireless communication manager 750 as described with reference to FIG. 7, or the uplink transmission manager 560 or SRS manager 550 as described with reference to FIG. 5.

Figure 30:
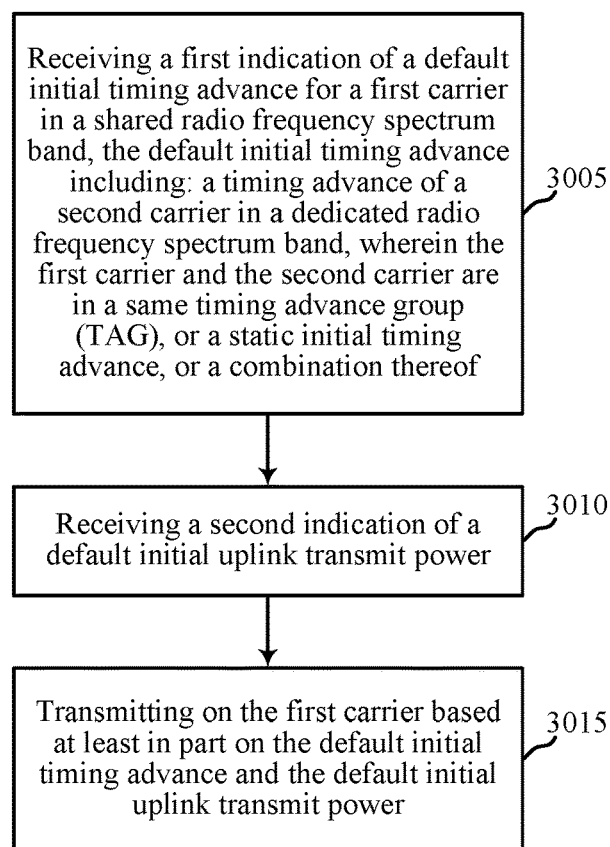
FIG. 30 is a flow chart illustrating an example of a method for wireless communication at a UE, in accordance with various aspects of the present disclosure.

FIG. 30 is a flow chart illustrating an example of a method 3000 for wireless communication at a UE, in accordance with various aspects of the present disclosure. For clarity, the method 3000 is described below with reference to aspects of one or more of the UEs 115, 215, 215-*a*, 215-*b*, or 715 as described with reference to FIG. 1, 2, or 7, or aspects of the apparatus 515 as described with reference to FIG. 5. In some examples, a UE may execute one or more sets of codes to control the functional elements of the UE to perform the functions described below. Additionally or alternatively, the UE may perform one or more of the functions described below using special-purpose hardware.

At block 3005, the method 3000 may include receiving a first indication of a default initial timing advance for a first carrier in a shared radio frequency spectrum band. The default initial timing advance may include: a timing advance of a second carrier in a dedicated radio frequency spectrum band, wherein the first carrier and the second carrier are in a same TAG, or a static initial timing advance (e.g., a TA of "0"), or a combination thereof. The operation(s) at block 3005 may be performed using the wireless communication manager 520 as described with reference to FIG. 5, the UE wireless communication manager 750 as described with reference to FIG. 7, or the uplink transmission manager 560 as described with reference to FIG. 5.

At block 3010, the method 3000 may include receiving a second indication of a default initial uplink transmit power. In some examples, the default initial uplink transmit power may be a maximum uplink transmit power. In some examples, the second indication may be received in at least one of: a system information block, a RRC configuration, or a combination thereof. In some examples, the method 3000 may include receiving a plurality of code points indicating different uplink transmit power adjustment steps, and a code point providing the second indication. The operation(s) at block 3010 may be performed using the wireless communication manager 520 as described with reference to FIG. 5, the UE wireless communication manager 750 as described with reference to FIG. 7, or the uplink transmission manager 560 as described with reference to FIG. 5.

At block 3015, the method 3000 may include transmitting on the first carrier based at least in part on the default initial timing advance and the default initial uplink transmit power. The operation(s) at block 3015 may be performed using the wireless communication manager 520 as described with reference to FIG. 5, the UE wireless communication manager 750 as described with reference to FIG. 7, or the uplink transmission manager 560 as described with reference to FIG. 5.

Figure 31:
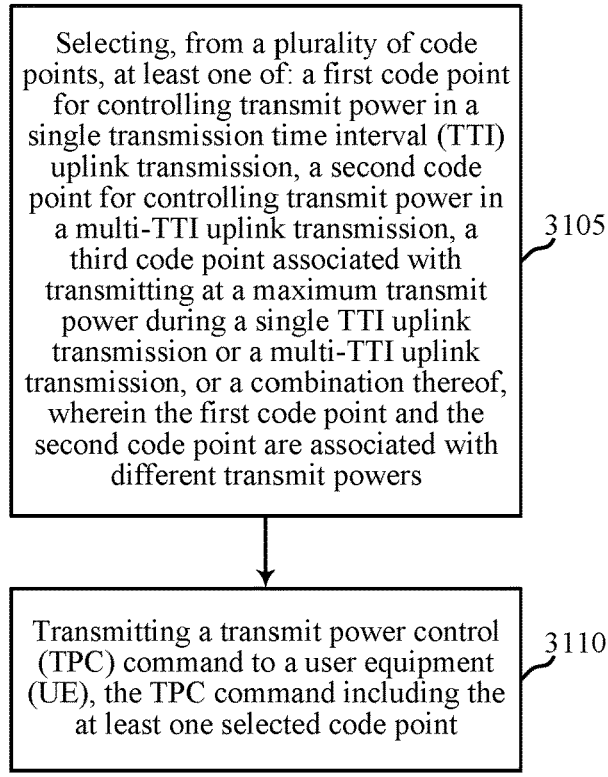
FIG. 31 is a flow chart illustrating an example of a method for wireless communication at a network access device, in accordance with various aspects of the present disclosure.

FIG. 31 is a flow chart illustrating an example of a method 3100 for wireless communication at a network access device, in accordance with various aspects of the present disclosure. For clarity, the method 3100 is described below with reference to aspects of one or more of the base stations 105, 205, 205-*a*, or 805 as described with reference to FIG. 1, 2, or 8, or aspects of the apparatus 605 as described with reference to FIG. 6. In some examples, a network access device may execute one or more sets of codes to control the functional elements of the network access device to perform the functions described below. Additionally or alternatively, the network access device may perform one or more of the functions described below using special-purpose hardware.

At block 3105, the method 3100 may include selecting, from a plurality of code points, at least one of: a first code point for controlling transmit power in a single TTI uplink transmission, a second code point for controlling transmit power in a multi-TTI uplink transmission, a third code point associated with transmitting at a maximum transmit power during a single TTI uplink transmission or a multi-TTI uplink transmission, or a combination thereof. The first code point and the second code point may be associated with different transmit powers (e.g., different ranges of transmit powers). In some examples of the method 3100, the second code point may identify larger uplink transmit power adjustment steps than the first code point. The operation(s) at block 3105 may be performed using the wireless communication manager 620 as described with reference to FIG. 6, the base station wireless communication manager 860 as described with reference to FIG. 8, or the uplink transmission manager 660 as described with reference to FIG. 6.

At block 3110, the method 3100 may include transmitting a transmit power control (TPC) command to a UE. The TPC command may include the at least one code point selected at block 3105. The operation(s) at block 3110 may be performed using the wireless communication manager 620 as described with reference to FIG. 6, the base station wireless communication manager 860 as described with reference to FIG. 8, or the uplink transmission manager 660 as described with reference to FIG. 6.

In some examples, the method 3100 may further include scheduling an uplink transmission by the UE, in which the scheduled uplink transmission includes a single TTI uplink transmission or a multi-TTI uplink transmission. The method 3100 may also include transmitting, to the UE, an uplink grant referencing a code point transmitted in the TPC command.

The methods 900, 1000, 1100, 1200, 1300, 1400, 1500, 1600, 1700, 1800, 1900, 2000, 2100, 2200, 2300, 2400, 2500, 2600, 2700, 2800, 2900, 3000, and 3100 as described with reference to FIGS. 9, 10, 11, 12, 13, 14, 15, 16, 17, 18, 19, 20, 21, 22, 23, 24, 25, 26, 27, 28, 29, 30, and 31 illustrate just some techniques, and some implementations of techniques, described in the present disclosure. In some examples, aspects from two or more of the methods 900, 1700, 1900, 2400, 2600, 2800, or 3100 described with reference to FIGS. 9, 17, 19, 24, 26, 28, and 31 may be combined. In some examples, aspects of the methods 1000, 1100, 1200, 1300, 1400, 1500, 1600, 1800, 2000, 2100, 2200, 2300, 2500, 2700, 2900, or 3000 as described with reference to FIGS. 10, 11, 12, 13, 14, 15, 16, 18, 20, 21, 22, 23, 25, 27, and 29 may be combined. It should be noted that the methods are just example implementations, and that the operations of the methods may be rearranged or otherwise modified such that other implementations are possible.

Techniques described herein may be used for various wireless communication systems such as code-division multiple access (CDMA), time-division multiple access (TDMA), FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a user equipment (UE), comprising:
receiving, in a first downlink transmission time interval (TTI) of a scheduled transmission burst, over a shared radio frequency spectrum band, an indication of a downlink-uplink TTI configuration for the scheduled transmission burst, wherein the downlink-uplink TTI configuration indicates a first number of upcoming downlink TTIs to follow the first downlink TTI before a first downlink-uplink transition, the first number being relative to the first downlink TTI in which the UE receives the indication, and a second number of uplink TTIs to follow the first downlink-uplink transition in the scheduled transmission burst before a second downlink-uplink transition of the scheduled transmission burst; and
determining, based at least in part on the second downlink-uplink transition indicated by the downlink-uplink TTI configuration, a timing of a next downlink TTI in the scheduled transmission burst relative to the first downlink TTI in which the UE receives the indication.

2. The method of claim 1, further comprising:
receiving, in each of at least one additional downlink TTI of the scheduled transmission burst, an additional indication of an additional downlink-uplink TTI configuration for a portion of the scheduled transmission burst following the additional downlink TTI.

3. The method of claim 1, further comprising:
receiving, in the first downlink TTI, at least one of: a second indication of a downlink TTI duration, a third indication of an uplink TTI duration, or a combination thereof.

4. The method of claim 1, wherein the first downlink TTI comprises a downlink subframe and the downlink-uplink TTI configuration comprises a downlink-uplink subframe configuration.

5. An apparatus for wireless communication at a user equipment (UE), comprising:
a processor,
memory in electronic communication with the processor; and
instructions stored in the memory and executable by the processor to cause the apparatus to:
receive, in a first downlink transmission time interval (TTI) of a scheduled transmission burst, over a shared radio frequency spectrum band, an indication of a downlink-uplink TTI configuration for the scheduled transmission burst, wherein the downlink-uplink TTI configuration indicates a first number of upcoming downlink TTIs to follow the first downlink TTI before a first downlink-uplink transition, the first number being relative to the first downlink TTI in which the UE receives the indication, and a second number of uplink TTIs to follow the first downlink-uplink transition in the scheduled transmission burst before a second downlink-uplink transition of the scheduled transmission burst; and
determine, based at least in part on the second downlink-uplink transition indicated by the downlink-uplink TTI configuration, a timing of a next downlink TTI in the scheduled transmission burst relative to the first downlink TTI in which the UE receives the indication.

6. The apparatus of claim 5, wherein the instructions are further executable by the processor to cause the apparatus to:
receive, in each of at least one additional downlink TTI of the scheduled transmission burst, an additional indication of an additional downlink-uplink TTI configuration for a portion of the scheduled transmission burst following the additional downlink TTI.

7. The apparatus of claim 5, wherein the instructions are further executable by the processor to cause the apparatus to:
receive, in the first downlink TTI, at least one of: a second indication of a downlink TTI duration, a third indication of an uplink TTI duration, or a combination thereof.

8. The apparatus of claim 5, wherein the first downlink TTI comprises a downlink subframe and the downlink-uplink TTI configuration comprises a downlink-uplink subframe configuration.

9. An apparatus for wireless communication at a user equipment (UE), comprising:
means for receiving, in a first downlink transmission time interval (TTI) of a scheduled transmission burst, over a shared radio frequency spectrum band, an indication of a downlink-uplink TTI configuration for the scheduled transmission burst, wherein the downlink-uplink TTI configuration indicates a first number of upcoming downlink TTIs to follow the first downlink TTI before a first downlink-uplink transition, the first number being relative to the first downlink TTI in which the UE receives the indication, and a second number of uplink TTIs to follow the first downlink-uplink transition in the scheduled transmission burst before a second downlink-uplink transition of the scheduled transmission burst; and means for determining, based at least in part on the second downlink-uplink transition indicated by the downlink-uplink TTI configuration, a timing of a next downlink TTI in the scheduled transmission burst relative to the first downlink TTI in which the UE receives the indication.

10. The apparatus of claim 9, further comprising:
means for receiving, in each of at least one additional downlink TTI of the scheduled transmission burst, an additional indication of an additional downlink-uplink TTI configuration for a portion of the scheduled transmission burst following the additional downlink TTI.

11. The apparatus of claim 9, further comprising:
means for receiving, in the first downlink TTI, at least one of: a second indication of a downlink TTI duration, a third indication of an uplink TTI duration, or a combination thereof.

12. The apparatus of claim 9, wherein the first downlink TTI comprises a downlink subframe and the downlink-uplink TTI configuration comprises a downlink-uplink subframe configuration.

13. A non-transitory computer-readable medium storing code for wireless communication at a user equipment (UE), the code comprising instructions executable by a processor to:

receive, in a first downlink transmission time interval (TTI) of a scheduled transmission burst, over a shared radio frequency spectrum band, an indication of a downlink-uplink TTI configuration for the scheduled transmission burst, wherein the downlink-uplink TTI configuration indicates a first number of upcoming downlink TTIs to follow the first downlink TTI before a first downlink-uplink transition, the first number being relative to the first downlink TTI in which the UE receives the indication, and a second number of uplink TTIs to follow the first downlink-uplink transition in the scheduled transmission burst before a second downlink-uplink transition of the scheduled transmission burst; and determine, based at least in part on the second downlink-uplink transition indicated by the downlink-uplink TTI configuration, a timing of a next downlink TTI in the scheduled transmission burst relative to the first downlink TTI in which the UE receives the indication.

14. The non-transitory computer-readable medium of claim 13, wherein the instructions are further executable to:
receive, in each of at least one additional downlink TTI of the scheduled transmission burst, an additional indication of an additional downlink-uplink TTI configuration for a portion of the scheduled transmission burst following the additional downlink TTI.

15. The non-transitory computer-readable medium of claim 13, wherein the instructions are further executable to:
receive, in the first downlink TTI, at least one of: a second indication of a downlink TTI duration, a third indication of an uplink TTI duration, or a combination thereof.

16. The non-transitory computer-readable medium of claim 13, wherein the first downlink TTI comprises a downlink subframe and the downlink-uplink TTI configuration comprises a downlink-uplink subframe configuration.

\* \* \* \* \*